United States Patent [19]
Nakajima et al.

[11] Patent Number: 5,930,136
[45] Date of Patent: Jul. 27, 1999

[54] CONTROL DEVICE FOR CONTROLLING A CONTROLLED APPARATUS, AND A CONTROL METHOD THEREFOR

[75] Inventors: Masaaki Nakajima; Satoshi Hattori; Yutaka Saito, all of Hitachi; Yasunori Katayama, Mito; Yasuo Morooka, Hitachi; Junzo Kawakami, Mito, all of Japan

[73] Assignee: Hitachi, Ltd., Tokyo, Japan

[21] Appl. No.: 08/887,322

[22] Filed: Jul. 2, 1997

Related U.S. Application Data

[63] Continuation of application No. 08/663,739, Jun. 14, 1996, abandoned, which is a continuation of application No. 08/413,901, Mar. 30, 1995, Pat. No. 5,541,832, which is a continuation of application No. 07/710,124, Jun. 4, 1991, Pat. No. 5,430,642.

[30] Foreign Application Priority Data

| Jun. 4, 1990 | [JP] | Japan | 2-144314 |
| Jul. 4, 1990 | [JP] | Japan | 2-176986 |
| Aug. 3, 1990 | [JP] | Japan | 2-205039 |
| Aug. 8, 1990 | [JP] | Japan | 2-208092 |

[51] Int. Cl.⁶ .................................................. G05B 13/02
[52] U.S. Cl. .......................... 364/148.03; 364/148.05; 364/153; 364/472.04; 706/23; 706/900; 706/906
[58] Field of Search .......................... 364/148.03, 153, 364/148.05, 164, 165, 472.04, 472.06, 148.02; 706/21, 22, 23, 15, 61, 900, 903, 906

[56] References Cited

U.S. PATENT DOCUMENTS

| 4,602,326 | 7/1986 | Kraus | 364/158 |
| 5,109,431 | 4/1992 | Nishiya et al. | 382/30 |
| 5,166,873 | 11/1992 | Takatsu et al. | 364/151 |
| 5,303,385 | 4/1994 | Hattori et al. | 395/22 |
| 5,331,565 | 7/1994 | Hattori et al. | 364/472 |
| 5,412,757 | 5/1995 | Endo | 395/61 |
| 5,414,619 | 5/1995 | Katayama et al. | 364/151 |
| 5,430,642 | 7/1995 | Nakajima et al. | 364/148.01 |
| 5,541,832 | 7/1996 | Nakajima et al. | 364/148.1 |

*Primary Examiner*—Paul P. Gordon
*Attorney, Agent, or Firm*—Antonelli, Terry, Stout & Kraus, LLP

[57] ABSTRACT

In order to control an apparatus, such as a rolling mill, a control device may use a pre-set operation pattern to generate a pre-set command signal, which is then modified. That first modification may be part of a feedback loop in dependence on the variation of a variable operation device of the apparatus, on a plurality of pre-set signals may be combined by fuzzy logic. Then the relationship between the modified pre-set command signal and the variation of the variable operation device is investigated to generate a compensation signal which is used to modify further the pre-set command signal. In a feedback loop, that further modification may compensate for changes in the operating point of the loop, due to changes in the apparatus being controlled. In a fuzzy logic arrangement, the compensation signal may be a further control pattern developed by the control device itself, which is combined with the pre-set patterns by fuzzy logic. The control device may be in the form of a series of modules.

24 Claims, 58 Drawing Sheets

F I G. 6
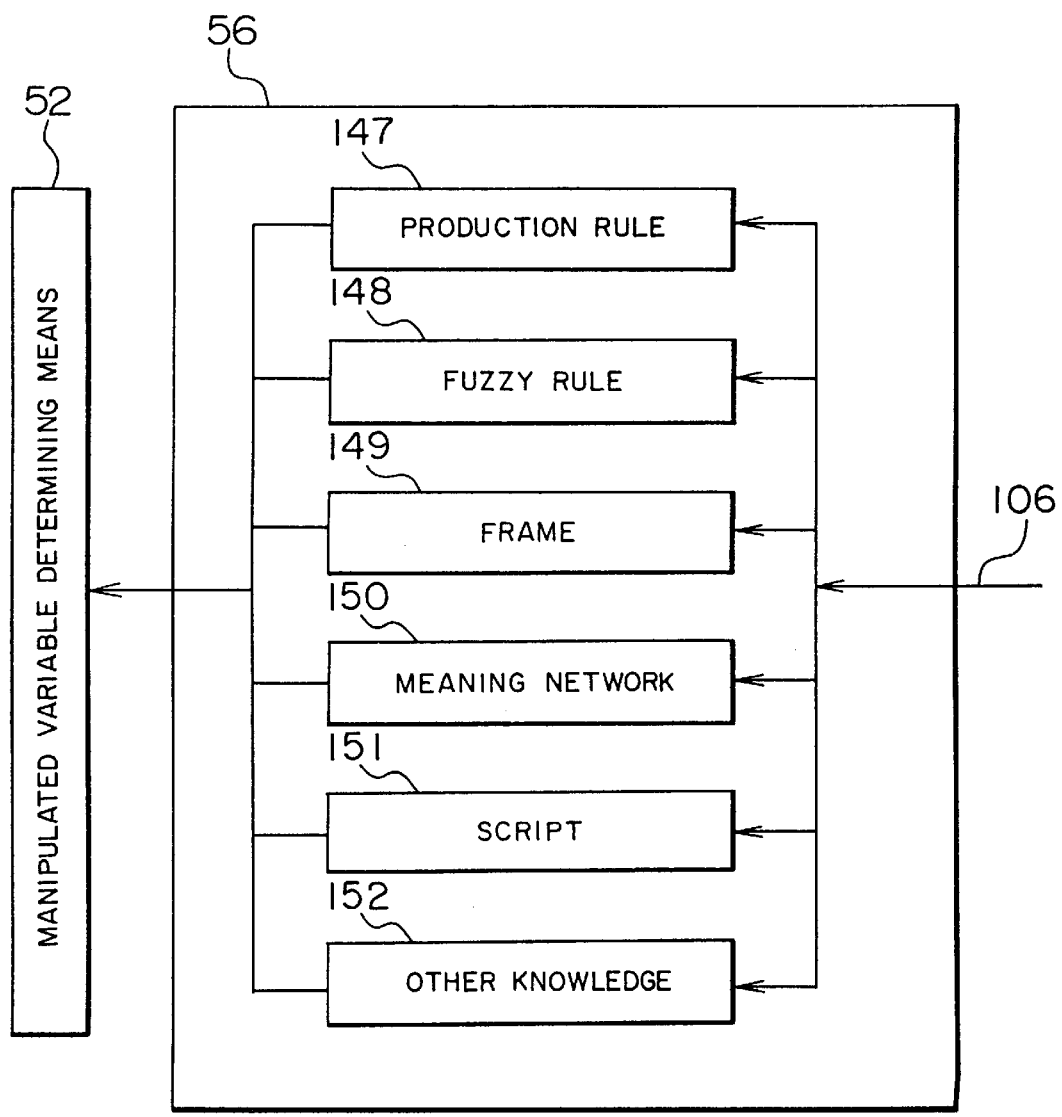

F I G. 18
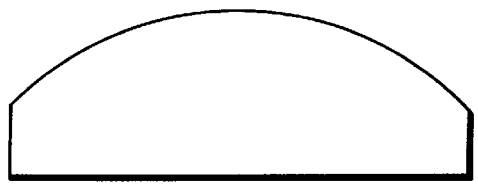
F I G. 19
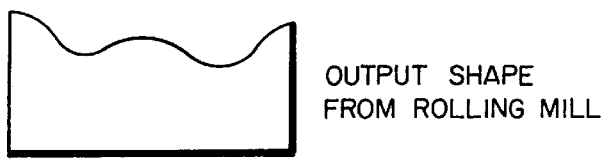
OUTPUT SHAPE
FROM ROLLING MILL
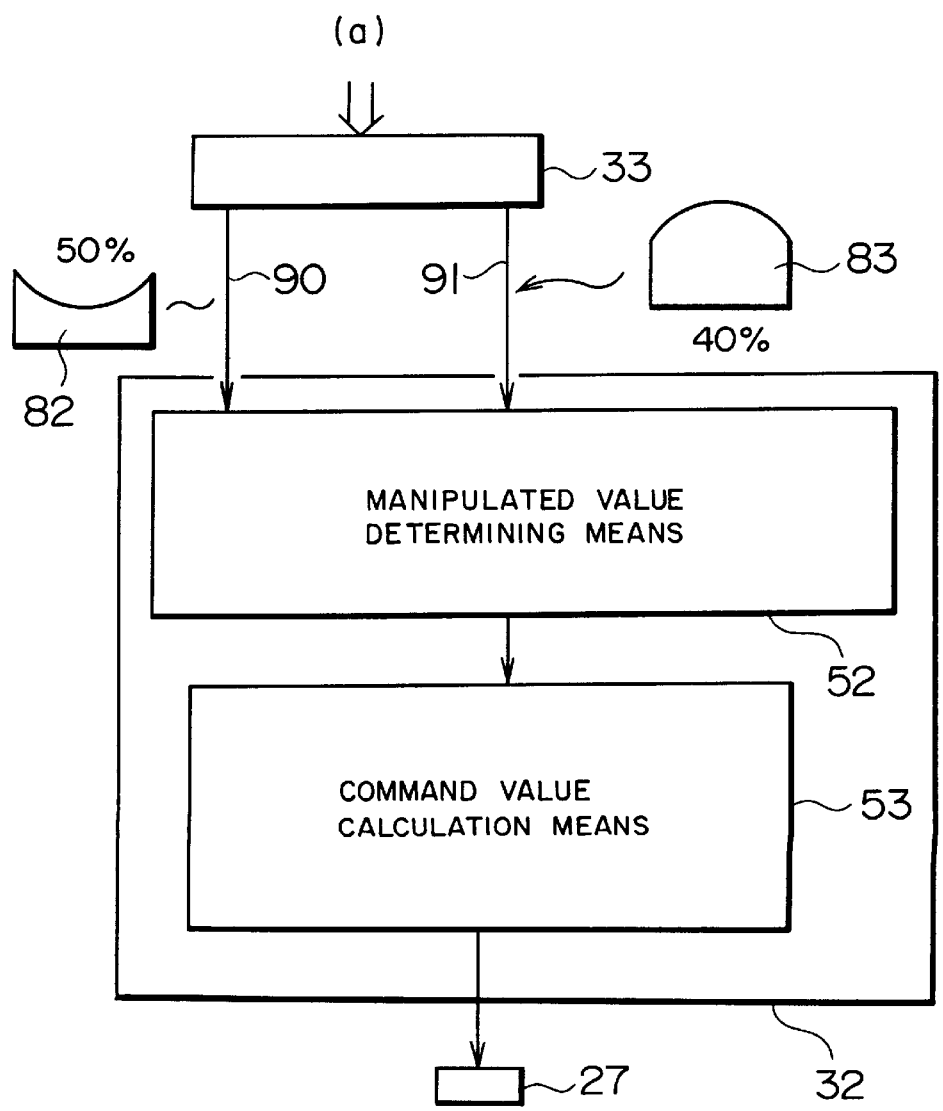

| PREMISE SECTION | CONCLUSION SECTION |
|---|---|
| CONCAVE (180) | WEAKEN BENDER (S) (181) |
| CONVEX (182) | STRENGTHEN BENDER (B) (183) |
| ⁓ | ⁓ |
| LARGER THAN LEFT AND RIGHT VALUES (184) | CENTRAL PART IS LARGER (185) |
| CENTRAL PART IS LARGER AND DIFFERENTIAL COEFFICIENT IS POSITIVE (186) | TURN ON COOLANT (B) (187) |

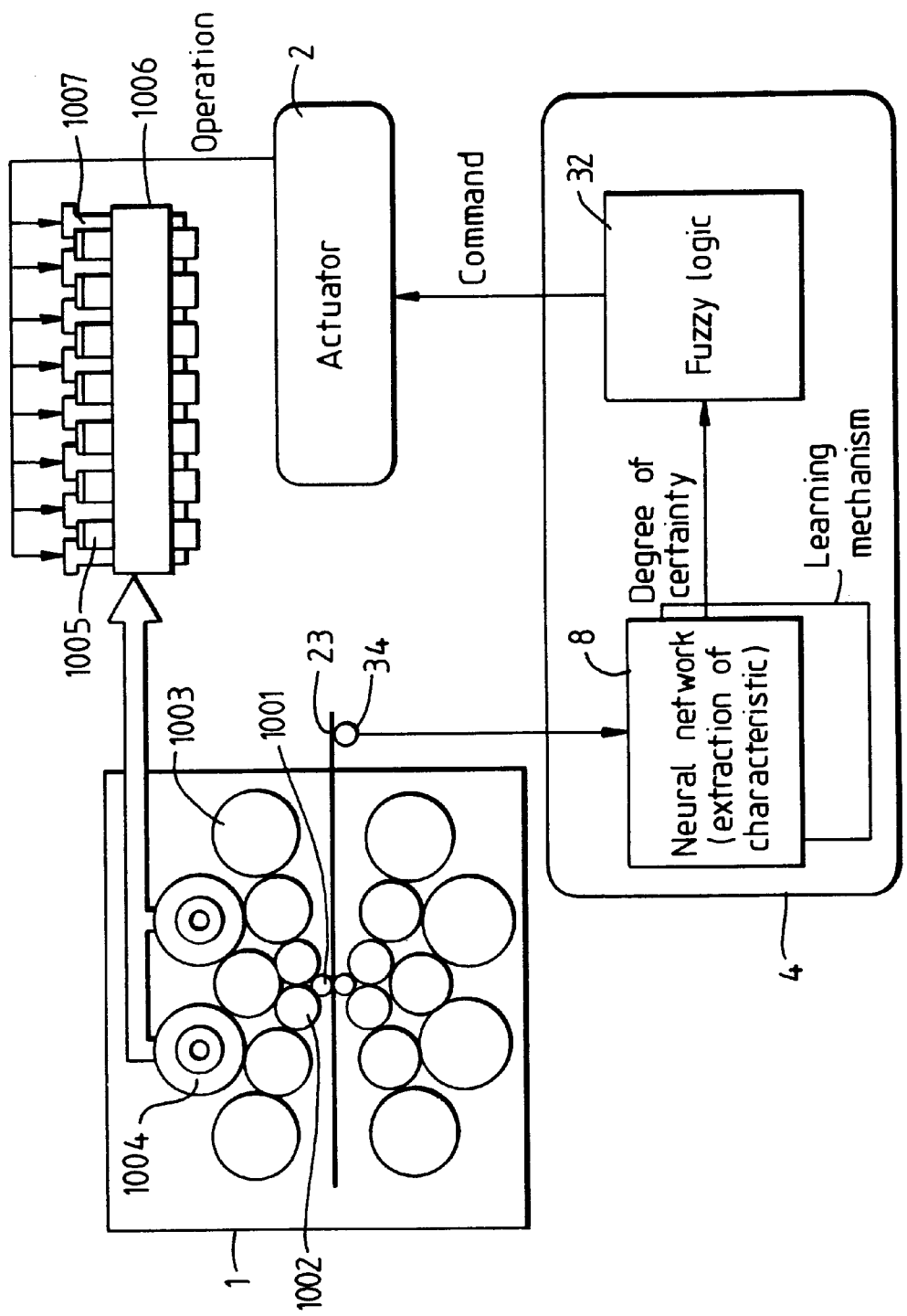

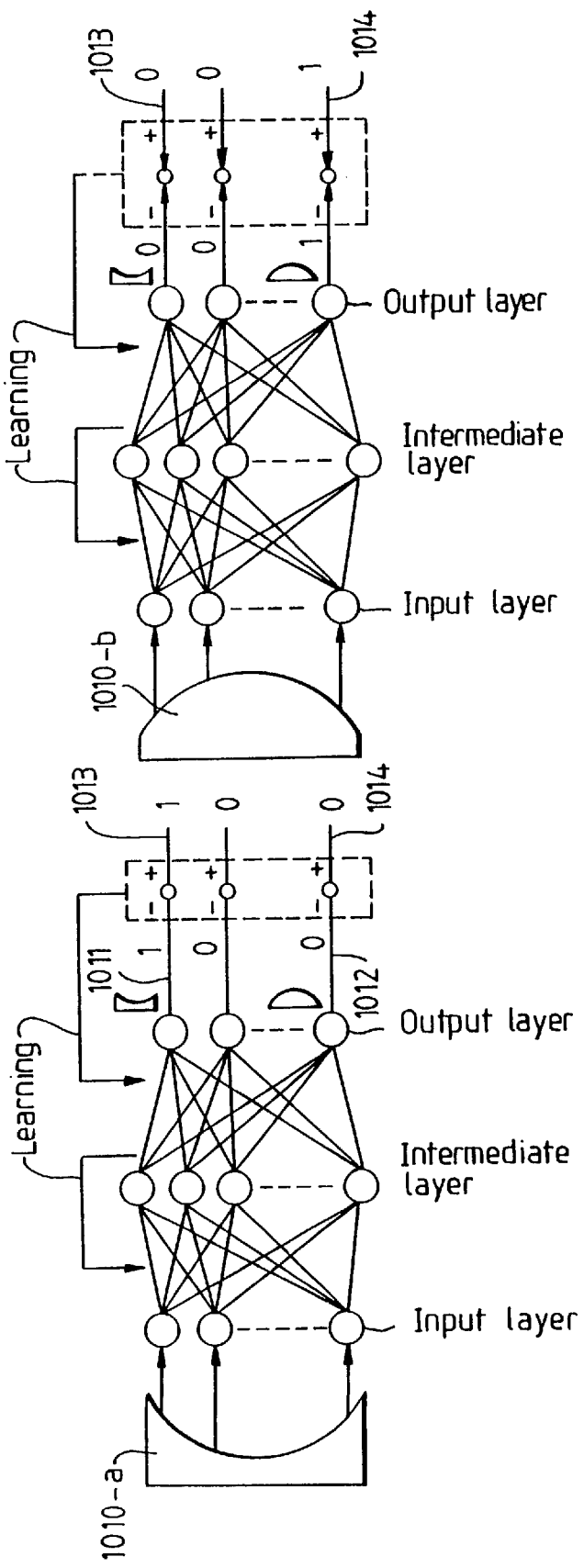

FIG.46
| | Shape pattern | Control pattern | Control method |
|---|---|---|---|
| 1 |  | 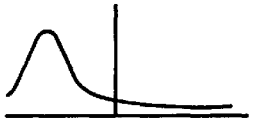 |  |
| 2 |  |  | 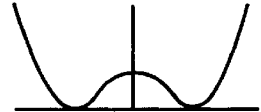 |
| 3 | 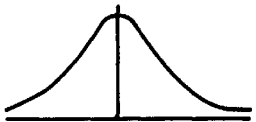 |  |  |
| 4 |  |  | 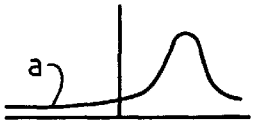 |
| 5 |  |  |  |
| 6 | 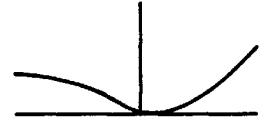 | 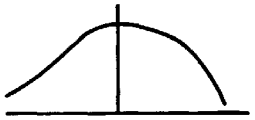 |  |
| 7 |  |  | 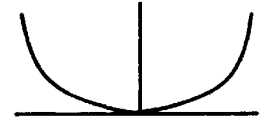 |
| 8 | 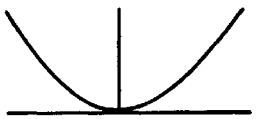 |  |  |
Desired space
$\Delta\varepsilon = \varepsilon - \varepsilon_{ref}$. Lateral ----------

Degree of upper assurance AS-U roll

Degree of lateral shift

CONTROL DEVICE FOR CONTROLLING A CONTROLLED APPARATUS, AND A CONTROL METHOD THEREFOR

This application is a continuation application of application Ser. No. 08/663,739, filed Jun. 14, 1996, now abandoned, which was a continuation of application Ser. No. 08/413,901, filed Mar. 30, 1995, now U.S. Pat. No. 5,541,832, issued Jul. 30, 1996, which is a continuation of application Ser. No. 07/710,124, filed Jun. 4, 1991, now U.S. Pat. No. 5,430,642, issued Jul. 4, 1995.

BACKGROUND OF THE INVENTION

1. Field of the Invention

The present invention relates to a system in which a control device controls a controlled apparatus. It is particularly, but not exclusively, concerned with such a system in which the controlled apparatus is a rolling mill. The present invention relates to such a system, to a control device for such a system and also to a method of control using such a system.

2. Summary of the Prior Art

With increasing use of computerisation, devices for controlling a controlled system such as a rolling mill have become more complex. Such devices monitor the signals from the controlled apparatus, corresponding to operating conditions of that apparatus, and the devices apply appropriate control strategies.

In existing systems, the control devices are localised in that they only consider one, or a limited number, of parameters. Thus, the control operation carried out by one control device may then affect parameters controlled by another control device, leading to inefficient control.

Furthermore, although control strategies may be developed, the control by known controlled devices is relatively inflexible, and they cannot readily adapt to changing conditions in the controlled apparatus. Thus, to take the example of a rolling mill, steel sheets of a desired thickness are obtained by controlling the nip spacing between opposed rolls, and also by controlling the tension applied. However, changes occurring during the rolling process, and also changes in various mechanical conditions, make it difficult to establish satisfactory control. Furthermore, it can readily be appreciated that the various factors affecting the steel sheet are interrelated, so that control of one parameter will affect the control needed for another parameter.

SUMMARY OF THE PRESENT INVENTION

In DE-A-4008510.4, corresponding to U.S. Pat. No. 5,066,518 issued Nov. 19, 1991, a system was described in which a control device controlled an apparatus being a rolling mill. In that earlier application, the various parameters of the rolling mill were established by control of actuators, and the operator of the control device established a plurality of patterns of operation for the various actuators. Each of these patterns, which were derived on the basis of the experience of the operator, established particular control strategies for all, or at least some, of the actuators of the rolling mill, so that each represented a particular control strategy as applied to substantially the whole of the mill, rather than just a part. Then, a fuzzy logic system combined selected ones of these patterns, and the actuation of the actuators was then controlled on the basis of that selection. The selection itself was based on signals received from the actuators. In this way, the fuzzy logic system combined strategies on the basis of the effect of that combination, thereby enabling more efficient control to be achieved. In subsequent discussion, the ideas discussed in DE-A-4008510.4 (U.S. Pat. No. 5,066,518 issued Nov. 19, 1991) will be referred to as the general principles underlying the present invention.

The present invention, however, seeks to develop further those general principles to improve the control that is achievable with a control device controlling a controlled system.

In general, control strategies will make use of feedback arrangements in which the signal derived from the part of the apparatus to be controlled which is being investigated (hereinafter "a variable operation device") is used to modify the control signal to the variable operation device. In principle, such feedback control should give satisfactory behavior. However, it can be noted that accurate feedback control depends on the feedback response being substantially linear in the region being controlled. Provided that the operating point ("set point") of the variable operation device does not vary significantly, and the aim of the control is to maintain the appropriate parameter of the variable operation device at a suitable set point, then the assumption that the feedback control will remain in the linear region is satisfactory. However, in more complicated control strategies, there is the risk that the operating point of the parameter of the variable operation device will move outside the linear region, as changes in the control strategy shift its set point. It has been appreciated that such changes then require modification of the feedback conditions.

Therefore, a first development of the present invention proposes that the relationship between the signal being fed to the variable operation device and the signal representing its operation is investigated, and a compensation signal is developed on the basis of that relationship. Then, the initial input to the feedback loop, or the signal to the variable operation device as appropriate, is further modified on the basis of the relationship. Thus, in this development of the present invention, the feedback loop effectively monitors itself, and changes the nature of the feedback signal in dependence on changes in the operating conditions. Thus, such a feedback arrangement can respond to changes in the physical conditions of the apparatus being controlled, without requiring wholly new control strategies to be applied by the operator. In the subsequent discussion, this development of the present invention will be referred to as "set point control".

It can be appreciated that, for a given operating point of a parameter of the variable operation device, it can be assumed that the feedback arrangement will be linear for variations of that operating point within a predetermined range, and therefore there is no significant benefit in modifying the feedback signal for variations which are smaller than a predetermined amount. However, when that predetermined amount is exceeded, so the operating point "set point" of the system has moved close to, or outside, the limit of the linear range, then the first development of the present invention may then take effect to modify the set point as discussed above. In a further modification of this first development, a plurality of possible modifications of the feedback loop may be generated, and then these combined by fuzzy logic on the basis of the signal received. In this way, the feedback loop may decide on the basis of fuzzy logic which of a number of possible modifications to its set point represent the optimum, on the basis of the effect of those modifications, so that modification applied may approach more closely to that which gives the best control strategy.

In DE-A-4008510.4 (U.S. Pat. No. 5,066,518 issued Nov. 19, 1991), it was proposed that a fuzzy logic system selected one or more of a plurality of control patterns pre-determined by the operator, to achieve satisfactory control. It has now been appreciated that such an arrangement may be combined with the idea of automatically generating further possible control patterns, and then adding those new control patterns into the fuzzy logic selection. This therefore represents a second development of the present invention, which will be referred to as "machine learning".

In such machine learning, the system will normally first be operated using only control patterns pre-set by the operator. However, as the system is operated, a suitable analysis means analyses the effect of each pre-set control pattern, in terms of its effect on the system and on the operation signals from the variable operation device(s) of the system. It then may derive additional patterns. Such additional patterns may be derived, for example, by neuro computer techniques. Once that has been done, the system operates on the basis of both the pre-set control patterns and on the new control patterns derived automatically. A fuzzy logic system then selects among those patterns and applies the appropriate control strategy. Indeed, it can be appreciated that, after sufficiently long operations, the pre-set patterns may be wholly superceded by patterns which have been automatically generated, so that the system is operating entirely on the "learned" patterns.

It can be readily be appreciated that the first and second developments of the present invention may be considered independent, or may be combined together in a single control device.

Indeed, it may be appreciated that the first and second development of the present invention represent alternatives within a more general idea, which is the idea of establishing at least one pre-set operation pattern, generating a pre-set command signal to an operating means of a variable operation device, modifying the pre-set command signal, determining the relationship between the signal to the operating means of the variable operation device, and the resultant operation of the variable operation device, and further modifying the signal to the operating means of the variable operation device on the basis of that analysis. This concept therefore represents a first aspect of the present invention.

In that first aspect, when applied to the first development of the present invention, the initial modification of the pre-set command signal is represented by the feedback loop operating in the normal way, in which the signal from the variable operation device is used to modify the signal to the variable operation device. Then, the relationship between the signals to and from the variable operation device may be investigated, and a further signal included in the feedback loop as a compensation signal which modifies the loop to change the set point of the feedback.

On the other hand, when the general concept of the first aspect of the present invention is applied to the idea of machine learning, the signal to the operating means of the variable operation device is represented by the output of the fuzzy logic system which combines pre-set operation patterns established by the operator. Then, the relationship between the signals to the operating means of the variable operation device and those corresponding to the operation of that variable operation device are investigated, to generate a compensation signal represented by the machined learnt patterns, which are then combined by the fuzzy logic system to modify further the signals to the operating means of the variable operation device.

Although the first aspect of the present invention discussed above is applicable to arrangements in which there is only a single variable operation device, it is particularly suitable for situations where there are a plurality of variable operation devices, and therefore in which the operation of one variable operation device may affect the operation of another variable operation device. For example, in a rolling mill, operation of one set of actuators affecting a pair of rollers may affect others. For example, actuators which are controlled so as to maintain parallel the nip between the rollers parallel may be affected by actuators which affect the spacing of that nip.

Furthermore, in such a more complex system, the control device effectively establishes control patterns for control of the variable operation devices, and, in a similar way, the devices monitoring the operation of those variable operation devices will themselves generate output patterns. Thus, it is desirable to be able to monitor those patterns efficiently. Therefore, a second aspect of the present invention proposes that the control device be organised as a series of modules, each of which is designed to detect a particular sub-pattern, to generate a corresponding signal. If each sub-pattern is relatively simple, an appropriate control strategy may be assigned to that sub-pattern. Then, when the pattern is analysed, a control strategy applicable to each sub-pattern thereof may be generated. In the simplest case, those control strategies may then be summed, but in the further development, they may be combined by fuzzy logic, in a similar way to the fuzzy logic arrangements discussed earlier.

It can particularly be appreciated that the second aspect of the present invention, which will be referred to as "serial control", may be used in combination with the ideas of set point control and machine learning as discussed earlier, but is an independent aspect of the present invention.

Finally, it should be noted that DE-A-4008510.4 (U.S. Pat. No. 5,066,518 issued Nov. 19, 1991) described the application of the general principles to a rolling mill. In the present application, further applications of the general principles are discussed, representing a third aspect of the present invention. Of course, any of those further developments may be combined with any combination of the aspects relating to set point control, machine learning, and serial control.

It should be noted that the present invention relates to a system comprising a control apparatus and a control device for controlling that control apparatus, to the control device itself, and to a method of controlling a controlled apparatus.

BRIEF DESCRIPTION OF THE DRAWINGS

Embodiments of the present invention will now be described in detail, by way of example, with reference to the accompanying drawings in which:

FIG. 6 is a schematic block diagram of a knowledge database;

FIG. 18 shows an example of an input pattern for input to the pattern recognition mechanism of FIG. 3;

FIG. 19 illustrates the output from the pattern recognition mechanism of FIG. 3;

FIG. 25 illustrates an embodiment of the present invention, incorporating machine learning, as applied to a sendzimir mill;

FIGS. 27a, 27b, 27c, 27d illustrate examples of machine learning using a neuro computer;

FIG. 46 illustrates alternative patterns, and the control methods applied therefor;

DETAILED DESCRIPTION

A—General Principles

Figure 1:
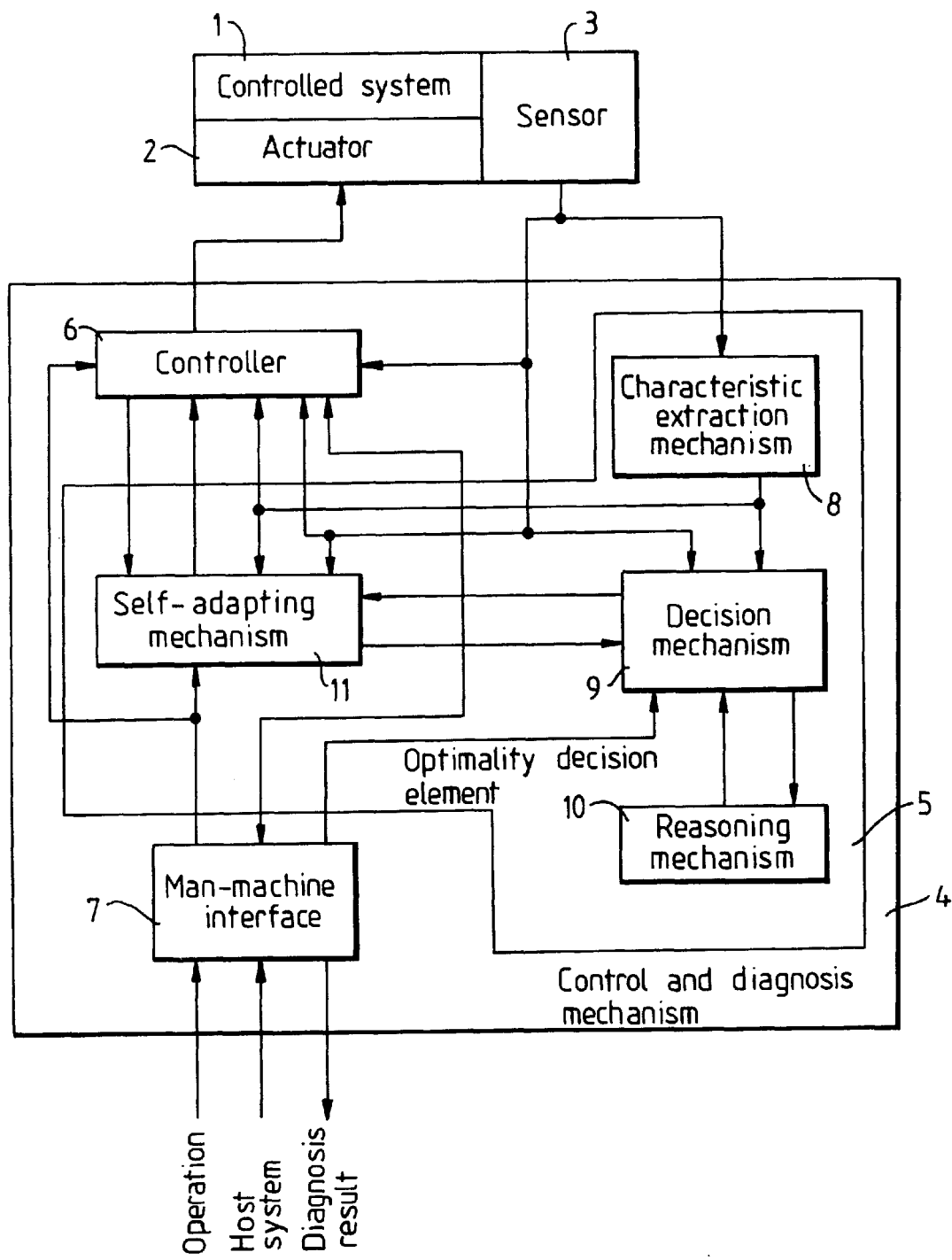
FIG. 1 is a schematic block diagram of an arrangement illustrating the general principles underlying the present invention.

Referring to FIG. 1, there is shown a control system in which the present invention may be used.

A controlled system has therein one or more actuators 2 and a sensor 3 for detecting the operating conditions of the controlled system 1 and the actuator or actuators 2. The output from the above-mentioned sensor 3 is sent to a control and diagnosis mechanism 4, which is then controlled to generate a command to perform control for each actuator. The above-mentioned control and diagnosis mechanism 4 is composed of an optimality decision element 5 for generating commands for controllers 6 in response to the output from the sensor 3, the controllers 6 for using the above-mentioned commands and the output from the sensor 3 to generate commands to perform control for the actuator or actuators 2 and a man-machine interface 7 for handling the input of information from a host system or the operation by the operator and for generating the result of a diagnosis.

The above-mentioned optimality decision mechanism 5 is composed of a characteristic extraction mechanism 8 for extracting characteristics from the output from the sensor 3, a decision mechanism 9 for using the output from the above-mentioned characteristic extraction mechanism 8 and from the above sensor 3 to decide about control methods, control parameters, control algorithms, etc. on the basis of the knowledge stored in advance in memory, a reasoning mechanism 10 for reasoning on the basis of the conclusion obtained in advance by the above-mentioned decision mechanism 9 because of new operation being time-consuming by the decision mechanism 9 and a self-adapting mechanism 11 for deciding about commands to perform control provided by the above-mentioned controllers 6 and for changing control commands in response to the request by the above-mentioned man-machine interface 7.

By contrast, conventional systems, in the absence of the optimality decision element 5, information obtained by the sensor 3 is in general sent from the controllers 6 and then used for individual control for each actuator. Therefore, with them it has been impossible to ensure optimality as a whole system. Addition of the optimality decision element 5 for deciding about optimality as a whole system as in this embodiment of the present invention provides the advantages of not only deciding about optimality as a whole system but flexibly handling any change in an actuator or actuators and the controlled system.

Now, a control system will be described in reference to FIG. 2 by using as an example an application thereof to the control of a rolling mill.

A rolling mill which is the controlled system 1 produces a steel sheet of a desired thickness by using compressive forces acting between a pair of work rolls 22 facing each other and tension acting on the workpiece 23, that is, pressing and pulling to flatten out the workpiece 23 placed between the work rolls 22. The work rolls 22 are situated between intermediate rolls 24, and the intermediate rolls are between backup rolls 25. On the above-mentioned backup rolls 25, compressive forces are applied by a screw down controller 26 using pressure such as oil pressure. These compressive forces are transmitted through the contact between the backup rolls 25 and the intermediate rolls 24 to the intermediate rolls 24. The compressive forces transmitted to the intermediate rolls 24 are then transmitted through the contact between the intermediate rolls 24 and work rolls 22 and that between the work rolls 22 and the workpiece 23 to the workpiece 23 with the result that the compressive forces have caused plastic deformation to the workpiece 23 and flattened it into a product of a desired thickness. The work rolls 22, intermediate rolls 24 and backup rolls 25 are all used for the rolling process.

Now, the rolling width of the rolls 22, 24 and 25 is greater than the width of the workpiece 23, and compressive forces are applied on the rolls. This is why the rolls are deformed. In the case of a work roll 22, to be more specific, deformation is caused by compressive forces in that part of the work roll by which the roll is wider than the workpiece.

As a result, the edges of the workpiece 23 are unduly pressed, and the workpiece is shaped in cross section into a convex. In order to prevent this, a work roll bender 27 applies a work roll bending force $F_W$ to free the edges of the workpiece 23 from such pressure. In the same way, an intermediate roll bender 28 exerts an intermediate roll bending force $F_I$ on an intermediate roll 24.

Besides, an intermediate roll shifter 29 moves intermediate rolls 24 laterally so that the entire forces acting on the rolls 22, 24 and 25 can be made asymmetrical for the purpose of controlling the shaping of the workpiece in cross section.

On the other hand, the energy supplied to the rolling mill in order to operate is not all consumed in the plastic deformation of the workpiece 23, and part of it is changed into noise, vibration and heat. The energy changed into heat is discharged through the workpiece 23 and at the same time increases the temperature of the work rolls 22. This increase in temperature expands the work rolls, changing their diameter. Here, their diameters generally change unevenly. Therefore, in order to control the diameters of the rolls to keep them even, there are installed a plurality of nozzles (not illustrated) situated laterally and a coolant controller 30 for applying coolant to the work rolls 22 through the nozzles.

The shafts of the above-mentioned work rolls 22 are connected to a speed controller 31, composed of such units as an electric motor, for moving the workpiece 23.

The control system for the rolling mill is made up of a command generator 32 for generating commands for such actuators as the above-mentioned screw down controller 26, work roll bender 27, intermediate roll bender 28, intermediate roll shifter 29, coolant controller 30 and speed controller 31, a pattern recognition mechanism 33 for deciding which type of pattern the shape of the workpiece 23 falls into, outputting the degree of the certainty of a resulting pattern and sending it to the above-mentioned command generator 32, a shape detector 34 for detecting the thickness and shape of the workpiece 23 and outputting the result, a memory 35 for storing the output from the above-mentioned shape detector 34 and command generator 32 and a leaning mechanism 36 for using the information stored in the memory 35 to change in the learning process the parameters for the pattern recognition mechanism 33. Note that the controlled system 1 is composed of the work rolls 22, intermediate rolls 24 and backup rolls 25.

The actuators 2 include the compression controller 26, work roll bender 27, intermediate roll bender 28, intermediate roll shifter 29, coolant controller 30 and speed controller 31.

Figure 2:
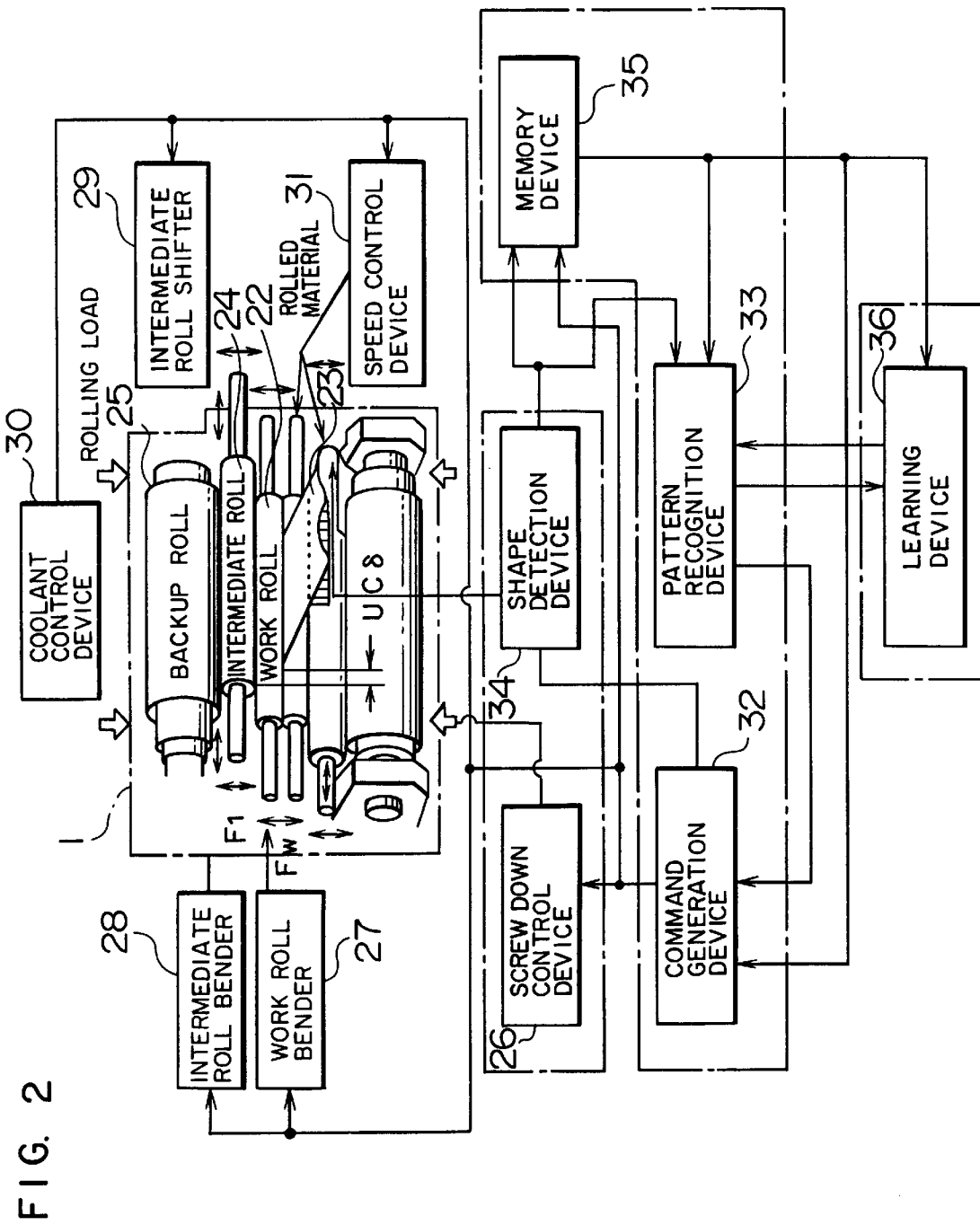
FIG. 2 shows an arrangement in which the general principles are applied to a control system for a rolling mill.

The sensor 3 is made up of the shape detector 34 and such detectors not illustrated in FIG. 2 as a speed detector, rolling load detectors, various position detectors, tension detectors and thickness detectors.

The control and diagnosis mechanism 4 is composed of the memory 35, command generator 32, pattern recognition mechanism 33 and learning mechanism 36.

Figure 3:
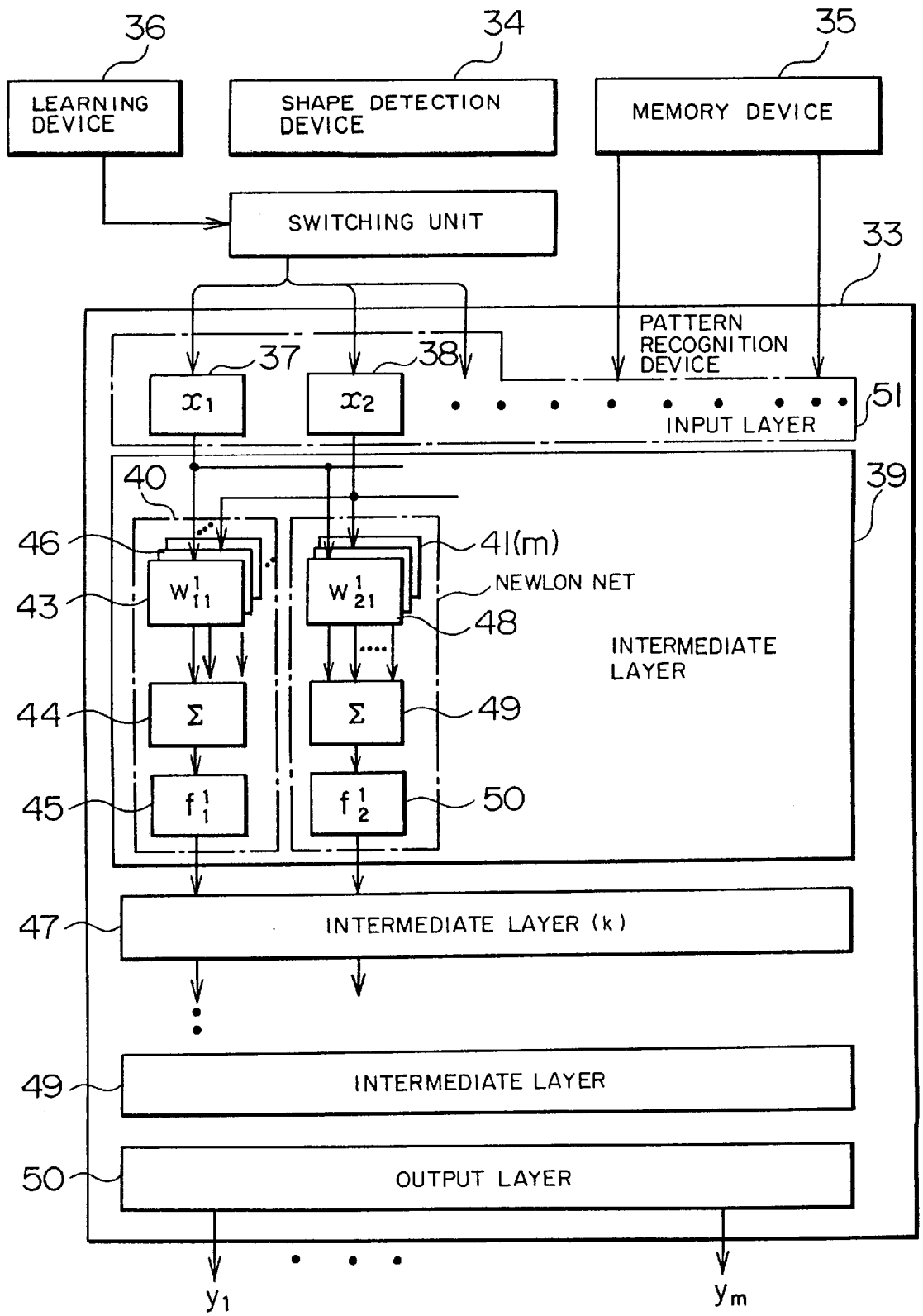
FIG. 3 is a block diagram of a pattern recognition arrangement illustrating the general principles of the present invention.

In FIG. 3, there is shown a detail view of the above-mentioned shape pattern recognition mechanism 33. The pattern recognition mechanism 33 has therein an input layer 51 made up of an input cells 37 and 38, an intermediate layer 39 connected to the input layer 51 and made up of cells 40 and 41 and intermediate layers 47 and 49 connected in series to the intermediate layer 39 and an output layer 50. The cell 40 contains weighting functions 43, 46 and an adder 44 and a function processor 45, and the cell 41 contains a weighting function 48 and adder 49 and function processor 50. The output from the shape detector 34 and the memory 35 is sent to the input cells 37 and 38 in the above-mentioned pattern recognition mechanism 33. The input cells 37 and 38 converts an input signal by using a function and outputs the result to an intermediate layer 39. The input cell output sent to the intermediate layer 39 is then sent to cells 40 and 41 in the intermediate layer 39. The signal output from the input cell 37 and sent to the cell 40 is enlarged $w^1_{11}$ times by a weighting function 43 and sent to an adder 44, while the output from the input cell 38 is sent through the process by a weighting function 46 to the adder 44. The adder 44 adds the output from the above-mentioned weighting functions 43 and 46 and sends the result to a function processor 45. The function processor 45 performs linear and non-linear function operations and sends the result to an intermediate layer 47 at the next stage.

In the same manner, to the cell 41 the output from the input cells 37 and 38 is sent, and the output from the input layer 37 is enlarged $w^1_{21}$ times and sent through an adder 49 and a function processor 50 to the intermediate layer 47 at the next stage.

The intermediate layer 47, constructed in the same way as the intermediate layer 39, uses the output from the intermediate layer 39 instead of that from the input layers 37 and 38.

Here, let the weight of the weighting functions 43, 46 and 48 be $w^k_{ij}$. Then, w is the weight to which the j-th output in the (k−1)-th intermediate layer (input cell when k=1) is applied in the i-th cell in the k-th intermediate layer.

As understood from the above, the signal sent to the pattern recognition mechanism 33 is output via the input cells 37 and 38 and the intermediate layers 39, 47 and 49 and via an output layer 50 taking the form of an intermediate cell having no weighting functions nor adders. The input layer 51 includes all the input cells 37 and 38.

This pattern recognition mechanism 33 is characterized by its capability of high-speed operation because of the use of simple product sum operations, not of such repetitive operations as feedback and, when each product sum term in intermediate layers is handled by hardware, because of the parallel processing in these product sum operations.

Command values for each actuator may be stored next to this pattern recognition mechanism output layer 50 in advance in accordance with each output pattern in order to directly give actuators command values closest to output patterns. Though quickening response, this provides control accuracy a little lower than the method which will be described later.

Figure 4:
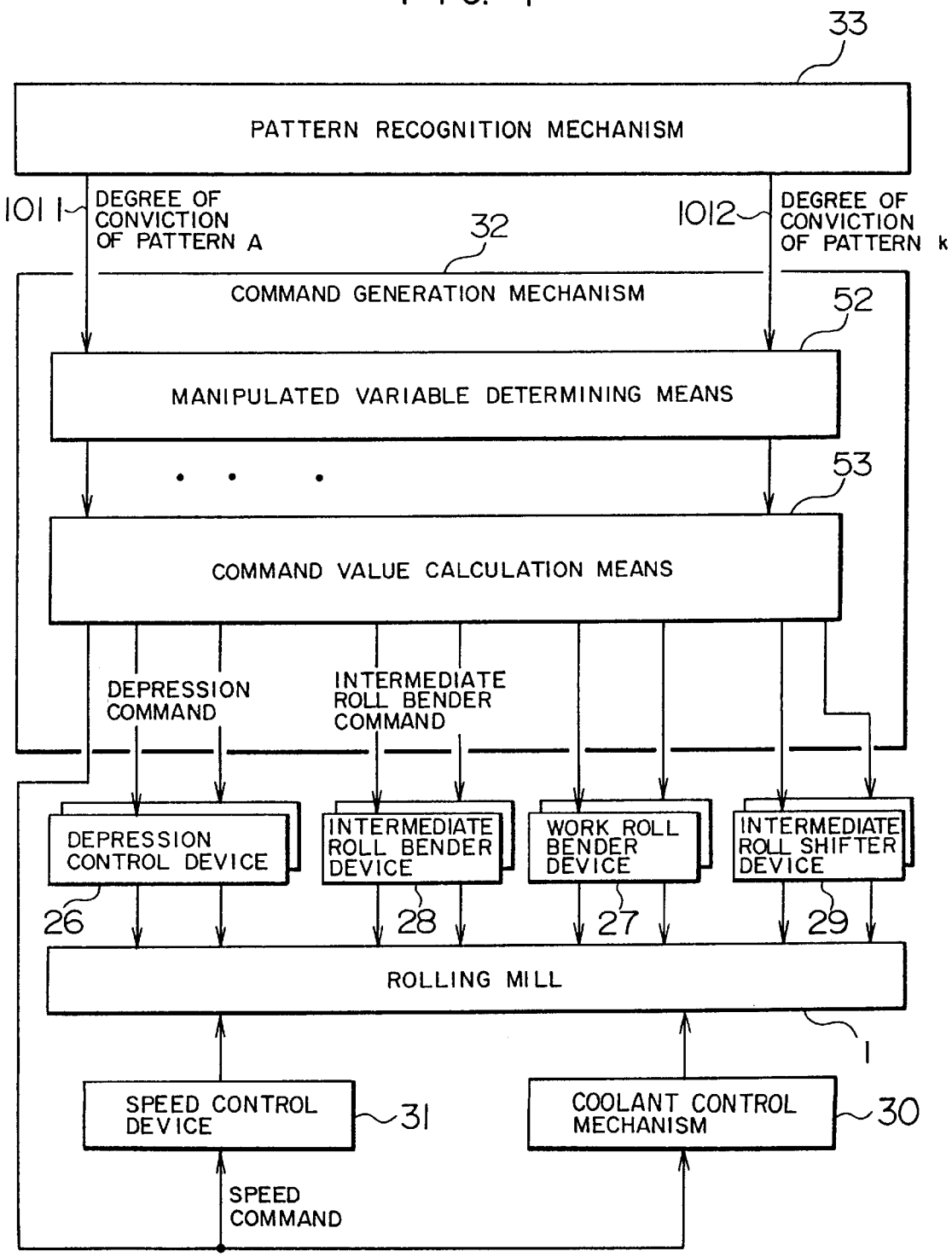
FIG. 4 is a block diagram of a command generator.

Now, the result of the processing by the pattern recognition mechanism 33 is sent via the command generator 32 shown in FIG. 4 to the rolling mill, that is, the controlled system 1. To be more concrete, the output from the pattern recognition mechanism 33 is sent to a manipulated variable decision means 52 installed in the command generator 32. The manipulated variable decision means 52 selects a process from a plurality of processes in the means 52 to handle an input signal most effectively, performs the process and outputs a manipulated variable. A command value calculation means uses the result of the processing by the above-mentioned manipulated variable decision means to generate such a command value for each actuator as a compression command for the screw down controller 26 and an intermediate roll bender command for the intermediate roll bender 28. To this command generator 32, the output from the shape detector 34 may be directly sent without the pattern recognition mechanism 33 in between, and then handled in the most suitable of all the plurality of processes in the generator 32. But in this case where various inference mechanisms are used in order to achieve a performance closest to the operation of specialized operators, there should be a sufficiently developed knowledge base in use for the control system.

Figure 5:
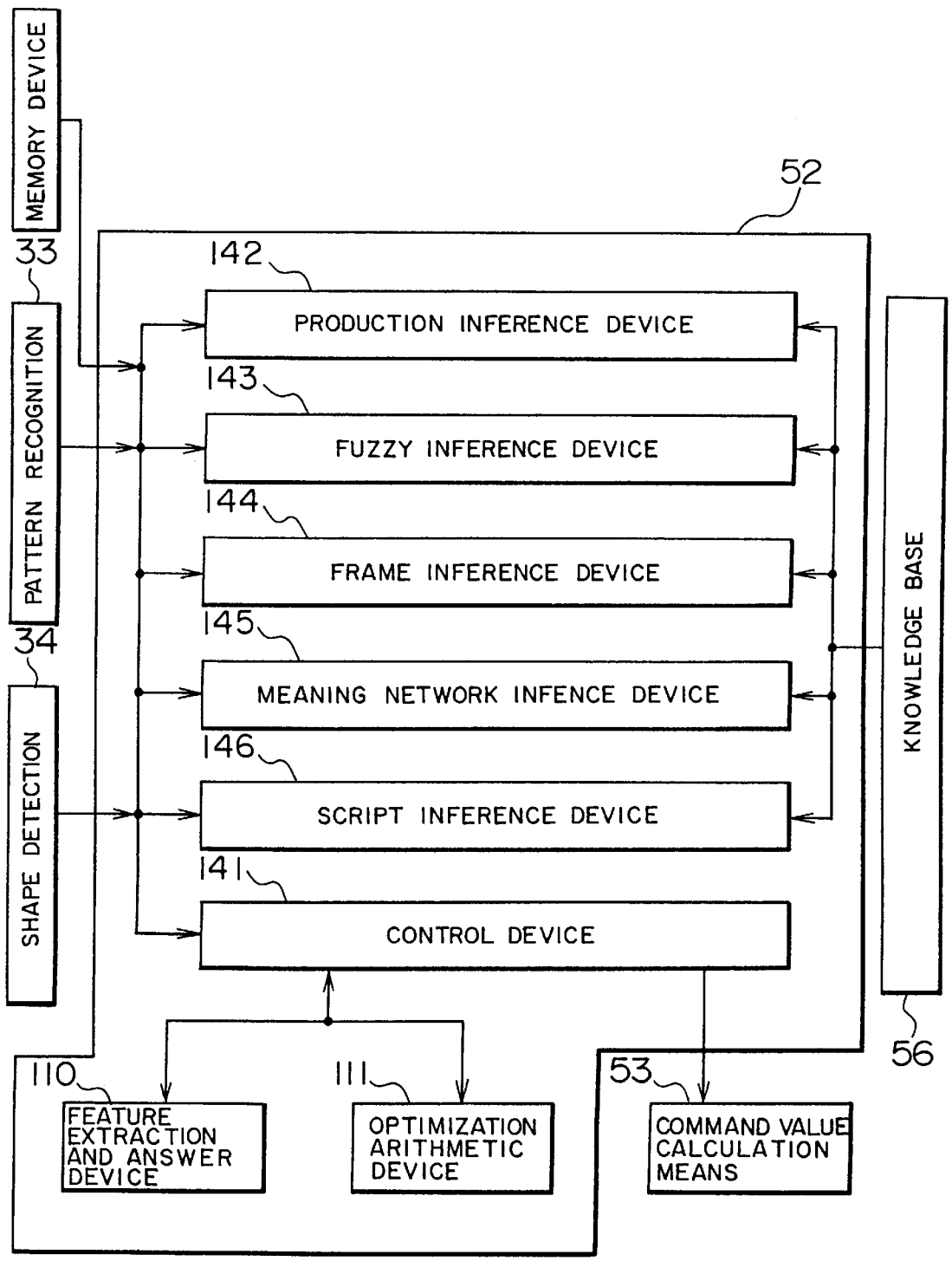
FIG. 5 is a schematic block diagram of a manipulated variable decision means which may be used in accordance with the general principles of the present invention.

FIG. 5 illustrates the composition of the above-mentioned manipulated variable decision means 52. The manipulated variable decision means 52 receives signals from the shape detector 34 and the pattern recognition mechanism 33, and then activates the controller 141. This controller 141 uses a knowledge base 56, depending upon the type of a problem, to decide which inference mechanism to activate. In other words, the controller 141 activates a production inference mechanism 142 when it is necessary to search for the cause of a problem in a syllogistic way, a fuzzy logic mechanism 143 when there is an ambiguous factor, a frame inference mechanism 144 when the problem has some structure and frame, a semantic nets inference mechanism 145 when the problem is like a network of relative items such as causes and effects and the configuration of devices and a script inference mechanism 146 when the problem relates to an object of a diagnosis which is in the process of moving in temporal order. For an empirical problem that the above-mentioned various inference mechanisms cannot solve, the controller 141 activates an optimization operation mechanism 111 for arriving at an optimal solution at high speed, and also activates a characteristic extraction and reply mechanism 110 (made up of a Rumelhart-type neurocomputer) capable of pattern storage, of extracting characteristics and so of handling problems which require replies. The result of the processing by the manipulated variable decision means 52 is output via the controller 141 to the command value calculation means 53.

FIG. 6 illustrates the composition of the knowledge base 56 which is knowledge needed for the inference operation. In this knowledge base 56, knowledge 106 based on the experiences of experts on the operation is stored after entered from outside and classified into these knowledge representation formalisms: a production rule 147 for drawing a syllogistic inference, a fuzzy rule 148 which is a knowledge representation formalism for drawing an inference on the basis of ambiguous information, a knowledge frame 149 which is a formalism capable of using certain frames such as the configuration of parts which are objects of a diagnosis, a semantic network 150 which is an organization in the form of a network of a relation such as one among parts and an obvious relation in everyday life, a script 151 for organizing and storing a job having diagnosis objects in sequential order before the job is carried out and miscellaneous knowledge 152 which cannot be represented by any of the above-mentioned formalisms 147 to 151.

Figure 7:
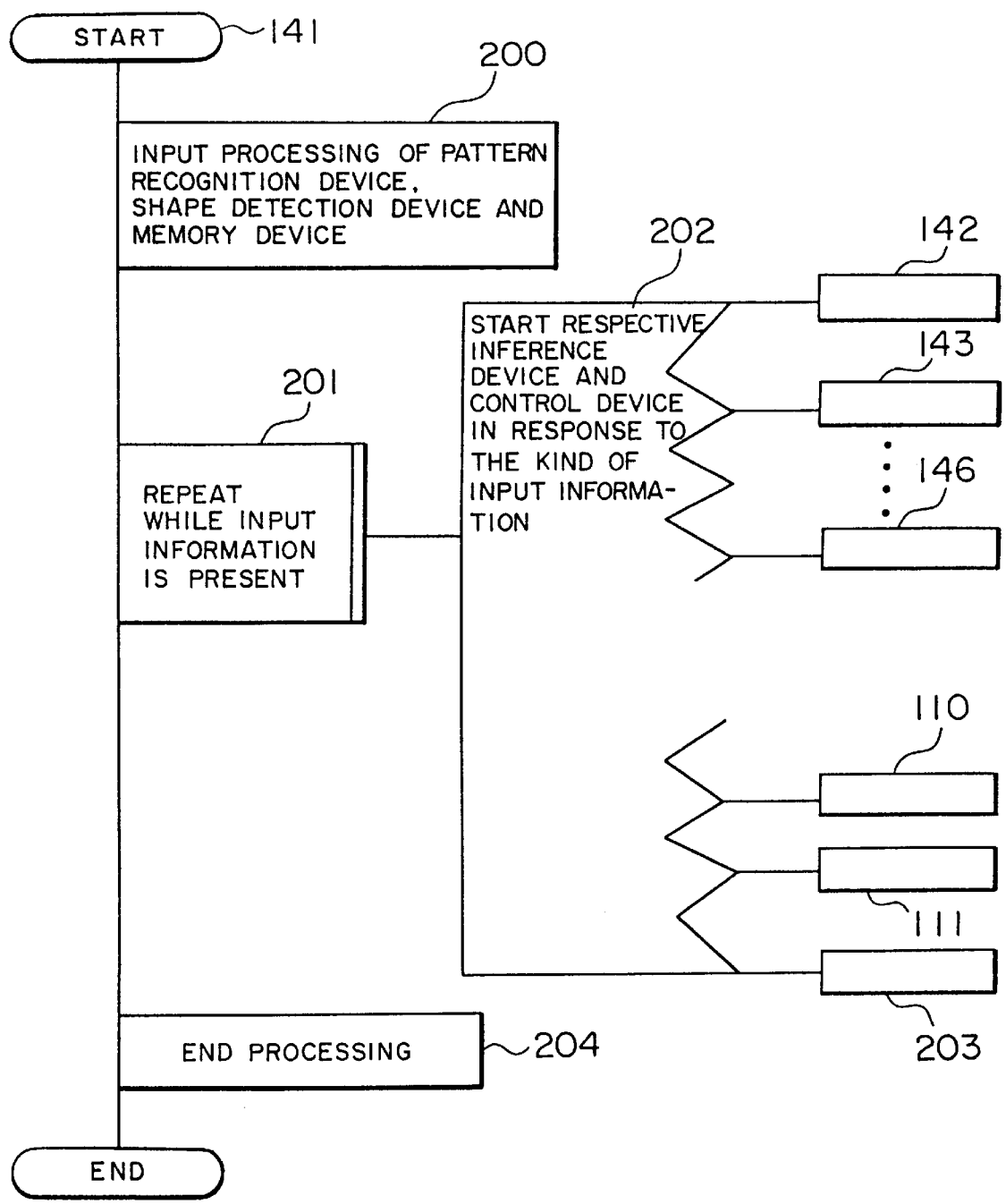
FIG. 7 is a flowchart illustrating the operation of the decision means of FIG. 5.

FIG. 7 is an explanatory illustration of the operation of the manipulated variable decision means 52. The processing by the controller 141 consists of a step 200 for organizing the information from the pattern recognition mechanism 33, shape detector 34 and memory 35 and converting the organized information into such data as can be used for the below processing, a repetitive processing step 201 for collecting and sending the data processed by the above-mentioned step 200 to the step 202 until running out of these data, a decision step 202 for deciding which inference mechanism and process to activate according to the information that the above-mentioned step 201 has collected, the inference mechanisms 142 to 146, the characteristic extraction and reply mechanism 110, the optimization operation mechanism 111, a general controller 203 for executing algorithms for classical control such as the PID control and modern control such as several variable control and a termination step 204 for such operation as flag reset necessary for terminating the above-mentioned steps.

Now, what these inference mechanisms are suitable for will be described. The production inference mechanism 142 is suitable for the control carried out by an expert operator using fragmentary production rules to establish logical relations. The fuzzy logic mechanism 143 is suitable for determining manipulated variables by processing an operator's ambiguous (qualitative) knowledge impossible to turn into quantities like that he should operate an actuator a little when the condition being considered of the controlled system changes so that such knowledge can be turned into quantities for the processing by computer.

The frame inference mechanism 144 is suitable for employing a knowledge representation formalism called frames used to represent such relation as that between controllers and, when the condition being considered of the controlled system changes, for determining manipulated variables for each device according to the relation between these devices so as to bring the controlled system back to the former condition.

The semantic nets inference mechanism 145 is a network resulting from systematic organization of the above-mentioned frames which are fragmentary knowledge. For this reason, it is capable of obtaining the influence of the operation of a particular actuator, and is suitable for implementing a compensation system.

The script inference mechanism 146 draws inference according to procedural knowledge for handling a particular situation, so it is suitable for such control as sequence control for which a certain procedure must be followed on an occasion like a failure.

The characteristic extraction and reply mechanism 110 is characterized in that, if the mechanism has been applied to learning so as to store the relation of the input patterns which are sent to the above-mentioned pattern recognition mechanism 33, shape detector 34 and memory 35 with the outputs which come from the above-mentioned inference mechanism 142 to 146 when the input patterns are entered to the system, this mechanism 110 is capable of processing and outputting a result at high speed unlike any of the inference mechanism drawing inference newly and then outputting the same result. Since the controlled system 1 usually tends to show nonlinearity, a change in its operating points due to some cause necessitates resetting of its operation. On these occasions, the optimization operation mechanism 111 uses algorithms such as ones used in the steepest gradient method, dynamic programming, linear programming, the down-hill method, the conjugate gradient method and Hopfield-type neurocomputers in order to give optimal responses to non-linear controlled systems.

Figure 8:
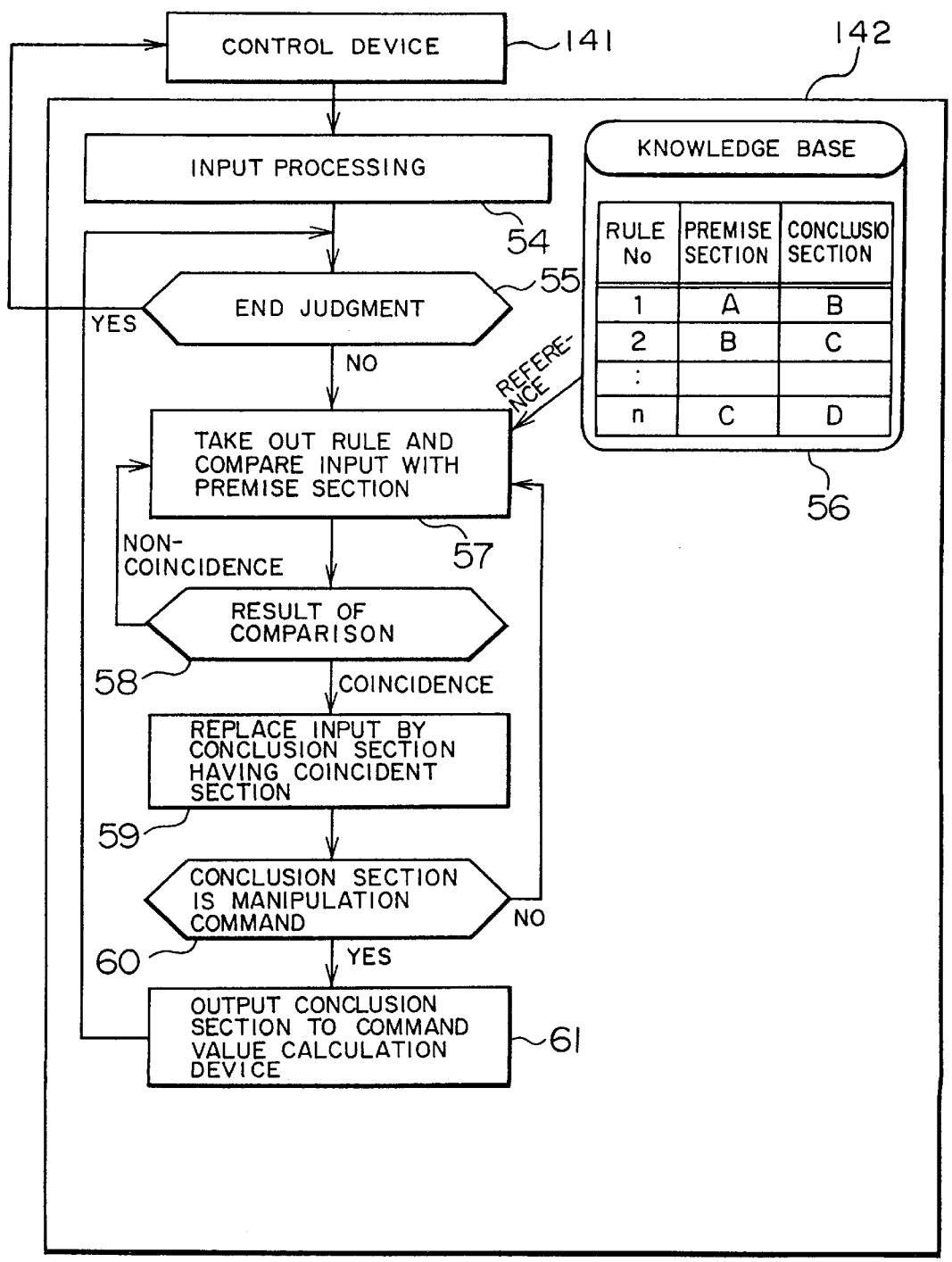
FIG. 8 is a flowchart illustrating the operation of an inference mechanism in accordance with the general principles of the present invention.

FIG. 8 is an explanatory illustration of the operation of the production inference mechanism 142. The production inference mechanism 142, activated by the controller 141, has therein an input processing step 54 for storing an input from the controller 141 in memory and a termination decision mechanism 55 for fetching a piece of information stored in the above-mentioned input step 54 one by one and, if there is no pattern information in memory, for terminating the processing by the production inference mechanism 142. The mechanism 142 then uses the types of patterns and their degree of certainty obtained by the above-mentioned termination decision mechanism 55 in order to fetch rules one by one from the knowledge base 56 and then at a step 57 compares the type of the pattern for the input with the premise of the rule. At a step 58, if the compared two agree with each other, the path to a step 59 is followed, and if they do not, the path to a step 57 is followed. At the step 59 for the agreement, the conclusion of the above-mentioned rule is replaced with the above-mentioned input. At this time the degree of certainty is replaced with the minimum or maximum value of certainty degree before the replacement as on the minimax principle. At a step 60, if the conclusion of the above-mentioned replaced rule is an operation command, the path to a step 61 and, if it is not, the path back to the step 57 is followed.

When the above-mentioned conclusion is an operation command, at the step 61 the degree of certainty obtained for the conclusion at the above-mentioned processing step is output to the above-mentioned command value calculation means 53.

Figure 9:
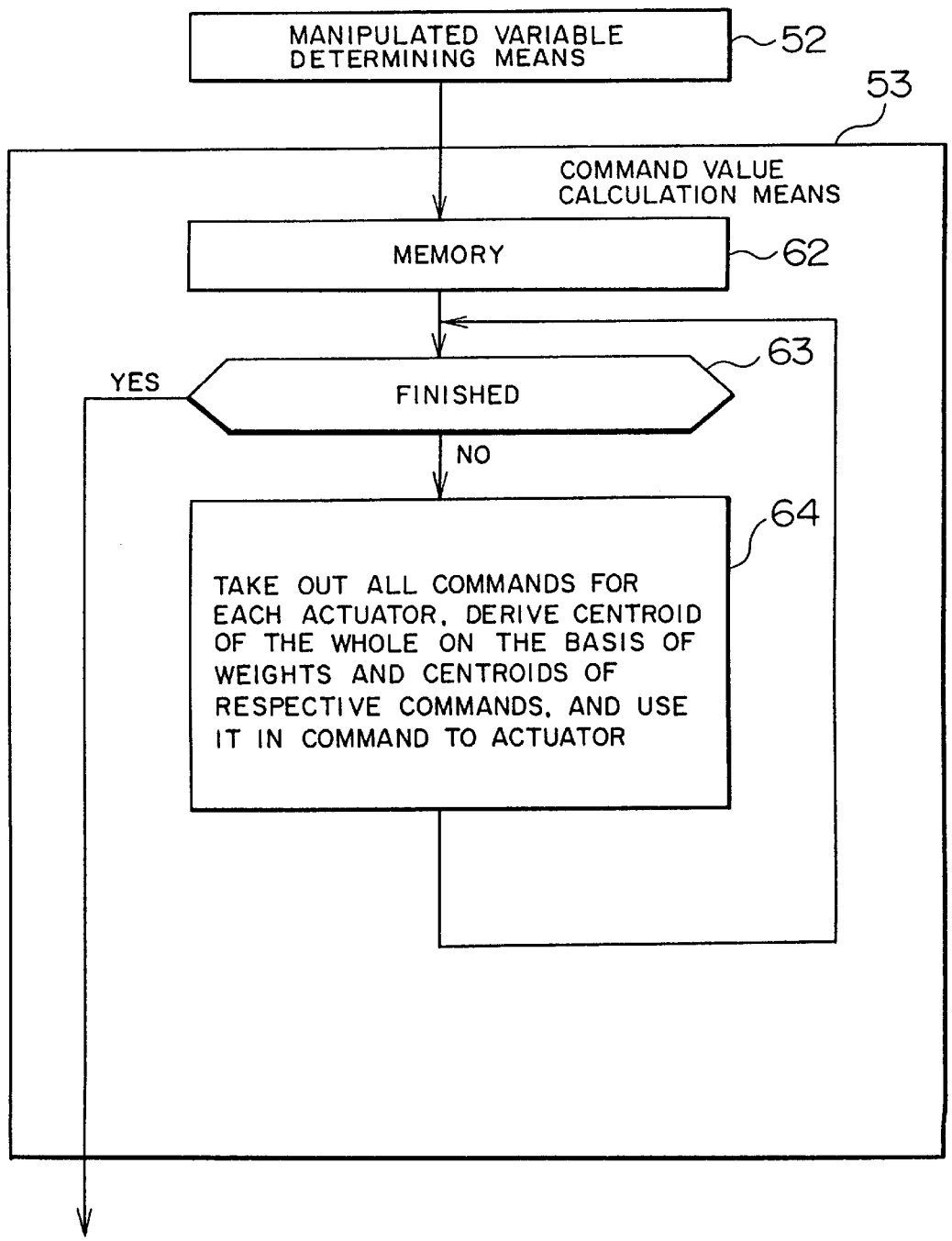
FIG. 9 is a schematic flowchart illustrating the calculation of a command value in accordance with the general principles of the present invention.

FIG. 9 shows the command value calculation means 53. This command calculation means 53 is composed of a memory 62 for storing a command resulting from inference and its degree of certainty obtained by the above-mentioned manipulated variable decision means 52, a step 63 for deciding whether or not all the commands in the above-mentioned memory have been processed and, if they have, for terminating the command value calculation means 53. If they have not, the path to a step 64 is followed at which a command for each of the screw down controller 26 and other actuators 27, 28, 29, 30 and 31 is fetched, the centers of gravity for an actuator is obtained by using the degree of the operation of the actuator and its degree of certainty obtained by inference mechanisms and then the centers of gravity for the actuator are collected to obtain a new gravity center and to use it as the command for the actuator.

The use of this command value calculation means 53 allows handling of those commands for actuators collectively which are obtained separately by the inference mechanisms 142 to 146, characteristic extraction and reply mechanism 110, optimization operation mechanism 111 and general controller 203, which characterizes this embodiment of the present invention.

Figure 10:
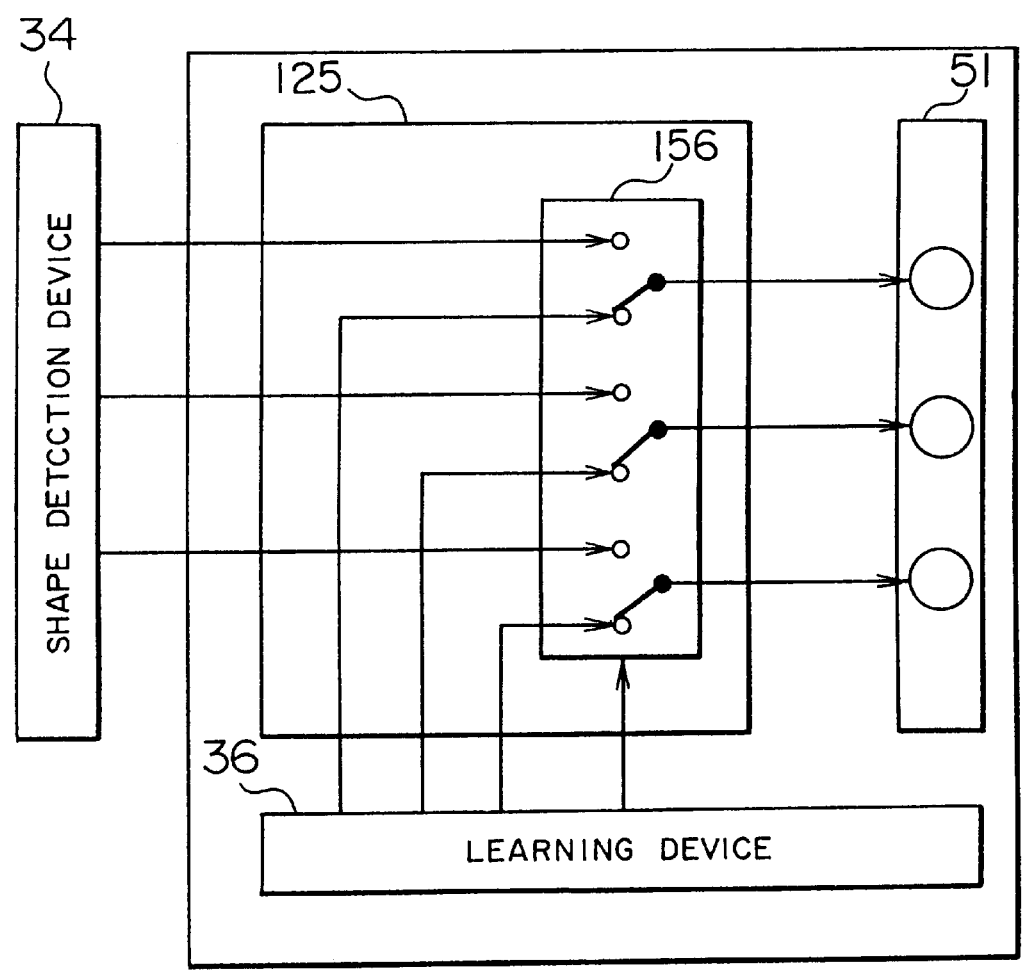
FIG. 10 is a schematic block diagram of an input switching device.

FIG. 10 illustrates the composition of an input switching device 125 needed for the above-mentioned learning. This input switching device 125 is for sending to the input layer 51 either the output from the shape detector 34 or that from a learning mechanism 36 by using a switch 156 controlled by the learning mechanism. The switching mechanism 156 shown in FIG. 10 is in the condition for learning.

Figure 11:
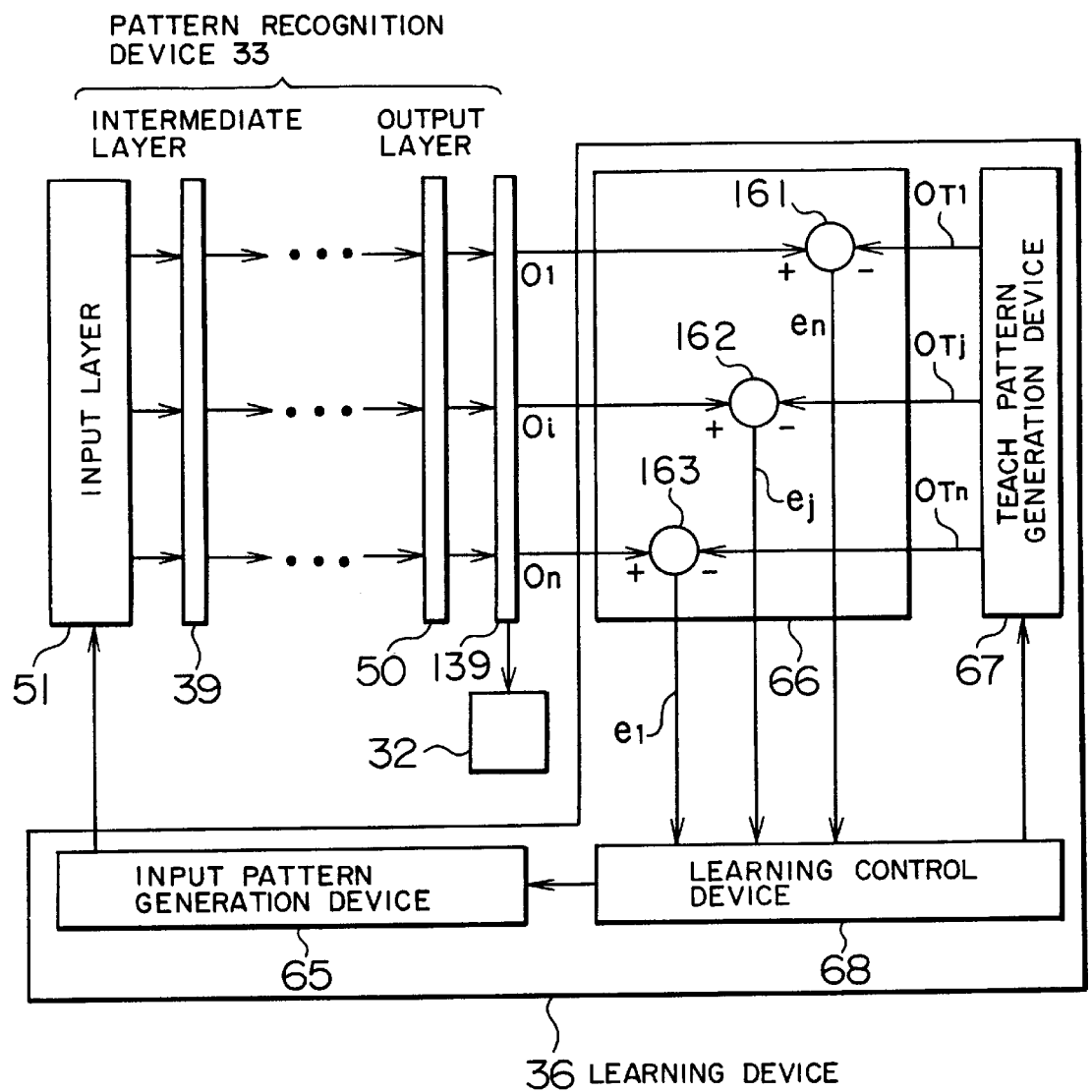
FIG. 11 is a schematic block diagram of a learning mechanism in accordance with the general principles of the present invention.

FIG. 11 illustrates the composition of the learning mechanism 36. This learning mechanism is composed of an input pattern generator 65, teach pattern generator 67, output matching mechanism 66 and leaning controller 68. The output matching mechanism 66 is for using adders 161, 162 and 163 to obtain as deviations $e_1$, $e_j$ and $e_n$ the respective differences between the outputs $o_{T1}$, $o_{Tj}$ and $o_{Tn}$ from the teach pattern generator 67 and the outputs $o_1$, $o_i$ and $o_n$ from a dispatcher 139 for outputting the output from the output layer 50 to the command generator 32 and to the above-mentioned output matching mechanism 66, and then the output matching mechanism 66 outputs the deviations to the learning controller 68. The outputs $o_1$, $o_i$ and $o_n$ from a dispatcher 139 are generated in response to the output from the input pattern generator 65 being sent to the input layer 51 situated in the pattern recognition mechanism 33 (a Rumelhart-type neurocomputer). At this time, these input pattern generator 65 and teach pattern generator 67 are controlled by the above-mentioned learning controller 68.

Figure 12:
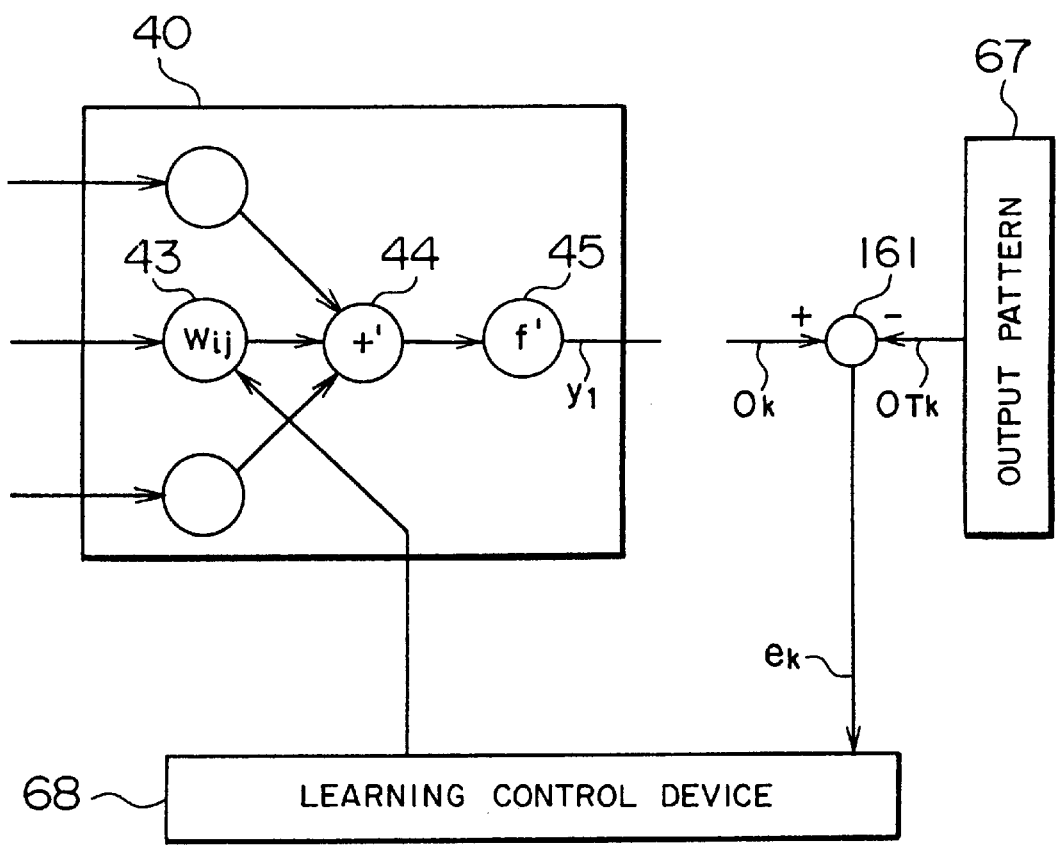
FIG. 12 illustrates the relationship between learning and a weighting function.

FIG. 12 illustrates the relation of the weighting function $w^1_{ij}$ 43 with the learning controller 68. By using the deviation $e_k$ output from the above-mentioned adder 161, the learning controller 68 changes the value of the weighting function $w^1_{ij}$ 43 in the cell 40, one of the cells composing the pattern recognition mechanism 33, so as to reduce the above-mentioned deviation.

Figure 13:
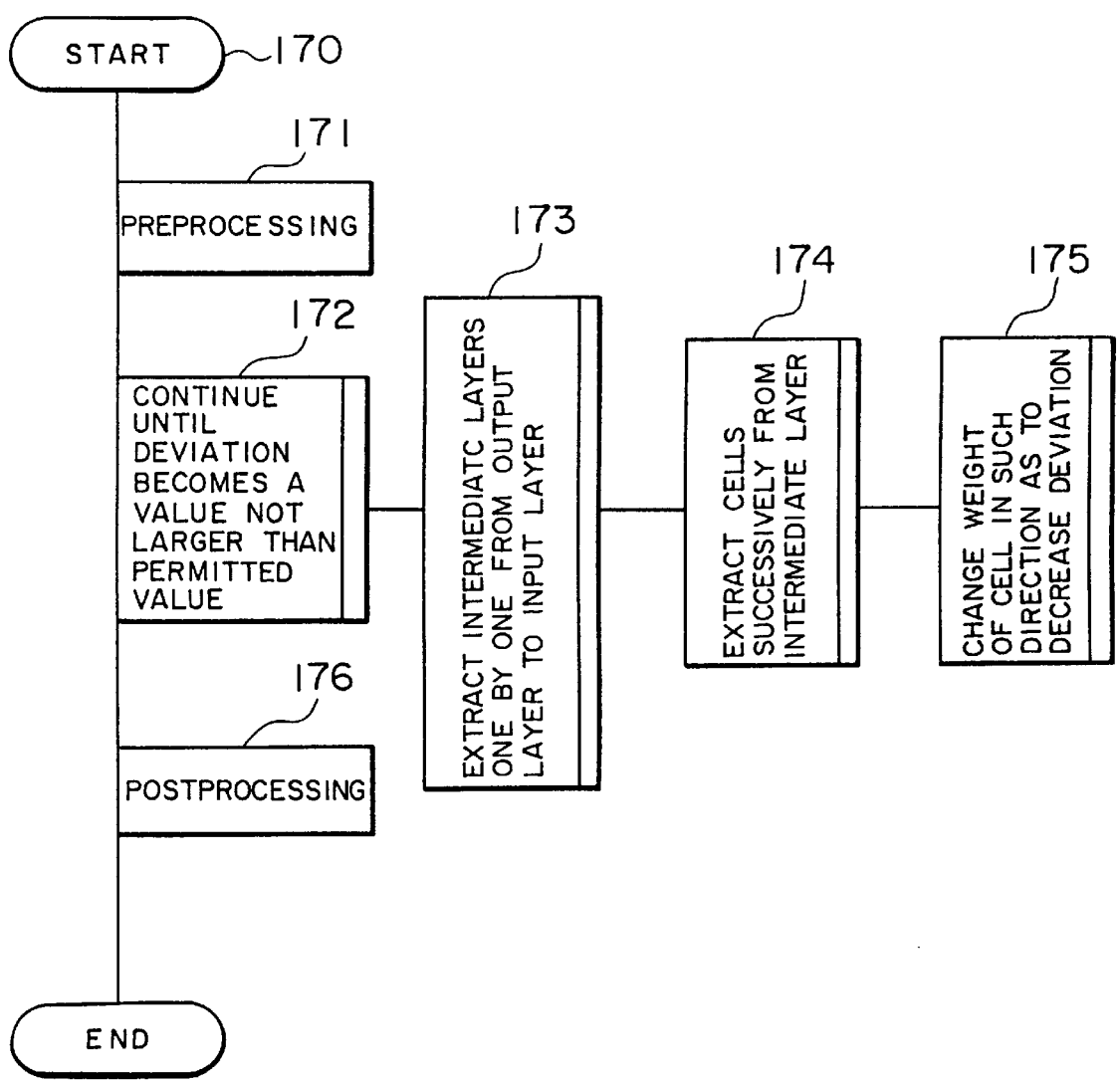
FIG. 13 is a flowchart illustrating the operation of the learning operation carried out by the structure of FIG. 12.

FIG. 13 shows the outline of a process 170 by the above-mentioned learning controller 68. When the learning mechanism 36 is activated, the process 170 by the learning controller 68 is started. This process 170 is composed of a preprocessing step 171 at which the above-mentioned input pattern generator 65 and the teach pattern generator 67 are activated to generate an input, which is a teacher signal, and a desired output respectively, a step 172 at which the path to its subsequent steps 173, 174 and 175 is followed until the value of the above-mentioned deviation $e_k$ or the square-sum of the deviation becomes acceptable, a step 173 for sequentially extracting intermediate layers being considered starting with an intermediate layer near the output layer 50 and ending near the input layer 51, a step 174 for extracting cells being considered in the intermediate layers, a step 175 for changing the weighting function $w^1_{ij}$ 43 for an extracted cell so as to reduce the deviation $e_k$ and a step 176 for terminating the learning process.

Thanks to the use of this learning mechanism, when an unexpected phenomenon has occurred and a measure for it is established, this control system which embodies the present invention is capable of using such a measure, which characterizes the embodiment of the present invention.

Figure 14:
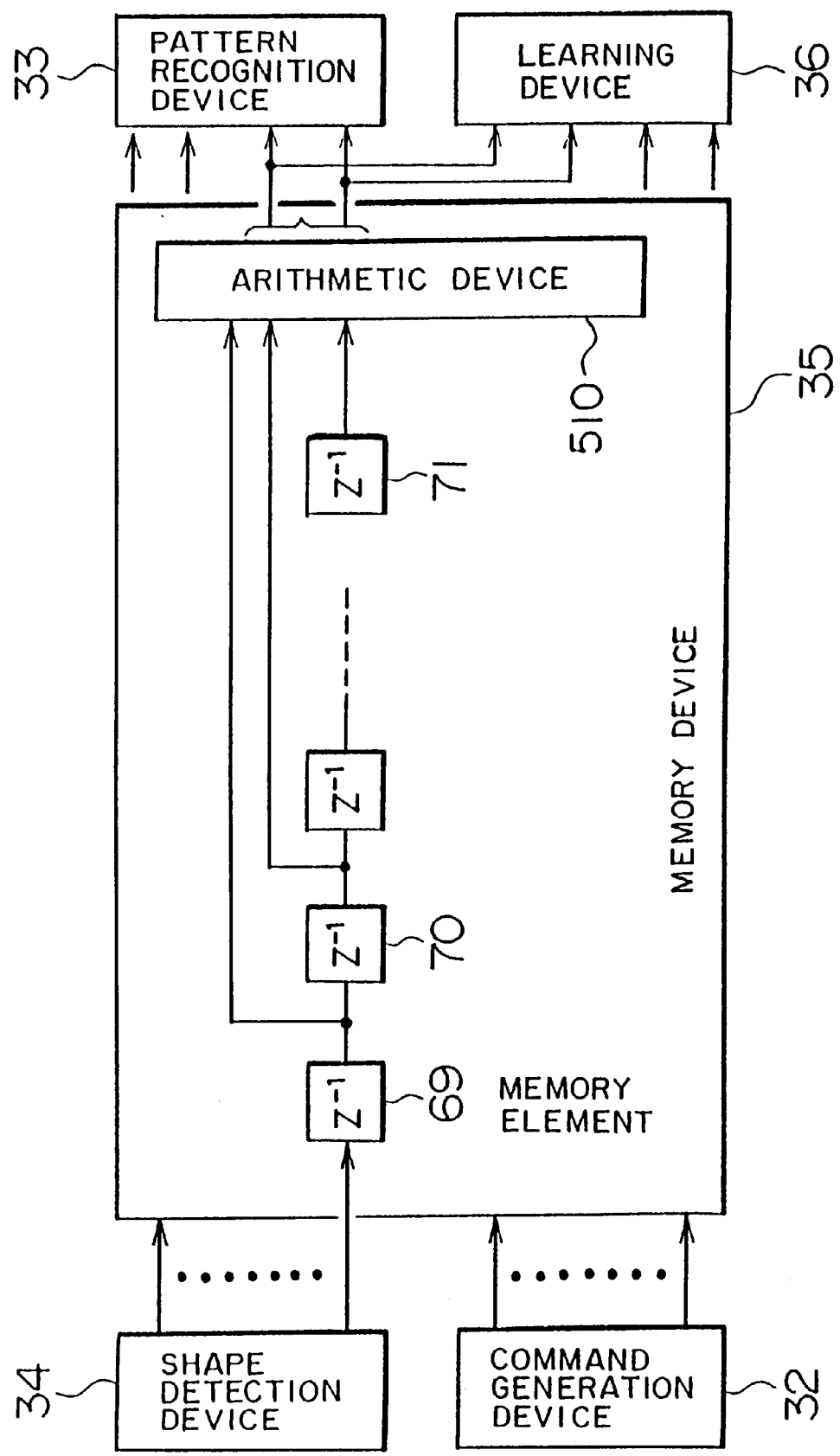
FIG. 14 illustrates schematically a memory structure which may be used in accordance with the general principles of the present invention.

FIG. 14 illustrates the composition of the memory 35 shown in FIG. 2. This memory 35 is composed of the command generator 32, a memory element 69 to which the output from the shape detector 34 is sent, a memory element 70 to which a certain period of time after the above the contents of the memory element 69 is transferred and a memory element 71 which is the last of the memory elements in a row through which data is transferred in a particular length of time. The contents of the memory elements 69, 70 and 71 are sent through an operation mechanism 501 for differentiating and integrating operations on patterns to the pattern recognition mechanism 33 and to the learning mechanism 36.

This memory 35 allows handling of the temporal change in the shape detector 34 and the command generator 32, namely, performing such operations as differentiation and integration.

Figure 15:
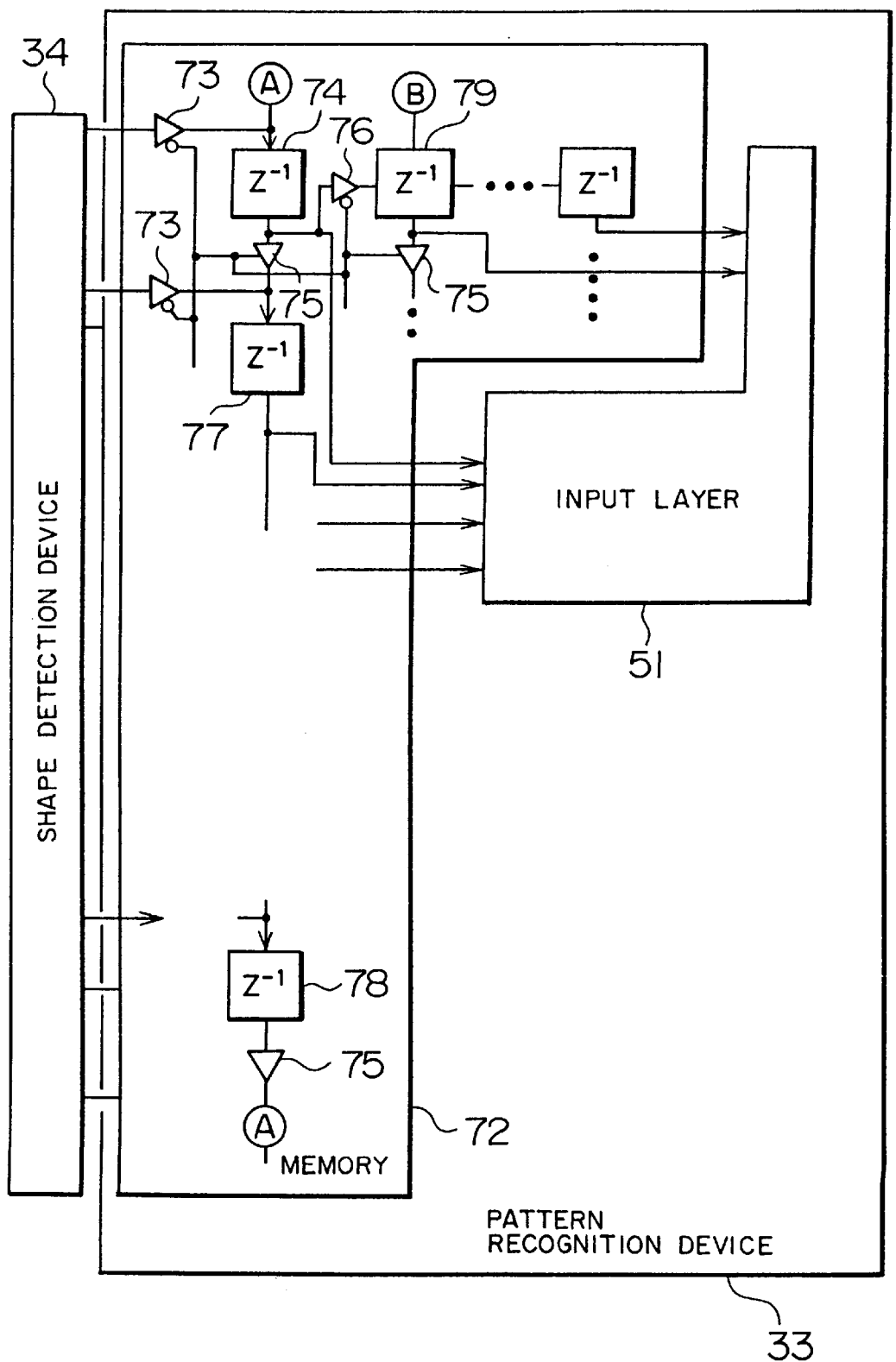
FIG. 15 illustrates in more detail the pattern recognition mechanism of FIG. 3.

FIG. 15 illustrates the mechanism in which, since the nozzles for controlling coolant have their influence only within a certain distance of their locations, patterns with regard to nozzles are recognized by using inputs relating to the influence around the nozzles. The output from the shape detector 34 is sent to the memory 72 for the pattern recognition mechanism 33, the signal input to the memory 72 is sent through a gate circuit 73 to a memory element 74 and the signal input to the memory element 74 is sent through gate circuits 75 and 76 to memory elements 77 and 78. When the gate circuits 73 and 76 turn off, the gate circuit 75 turns on, the information in the memory element 74, synchronized by a clock, being sent to the memory element 77. A certain period of time after that, the signal in the memory element 74 reaches the memory element 78, and the signal in the memory element 77 reaches the memory element 74. When the signals in the memory elements 74, 77 and 78 complete a circle and enter the next clock timing, the gates 73 and 76 turn on, and the gate 75 turns off. Then, the contents of the memory element 74 are stored in the memory element 79, and the information in the memory elements 74, 77 and 79 is input to the input layer 51.

The use of this memory 72 allows the system to be much more economical of the number of cells in the input layer 51, intermediate layers 39, 47 and 49 and output layer 50, which advantages this embodiment of the present invention.

Figure 16:
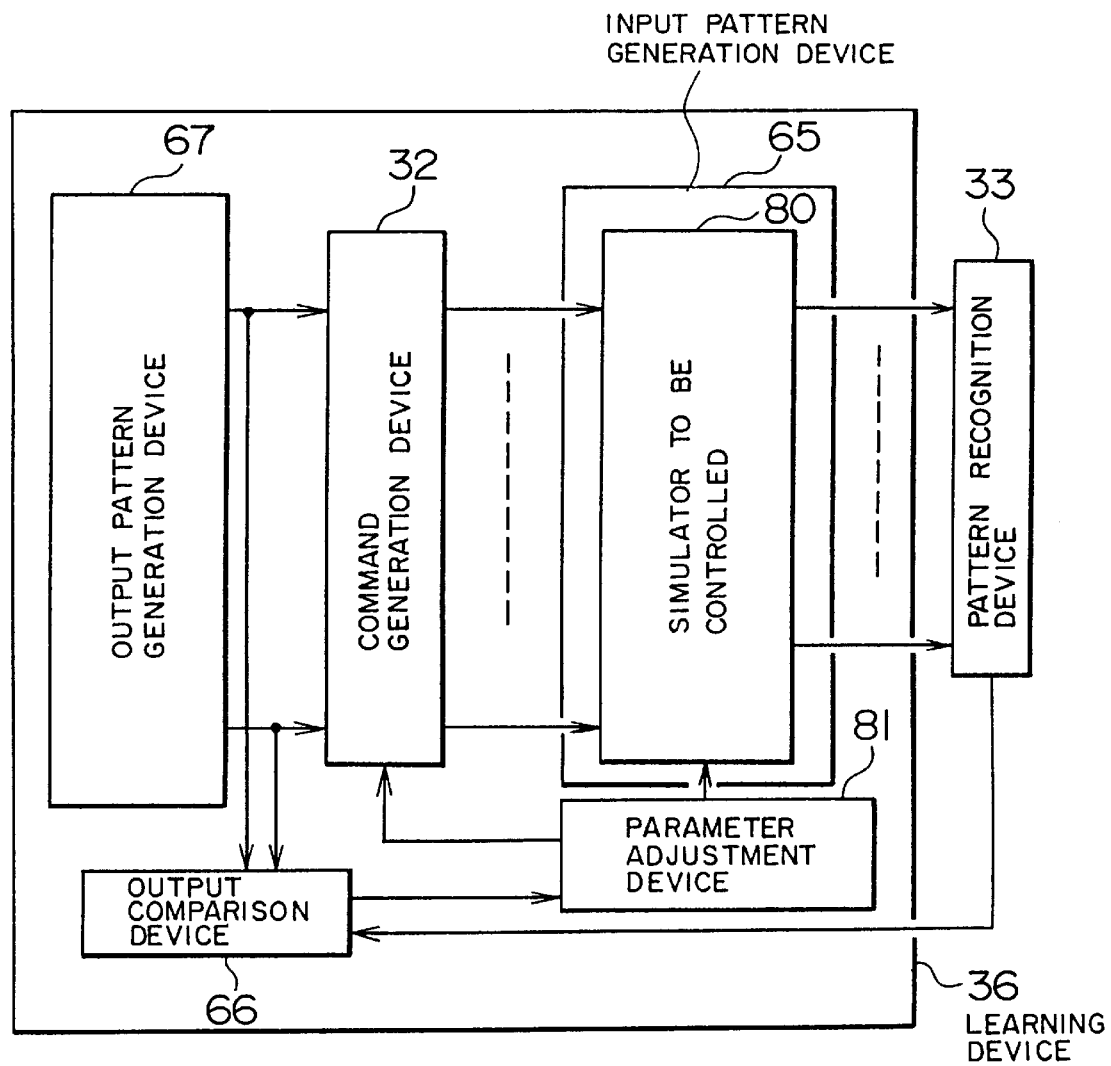
FIG. 16 is the modification of the learning mechanism of FIG. 11.

FIG. 16 shows an example of the learning mechanism 36 in which a controlled system simulator 80 is used for the input pattern generator 65 and teach pattern generator 67 thereof.

Shape patterns, generated in the teach pattern generator 67 by the operator's operation or data, are input to a command generator 32A which functions the same way as the command generator 32 shown in FIG. 2 and is provided for this learning mechanism. According to these patterns, the command generator 32A generates commands for actuators. Then, these commands are input to a controlled system simulator 80 to simulate the operation of the following controlled systems: the actuators 26, 27, 28, 29, 30 and 31 and the rolling mill, that is, the controlled system 1. When the result of the simulation is not successful, a parameter adjuster 81 for changing the parameters of the command generator 32A and of the controlled system simulator 80 is used so that the output from the controlled system simulator 80 can be changed into the output representing a desired shape and then the output is sent to the pattern recognition mechanism 33.

Now, the operation by the control method explained above will be described by using a concrete example.

The initial value of the weighting function $w^1_{ij}$ 48 the intermediate layers 39, 47 and 49 in the neurocomputer making up the pattern recognition mechanism 33 is first set to a random number or a value such as half of a value a weighting function can assume (0.5 if the value is 0 to 1.0). Here, even if a concave shape pattern of the rolling mill, generated by the input pattern generator 65 shown in FIG. 17, is input, the output from the output layer 50 to an output signal line 90 does not indicate 1 which represents the presence of a concave pattern, nor does the output from the layer 50 to an output signal line 91 indicate no probability of a convex pattern being present.

Therefore, 1 is output to an output signal line 92 for the teach pattern generator 67 in the learning mechanism 36 which corresponds to the output line 90 for the output layer 50, and 0 is output to an output signal line 93 for the teach pattern generator 67 which corresponds to the output line 91. The output matching mechanism 66, to which these outputs are sent, obtains the deviation of the output from the pattern recognition mechanism 33 from an ideal output (the output from the teach pattern generator 67), and in proportion to this deviation, the learning controller 68 changes the magnitude of the weighting function $w^1_{ij}$ for the pattern recognition mechanism 33 so as to reduce this deviation (see FIG. 12). A typical example of this algorithm is the steepest gradient method.

When in the process shown in FIG. 13 of sequentially changing the weight of weighting functions, the square-sum of $e_k$ shown in FIG. 12 becomes acceptable, the operation of the learning mechanism 36 ends.

Figure 17:
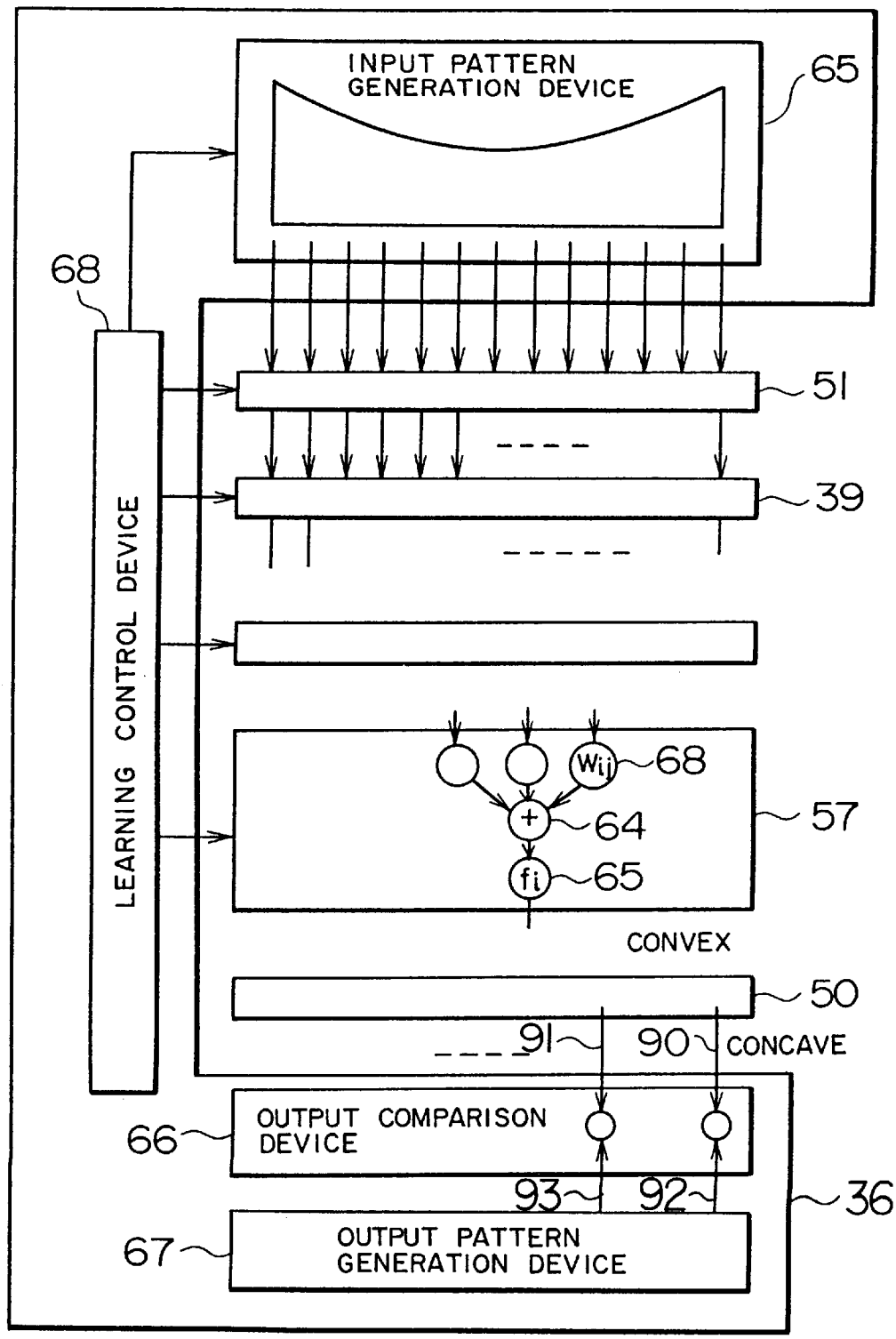
FIG. 17 illustrates the operation of the pattern recognition mechanism of FIG. 3.

When after the learning process the same waveform as the pattern output from the input pattern generator 65 shown in FIG. 17 is sent from the shape detector 34 to the pattern recognition mechanism 33, the mechanism 33 outputs 1 from the output signal line 90 for the output layer 50 and 0 from the output signal line 91 for the output layer 50.

Then, a waveform called a convex pattern, which is shown in FIG. 18, is input, but if the learning process has not ended yet, the output line 91 does not output 1 which represents a convex pattern, nor does the other output line 90 output 0. Therefore, as described above, the teach pattern generator 67, with a typical convex pattern being its input signal, outputs 1 and 0 for the output lines 91 and 90 respectively. The learning mechanism 36 changes the weighting function $w^1_{ij}$, so when at the end of the learning process the convex pattern waveform shown in FIG. 18 is input to the above-mentioned pattern recognition mechanism 33, the output lines 91 and 90 for the above-mentioned output layer 50 shown in FIG. 17 turn into 1 and 0 respectively.

As a result, the waveform shown in FIG. 19(a) is input to the pattern recognition mechanism 33, and then an output from it, in accordance with the output signal line 91 which carries a convex pattern waveform input in advance from the output layer 50 in the above-mentioned manner, has 40% of the degree of the certainty that the output agrees with the convex pattern waveform, and at the same time another output from it, in accordance with the output signal line 90 which carries a concave pattern waveform, has 50% of the degree of the certainty that the output agrees with the concave pattern waveform.

Figure 20:
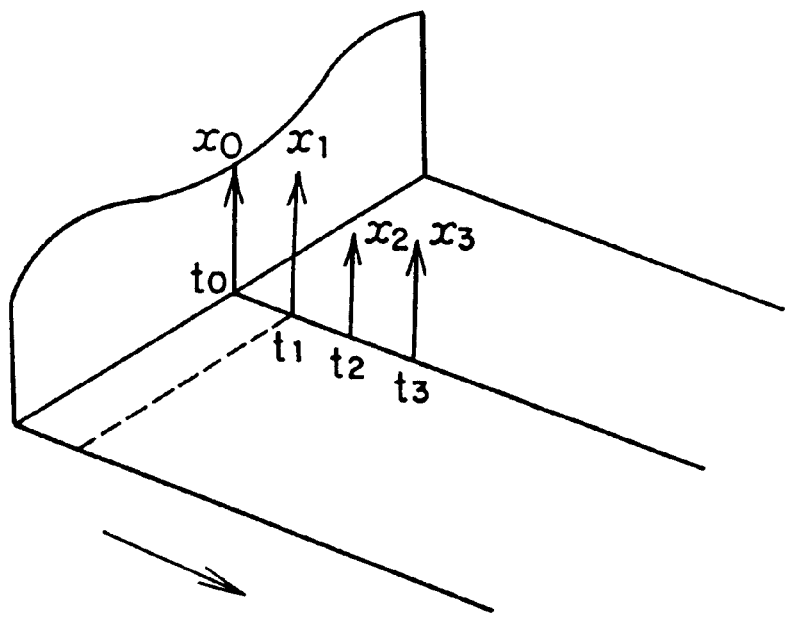
FIGS. 20 and 21 illustrate the change with time of the shape of a workpiece, when acted on according to the general principles of the present invention.

FIG. 20 illustrates the shape of a workpiece with regard to its change with time. Let the condition just below a work roll 22 of the rolling mill and the value for the condition be $t_0$ and $x_0$ respectively. And let the sampling period for the counter be $T_0$, then at the time $t_1$ which is $T_0$ seconds before the time for the condition the thickness of the workpiece is $x_1$, at the time $t_n$ which is $T_0 \times n$ seconds before the time for the condition that is $x_n$, and so forth.

Here, at the time $t_1$, the thickness $x_1$ is input to the memory 35 and stored in the memory element 69 shown in FIG. 14. The moment the thickness $x_0$ at the next sampling time $t_0$ is input to the memory 35, the data $x_1$ in the memory element 69 is transferred to the memory element 70, and at the same time the contents of the memory element 69 are changed into $x_0$.

On the other hand, the operation mechanism 510 uses the contents of the above-mentioned memory elements 69 and 70 to perform various operations. For instance, it performs $(x_0-x_1)/T_0$ when a differentiator is needed, and $(x_1+x_0) \times T_0$ when an integrator is needed. Namely, since a differentiator allows the speed of the change of shapes to be obtained, the pattern recognition mechanism 33 is capable of quickening response to such change.

An integrator provided the above way in turn has the advantage of reduction of such obstacles as noise.

The pattern recognition mechanism 33 may be provided with such functions as the above-mentioned differentiator, integrator and a proportional factor not connected with time.

Note that the data stored in the memory 35 may be used for the input pattern generator 65 employed in the learning process whenever necessity arises.

Figure 21:
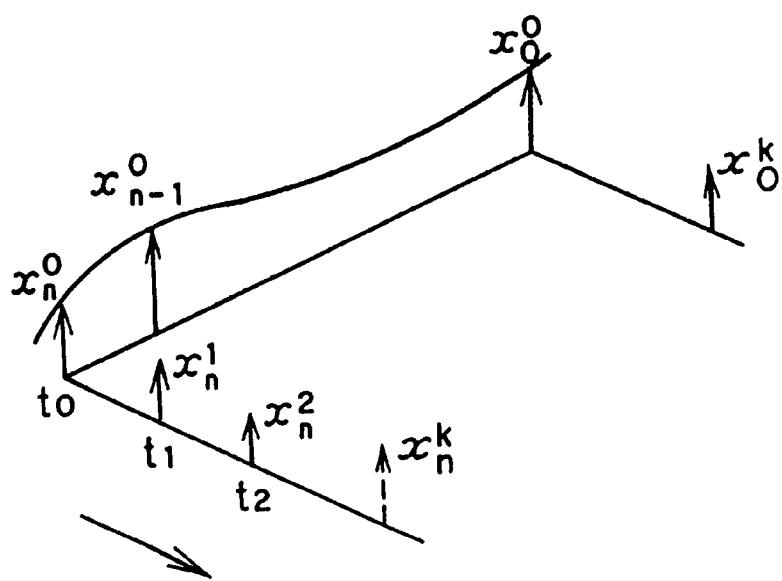

Now, as shown in FIG. 21, let the thickness at locations of a workpiece in section at the time $t_0$ be $x_0^0, x_1^0, \ldots x_{n-1}^0, x_n^0$ and let the condition of the thickness at the same locations of the workpiece in section $T_0$ seconds (sampling period) before the time be $x_0^1, x1, \ldots x_{n-1}^1, x_n^1$, then at the time $t_k$ $x_n^k, x_{n-1}^k, \ldots, x_0^k$ are stored in the memory elements 74, 77, . . . , 78 shown in FIG. 15 respectively. Since the memory element 79 is constructed in the same way as the above-mentioned memory 35, $x_0, x_1 \ldots x_n$ which are data at the time $t_1$, that is, $T_0$ before the time are stored in the memory element 79 and others.

Figures 22, 23:
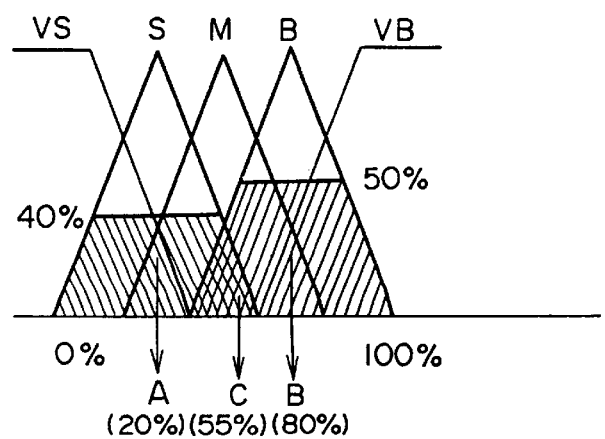
FIG. 22 illustrates logic rules which may be combined by fuzzy logic according to the general principles of the present invention.
FIG. 23 illustrates schematically the combination of patterns using fuzzy logic, in accordance with the general principles of the present invention.

FIG. 22 shows an example of a production rule or a fuzzy rule (corresponding to the production rule 147 and the fuzzy rule 148 shown in FIG. 6).

The output obtained as 50% of the concave pattern certainty degree by the pattern recognition mechanism 33 in the way described above is then compared with the premise of the production rule. As a result of the agreement of the output with a concave pattern rule portion 180, a rule portion 181 for weakening a bender (into an operation to a smaller degree) is obtained. On the other hand, the output obtained as 40% of the convex pattern certainty degree agrees with the premise 182, and as a result of this a rule portion for strengthening the bender (into an operation to a greater degree) is obtained.

As shown in FIG. 23, as a result of the comparison with the above-mentioned rule, the manipulated variable the command generator 32 provides for the bender is shown as the area of the hatched part of B with regard to 50% of the convex pattern certainty degree, and shown as the area of the hatched part of S with regard to 40% of the concave pattern certainty degree, i.e., of the degree of the certainty that the manipulated variable is represented by S. Therefore, the manipulated variable that the above-mentioned command generator 32 provides for the bender after all is 65% which is the value of the gravity center C resulting from the composition of the gravity centers A and B for the hatched parts.

Figure 24:
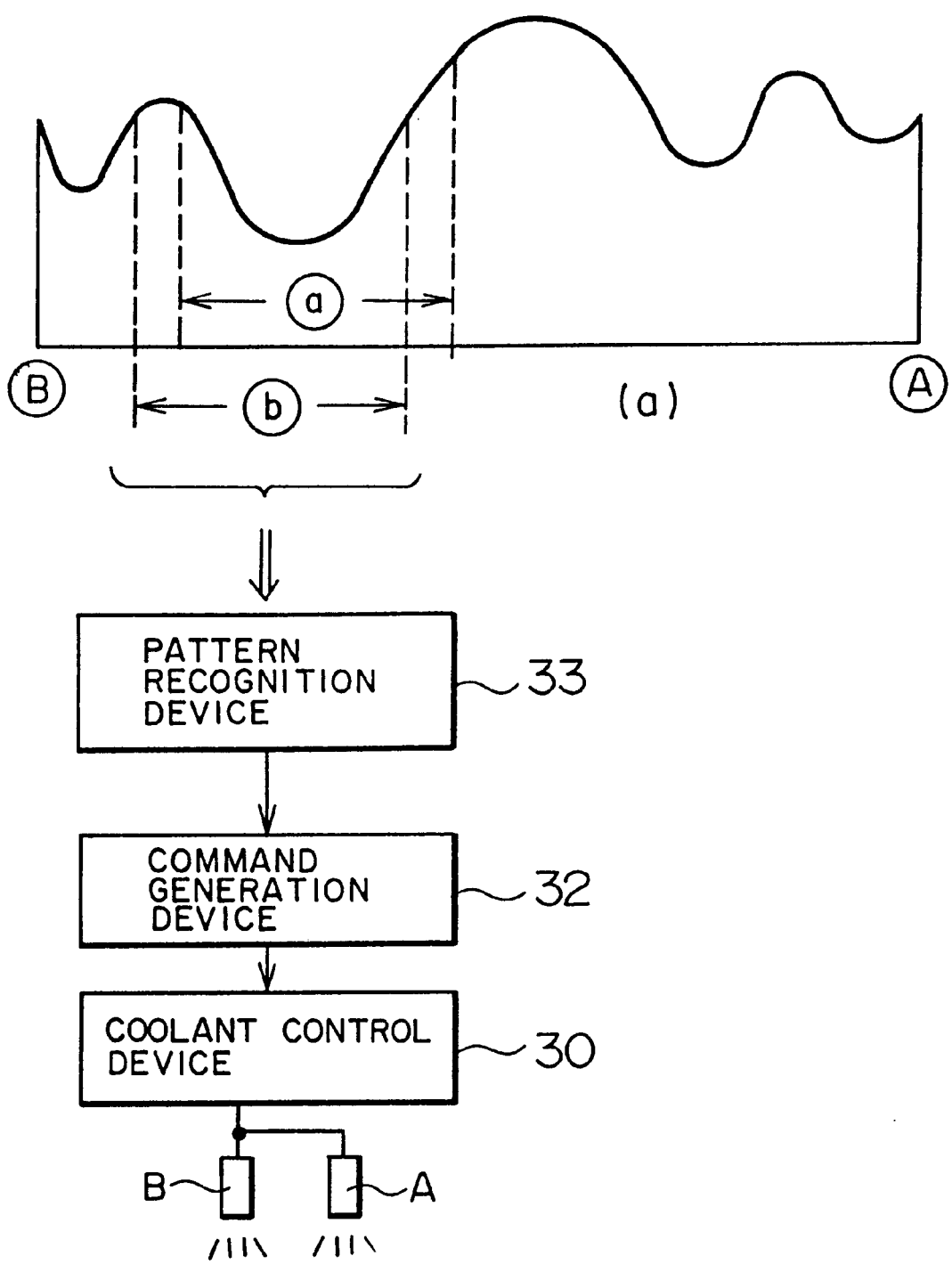
FIG. 24 illustrates the processing of an input waveform according to the general principles of the present invention.

Now, as shown in FIG. 15, in the case where the actuator influence is limited as in the operation by coolant to a certain section unlike the influence of benders or shifters, the waveform shown in FIG. 24(a) is stored in the memory elements 74, 77 and 78. A portion of the waveform stored in a memory element (which is denoted by i shown in FIG. 24(a)) is processed by the pattern recognition mechanism 33 and the command generator 32, and therefore the nozzle A of the coolant controller 30 and its coolant are controlled so as to straighten the roll.

When the value $x_{n-1}^0$ shown in FIG. 21, compared with its neighbors $x_n^0$ and $x_{n-2}^0$, is larger than each of them, the conclusion 185 that the center is greater is drawn from FIG. 22. On the other hand, as for the relation between $x_n^0$ and $x_{n-1}^1$, when $x_{n-1}^1-x_{n-1}^0$ is positive, $x_{n-1}$ is on the increase. Then, the differential coefficient is positive, a premise 186 is agreed with and then coolant starts working. The degree of the operation is great (large). The result is that there is little change in $x_{n-1}^0$ and $x_{n-1}^1$.

When the control of the nozzle A is completed, the contents of the memory elements 74, 77, 78 and 79 are shifted one element after another element. Thus, the waveform input to the pattern recognition mechanism 33 has the portion denoted by ii shown in FIG. 24(a) input therein so that the processes 33 and 32 can be performed to control the nozzle B of the coolant controller 30.

This course of processing, starting with the pattern shown in FIG. 24(a) and then shifting the contents of memory, brings about the result that the waveform shown in FIG. 24(a) is stored again in the memory 72. The pattern shown in FIG. 24(a) is stored in the memory 72 previously, and a certain length of time after that the contents of the memory element 74 shown in FIG. 15 are transferred to the memory element 79 so that the memory element 74 can store the waveform from the shape detector 34.

Note that the installation of the operation mechanism 510 shown in FIG. 14 between the memory 72 and the input layer 51 allows control even by such factors as the speed of the change of waveforms, as is obvious from FIG. 14.

Now, the process of learning patterns which bases the pattern recognition mechanism 33 will be described.

The waveforms 82 and 83 shown in FIG. 19 are generated by the input pattern generator 65 shown in FIG. 11, and are output to the input layer 51. These patterns are written to the memory in the input pattern generator 65 and are used or, instead, patterns stored in the memory 35 shown in FIG. 2 are used. Signals input to the input layer are sent through the intermediate layers 39, . . . , 47 and are output from the layer 50. Here, the weighting function $w^1_{ij}$ in intermediate layers has its initial value. A pattern is sent which the pattern recognition mechanism 33 is required to output in response to the output from the input pattern generator 65 (for example, a pattern enabling the output from one of the output terminals for the output layer 50 to be 1 and those from other output terminals to be 0 when the one output terminal is allocated to the output, which is a standard pattern, from the input pattern generator 65) from the teach pattern generator 67 to the output matching mechanism 66. With the learning process is not completed yet, the output pattern from the output layer 50 is different from the waveform of the teach pattern generator 67. As a result, the output from the matching mechanism 66 varies with the degree of the difference between these patterns. Calculating the mean square of this deviation value, that is, deviation makes it possible to obtain such distribution as a power spectrum for the deviation. According to this deviation, the process of changing the weighting function $w^1_{ij}$ is applied, starting with the intermediate layer 49 near the output layer and ending with the intermediate layer 39 near the input layer 51. Among other various methods of changing the weighting function $w^1_{ij}$, the steepest gradient method is used for the optimization for minimizing the above-mentioned deviation. In this method, the weighting function $w^1_{ij}$ being considered is slightly changed in an upward direction, and, by checking the resulting change of the deviation value, the weighting function $w^1_{ij}$ is changed so as to reduce the deviation value. The change of the weighing function is enlarged when the change of the deviation value is small, and is diminished when the latter is large. When the change of the weighting function $w^1_{ij}$ for the intermediate layer 39 nearest to the input layer is completed, the deviation value for the matching mechanism 66 is checked again. And when the value becomes acceptable, the learning process is terminated.

The above pattern learning process is controlled by the learning controller 68. Now, it remains to be found out how the pattern recognition mechanism 33, when it applies the result of this learning process to the classification of patterns, can classify patterns, have an effective operation by the learning. It is said, however, that weighting functions used, larger in number than inputs and outputs, have a greater degree of freedom and lead to a good recognition even if the values are not altogether accurate or even if a lot of patterns are stored.

On the other hand, what kind of patterns should be used for these input pattern generator 65 and teach pattern generator 67 is a hard question. Fortunately, when the controlled system 1 is operated around some operating point, a model can be established accurately, which is a method called the system identification in the field of control theory. For the entire operation, modeling is almost impossible because of the controlled system's nonlinearity.

Therefore, a model is established in a particular operation section, control is performed, a successful relation for the model between the input to the control system and the response of the system is obtained by means of simulation and such a relation is used as data for learning. This procedure is carried out for all the sections of the operation of the control system, the operating point being moved from section to section to obtain an optimal model and control command for each section, which are then learned by the control system. Namely, the parameter of the controlled system simulator 80 shown in FIG. 16 is adjusted so that the simulator 80 can operate accurately at particular points. After that, the input pattern generator 65, parameter adjuster 81, controlled system simulator 80 and command generator 32A are operated in order that the controlled system can generate typical patterns. The outputs from these teach pattern generator 67 and controlled system simulator 80 are used as the output patterns and input patterns for the learning mechanism 36 respectively.

A control system constructed in the above manner abstracts waveforms in the pattern recognition mechanism and allows the controllers to perform even control having some ambiguity.

The above description largely corresponds to the disclosure of DE 4008510.4 (corresponding to U.S. Ser. No. 07/490848. However, the present invention is particularly concerned with further development of the above general principles.

Thus, in the above discussion of general principles, reference was made to a rolling mill system as an example. It will be understood, however, the controlled system 1 and the variety of actuators 26, 27, 28, 29, 30 and 31 are not limited to the use for rolling mill systems but applicable to other ordinary controlled systems, actuators and controllers. For instance, they may be used for the control in a railroad operation control system, in which train schedule patterns are recognized so that delayed trains can be controlled according to various train schedule alteration rules so as to be on schedule again. To be more specific, a diagram which represents the operation of a delayed train is created first and then from this diagram the characteristic of the delay is extracted by employing the pattern recognition mechanism 33. On the basis of the quantity for this characteristic, an inference mechanism uses various rules such as one that a train should be overtaken by another at a station and then creates a new train schedule. In response to this inference result, the command value calculation means 53 generates a operation command for each train. Trains, which are actuators, are operated in accordance with these commands.

Other applications of the general principles will be discussed in more detail later.

B—Developments of General Principle

The first aspect of the present invention discussed above, in its first development, is concerned with a feedback loop also incorporating means for storing a pre-set actuation pattern, which means will be referred to subsequently as generating a set point for the system to be controlled. The first aspect of the present invention is concerned with the use of an analysis means to determine relationships between various signals of the system and thus develop, using e.g. neurocomputer techniques, signals for compensating for variations.

B-1—Machine Learning

Referring now to FIG. 25, there is illustrated an embodiment of the present invention which is applied to the control of shapes in a Sendzimir mill. A Sendzimir mill which is the controlled system 1 comprises work rolls 1001, primary intermediate rolls 1002, secondary intermediate rolls 1003 and AS-U rolls 1004. The AS-U rolls are composed of separate rolls 1005, shafts 1006 and saddles 1007. The shape of a workpiece 23 in lateral vertical section is detected by the shape detector 34 and is input to the neurocomputer composing the above-mentioned characteristic extraction mechanism 8. The output from this characteristic extraction mechanism is sent as a certainty degree to the command generator 32 making up the above-mentioned controllers 6. This command generator 32 then performs an operation for the fuzzy logic control. The result of the fuzzy logic control operation is output as commands and sent to actuators, which operate the saddles 1007 and thus straighten the warped shafts 1006 to control the shape of the workpiece 23.

Figure 26A:
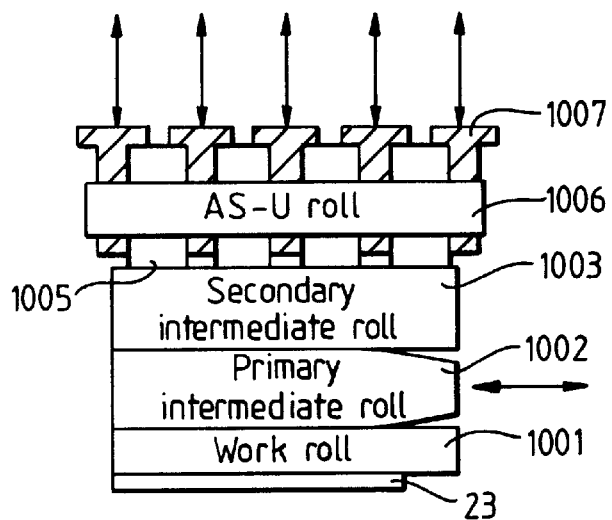
FIGS. 26a, 26b, 26c illustrate in more detail the structure of the sendzimir mill.

FIG. 26A is a lateral vertical sectional view of the Sendzimir mill. The workpiece 23 is in contact with the work rolls 1001, the work rolls 1001 with the primary intermediate rolls 1002 and the primary intermediate rolls 1002 with the separate rolls 1005 of the AS-U rolls 1004. Therefore, the shafts 1006 for the above-mentioned separate rolls can be changed in shape by controlling the saddles 100 mounted by means of bearings.

Figure 26B:
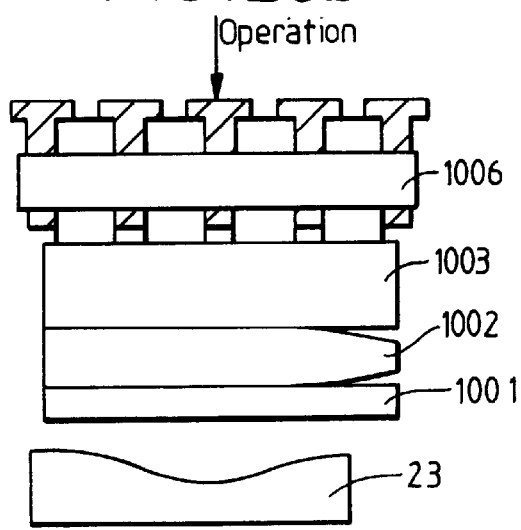

FIG. 26B illustrates an exaggerated waveform resulting from the change in shape of the workpiece 23 by operating the above-mentioned saddles 1007 to cause the shape change which is then transmitted through the shafts 1006, separate rolls 1005, secondary intermediate rolls 1003, primary intermediate rolls 1002 and work rolls 1001.

Figure 26C:
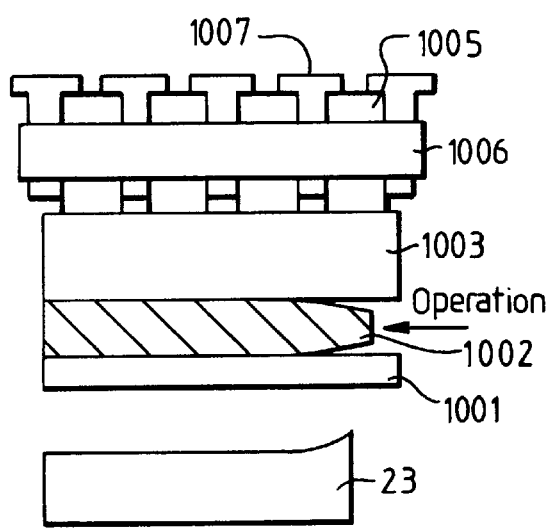

FIG. 26C illustrates a waveform of the workpiece 23 processed when the primary intermediate rolls have a taper at their end. When such primary intermediate rolls are moved laterally, no load acts on the part of the workpiece to which the tapered part of the rolls is applied. As a result of this, the end of the processed workpiece is thicker.

Figure 27B:
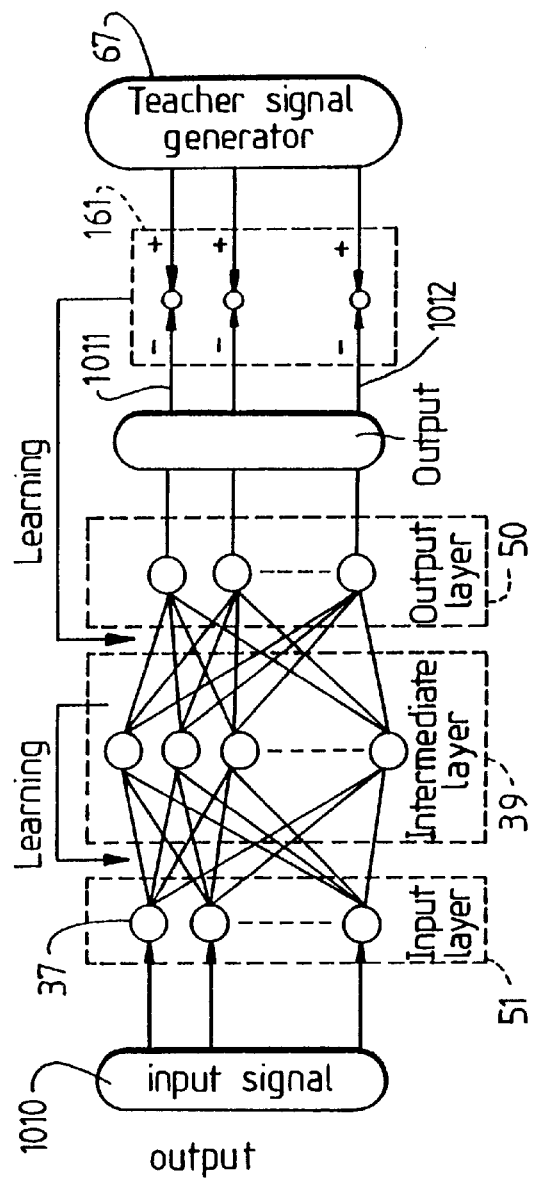
Figure 27A:
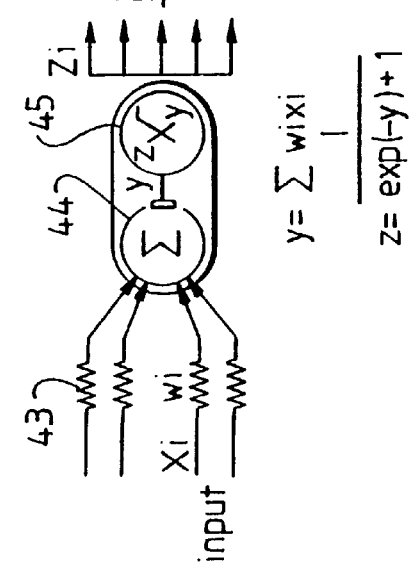

The composition of a neurocomputer and some examples of its operation are illustrated again in FIGS. 27A to 27D. FIG. 27A shows the construction of a neuron where the input xi is processed with a weight $43_j$ and sent to the adder 44. The output y from the adder 44 is sent to and processed by a logistic function processor. The relation between the input y to and the output z from the logistic function is given by this equation:

$$z = 1/1 + [\exp(-y)]$$

FIG. 27B illustrates the neurocomputer schematically. An input signal 1010 is sent to the input cell 37 in the input layer 51, and the output from the input layer 51 is sent through the intermediate layer 39 to the output layer 50, which then gives its output as the quantity for a characteristic. The output from the teach pattern generator 67 and from the above-mentioned output layer 50 is sent to the adder 161, and a deviation issued by the adder 161 is input to the learning controller 68 for the neurocomputer to learn.

Now, the learning process is shown in FIGS. 27C and 27D. When during the learning operation a concave pattern signal 1010-a is input to the input terminal, the teach signal generator 67 outputs a signal for 1 to an output line 1013 and another signal for 0 to an output line 1014 so that output lines 1011 and 1012 can carry the signals for 1 and 0 respectively. When the learning process ends, the output lines 1011 and 1012 from the output layer 50 do not carry their respective signals for 1 and 0, so the deviation $e_j$ from the teacher signals is output from the adder 161. Then, as described in reference to FIG. 11, the learning controller 68 changes the weighting function $_{ij}$ shown in FIG. 3 so that the deviation $e_j$ (J=1, ..., n) can become zero. As a result, when the concave pattern signal 1010-a is input, the values represented by signals on the output lines 1011 and 1012 become 1 and 0 respectively.

When a convex pattern signal 1010-b is input, the neurocomputer learns in order that the output lines 1013 and 1014 from the teach signal generator 67 can carry the signals for 0 and 1 respectively.

Figure 28:
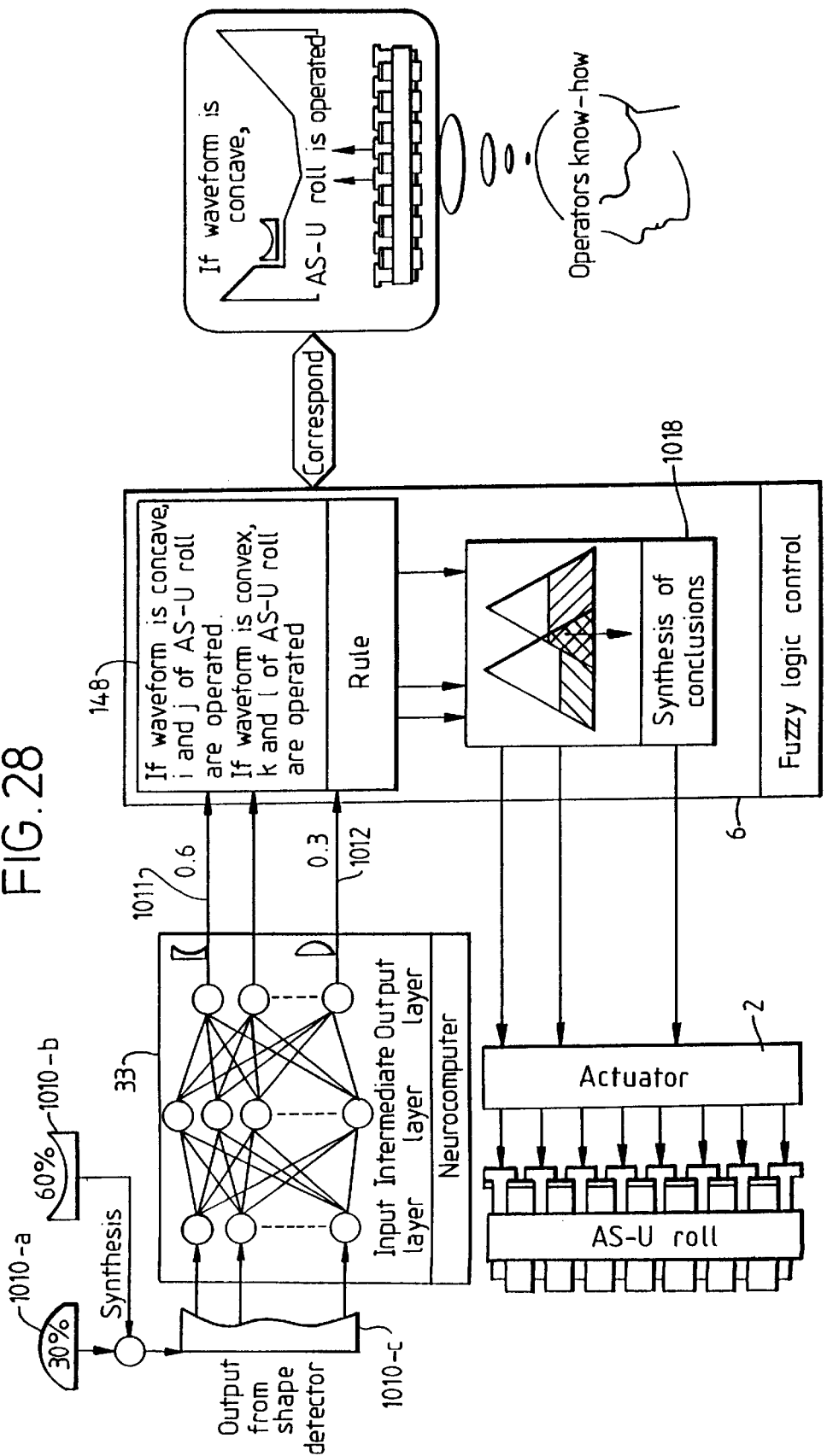
FIG. 28 illustrates schematically its structure of patterns using a neuro computer and the combination thereof by fuzzy logic.

FIG. 28 shows how the neural network works after it has learned all necessary waveforms. Let the signal 1010-c output from the shape detector 34 be constituted of 30% of the convex pattern signal 1010-a and 60% of the concave pattern signal 1010-b. Then, when the above-mentioned signal 1010-c is input to the neurocomputer, that is, the pattern recognition mechanism 33, the mechanism 33 outputs as 0.3 and 0.6 the degree of the certainty of the convex pattern represented by the signal 1010-a and that of the concave pattern represented by the signal 1010-b respectively. On the other hand, operators' know-how tells that, when the waveform is concave, AS-U rolls in the center should be operated. What corresponds to this know-how is the fuzzy rule 148 going that when the premise is that the pattern is concave, the conclusion that i-, j-th AS-U rolls are operated is drawn. The above-mentioned output from the characteristic extraction mechanism corresponds to the degree of the certainty of the premise of a fuzzy rule. The fuzzy logic control synthesizes the conclusion of each rule and then determines the command for each actuator. In other words, the fuzzy logic control corresponds to the function of the command generator shown in FIG. 2.

Figure 29:
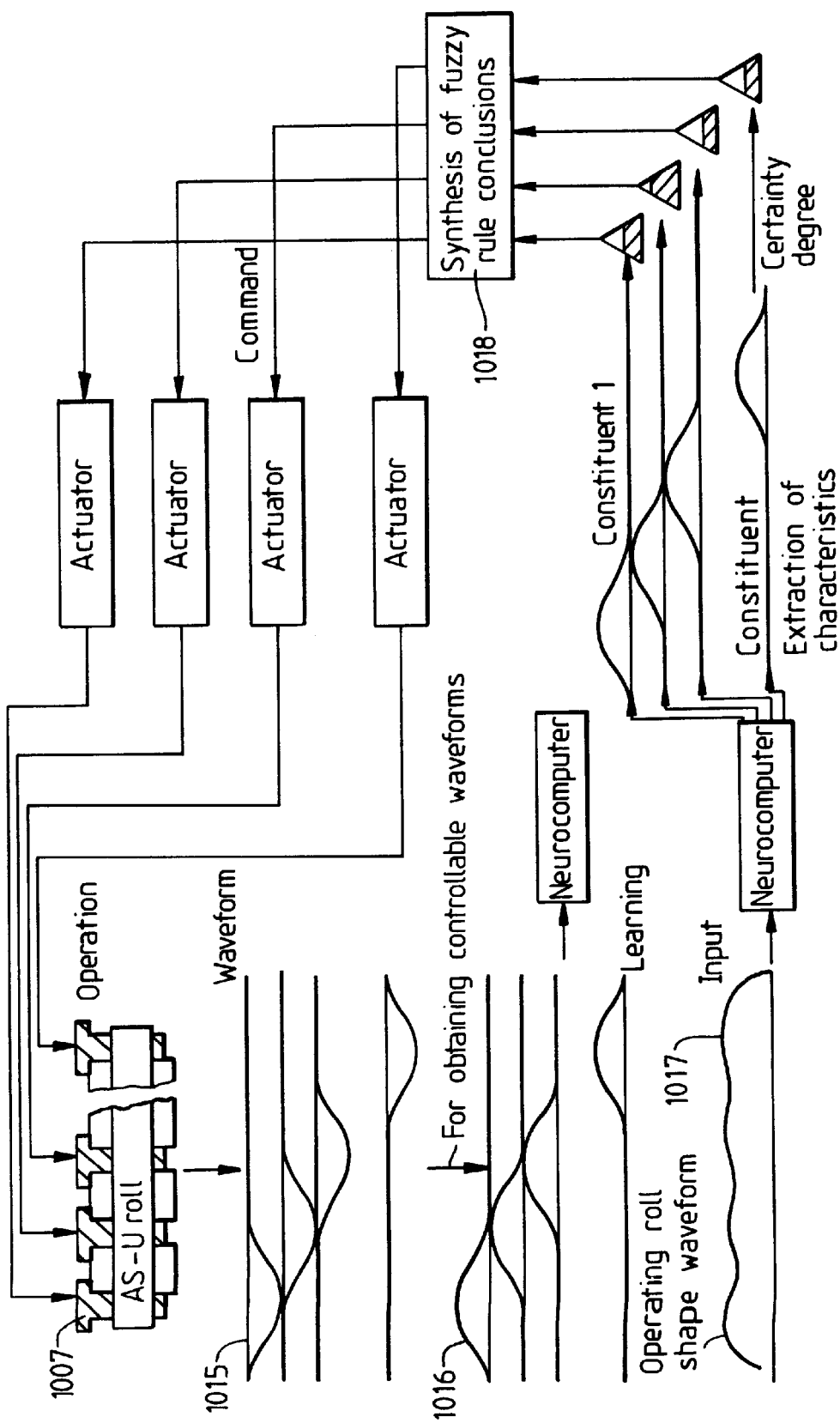
FIG. 29 illustrates schematically the analysis carried out in the embodiment of FIG. 25, incorporating machine learning according to the present invention.

FIG. 29 illustrates an example in which fuzzy rules are obtained from the actual waveforms of actuators instead of operators' know-how and are used for control. Operators use the man-machine interface 7 to control actuators 2. In the example shown in FIG. 29, they manipulate saddles 1007 to operate AS-U rolls. As a result, the shape and thickness of the workpiece change, and waveforms 1015 are obtained. These waveforms are stored in the memory 35 shown in FIG. 2. From the waveforms stored in the learning mechanism 36 and the above-mentioned memory 35, waveform portions are found out which can be used to generate controllable waveforms 1016 for operating actuators and obtaining an objective roll shape, and the resulting controllable waveforms are learned by the neural network in the pattern recognition mechanism 33.

These controllable waveforms 1016 are the result of the subtraction of the waveform 1015 from the patterns for an objective roll shape.

In actual operation, a waveform 1017 representing the operating roll shapes is input to the pattern recognition mechanism 33. The pattern recognition mechanism then sends the constituents of the operating roll shape waveform 1017 which are to be used for creating the controllable waveforms 1016 to a synthesizer 1018, shown in FIG. 28, of the conclusions of fuzzy rules. The output from the synthesis of fuzzy rule conclusions is sent to actuators 2 to obtain a desired product.

In the construction described above, control can be performed by using data obtained from waveforms resulting from the real operation of actuators as well as by using operators' ambiguous but empirically correct know-how. Therefore, the above construction allows simpler and more efficient control than conventional methods using models do.

B-2—Set Point Control

Figure 30:
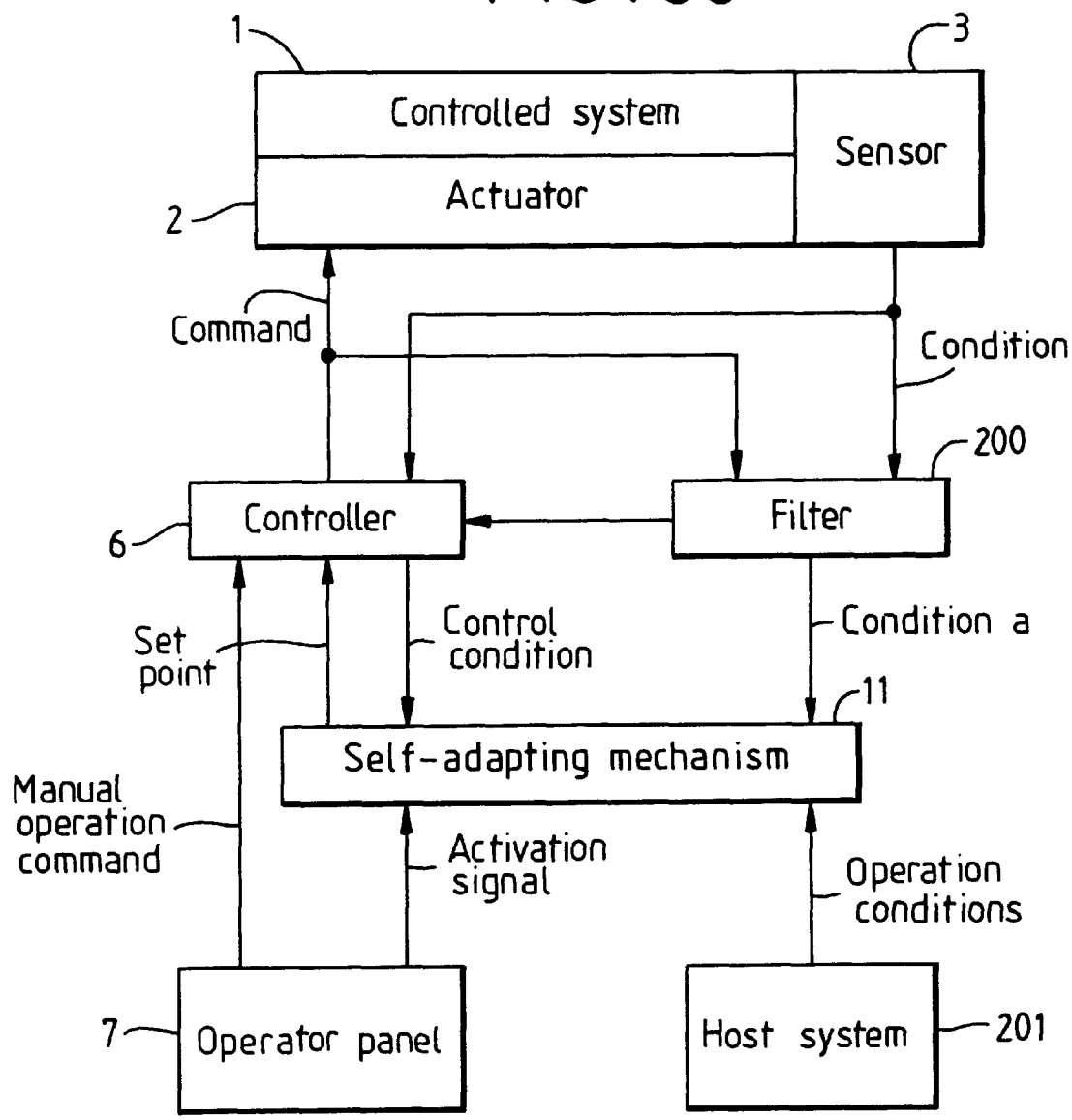
FIG. 30 illustrates a further embodiment of the present invention, incorporating set point control.

Even a control system such as one for controlling workpiece thickness on a rolling mill, in which the controlled system is modeled comparatively correctly, sometimes shows problems of control because of such obstacles as secular change and the nonlinearity of a controlled system. FIG. 30 illustrates a control system of the present invention whose controlled system has undergone some secular change.

The condition of the controlled system 1 and of the actuators 2 is sent through the sensor 3 to the controllers 6 and to a filter 200. The filter 200 is a kind of the characteristic extraction mechanism 8 shown in FIG. 1. The filter 200 is for extracting characteristics and reducing noises. The difference of this control system from that shown in FIG. 1 is that commands are also sent through the filter 200 to the self-adapting mechanism 11 and that the condition a and control condition are sent to the self-adapting mechanism 11.

To the above-mentioned self-adapting mechanism 11, activation signals and such a signal as operation conditions are sent from an operator panel which is the man-machine interface 7 and from a host system 201 respectively.

Figure 31:
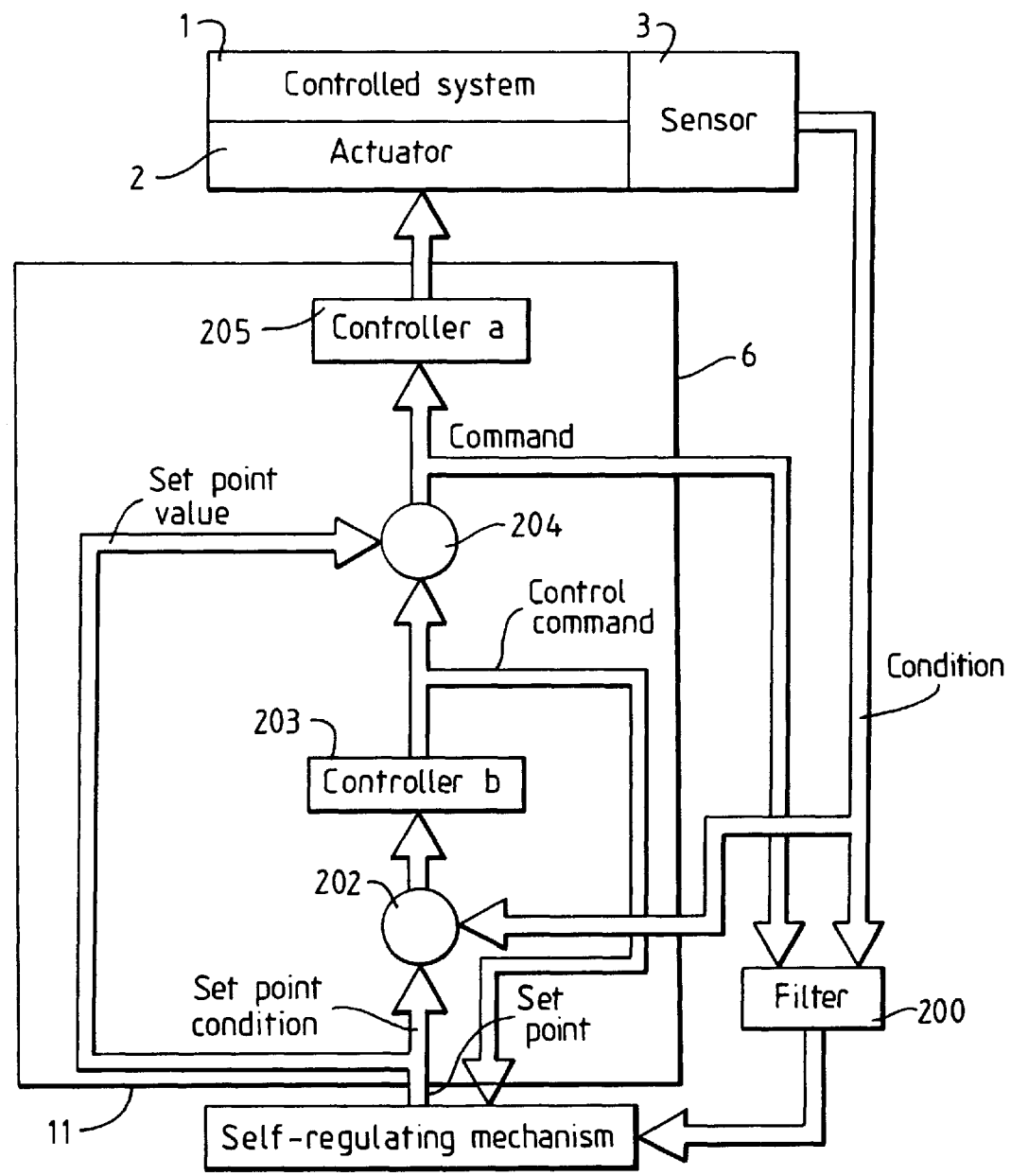
FIG. 31 is a block diagram illustrating in more detail the set point control of FIG. 30.

FIG. 31 is a detailed explanatory illustration of a controller 6. The condition output from the controlled system 1 and from the actuators 2 is sent through the sensor 3 to the filter 200 and to a comparator 202 in the controller 6. The comparator 202 issues the deviation of the above-mentioned condition output from the sensor 3 from the set point condition which is part of a set point output from the self-adapting mechanism 11. This condition deviation is input to a controller b 203. The controller b 203 is designed in conformity to such a control principle as one for a optimal regulator.

Control commands output from the controller b 203 are sent to an adder 204 and to the self-adapting mechanism 11. The adder 204 adds set point values sent from the self-regulating mechanism 11 and control commands to issue commands. These commands are sent to the filter 200 and to a controller a 205. The controller a 205 and controller b 203 can be specified by using classical or advanced control theories.

In this embodiment, to the comparator 202 the control system is a deviation value system, and to the adder 204 it is a regulator problem. Needless to say, there have been control systems described as an absolute value system or as a servo problem. However, an absolute value system can be described as a deviation value system, and a servo problem as a regulator problem, so the above specification of the comparator and adder does not lose generality.

Figure 32:
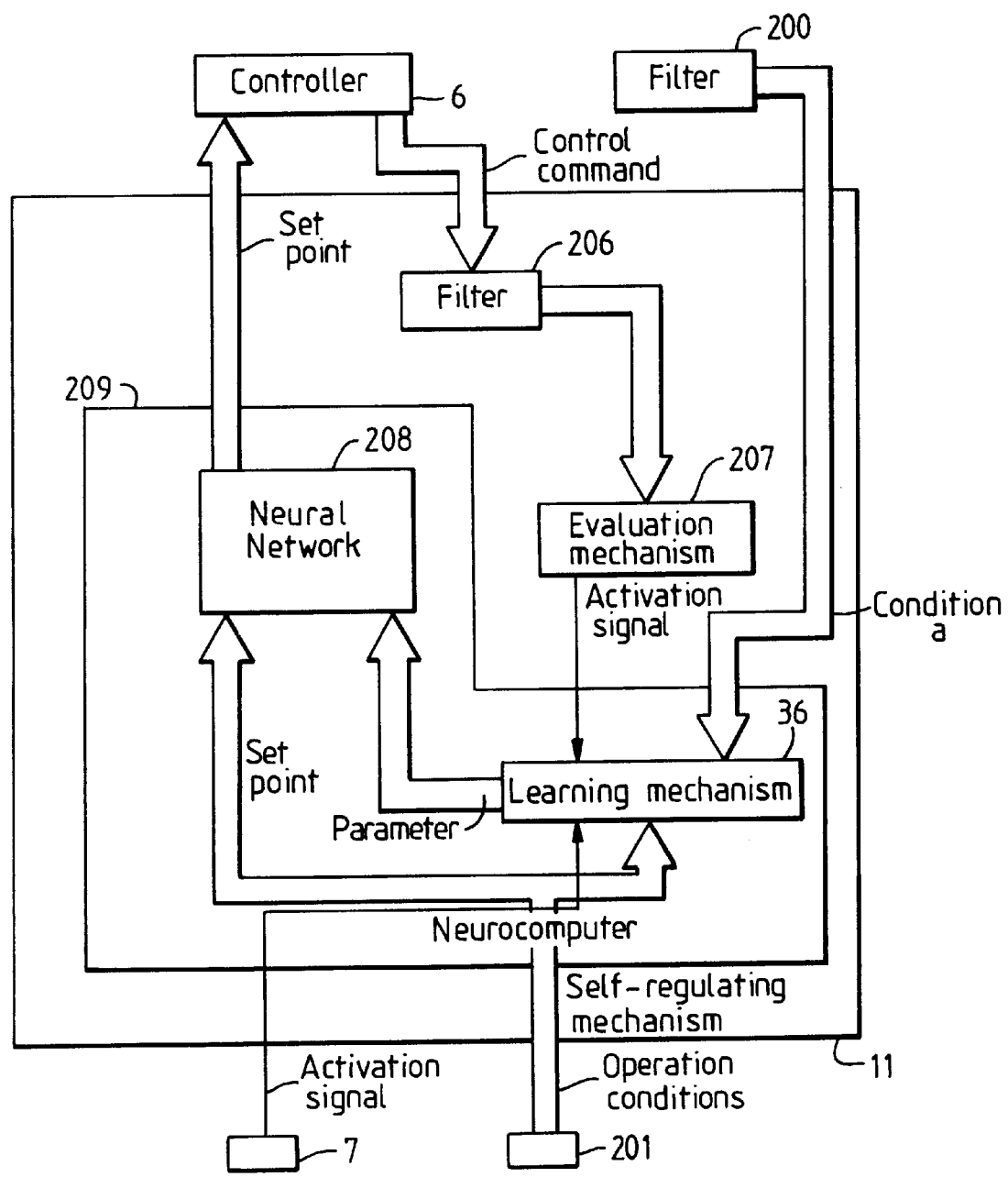
FIG. 32 is a block diagram showing structural components of the embodiment of FIG. 30.

FIG. 32 is a detail block diagram of the self-adapting mechanism 11. Control commands output from the controllers 6 are sent through a filter 206 to an evaluation mechanism 207. The evaluation mechanism 207 checks whether or not the value of a control command ceases to be acceptable and, when it does, generates a signal for activating the learning mechanism 36.

Control commands, which are output from the controller b, are for using feedback to compensate for the gap between the condition of the controlled system 1 and set point values due to disturbance, errors in the model of the controlled system and the nonlinearity and secular change of the controlled system. To be more specific, control commands amplify such an error in order to bring the controlled system back to a set point condition till no such control command is output any more.

Here, the part of errors which is caused only by random disturbance is sent to and removed by the filter 200 with the result that the condition a becomes some directional condition such as a model error and secular change, namely, an offset. Then, when the value of the above-mentioned condition a becomes larger, it is necessary to change the operating points for the control system. The reason is that the output from the controllers usually becomes saturated. For example, when the above condition as an offset becomes larger and approaches a saturation value, this saturation prevents the controllers from responding to any disturbance coming in.

The evaluation mechanism 207 is for checking such a result as that of the mean square of a control command output from the filter 206 and, when it exceeds a certain value, issuing an activation signal to the learning mechanism 36 to change operating points.

The above-mentioned learning mechanism 36 is activated by an activation signal sent from the operator panel 7 or from the above-mentioned evaluation mechanism 207. The operator supervises the operation of the controlled system 1 and operates actuators manually depending on his experience and skills to bring the controlled system to an ideal state. As shown in FIG. 30, the operation by the operator is sent as manual operation commands to the controllers 6. These manual operation commands forcibly changes set point values shown in FIG. 31.

The learning mechanism 36 thus activated changes parameters of the neural network 208 in response to the condition a from the above-mentioned filter 200 and operation conditions from the host system 201.

During the learning operation, the neural network 208 receives such input as operation conditions from the host system 208 and outputs the condition a. Note that the condition a is made up of condition and commands as shown in FIG. 31.

After the learning operation ends, the neural network 200 outputs set point values representing the operating points of the controlled system and also outputs set point condition which is the ideal condition of the controlled system 1 at the time when set point values are input. Ideal condition above means the condition of the controlled system and of the actuators at the time when the controlled system 1 is not subject to any disturbance.

Note that the neural network 208 and the learning mechanism 36, considered one unit, are referred to as the neuro-computer 209.

In the construction described above, since the operating points for the controllers are optimal, the controller a is prepared against disturbance, and it is unnecessary to ensure an offset even when a large disturbance occurs, so control can be applied to a wider range.

Figure 33:
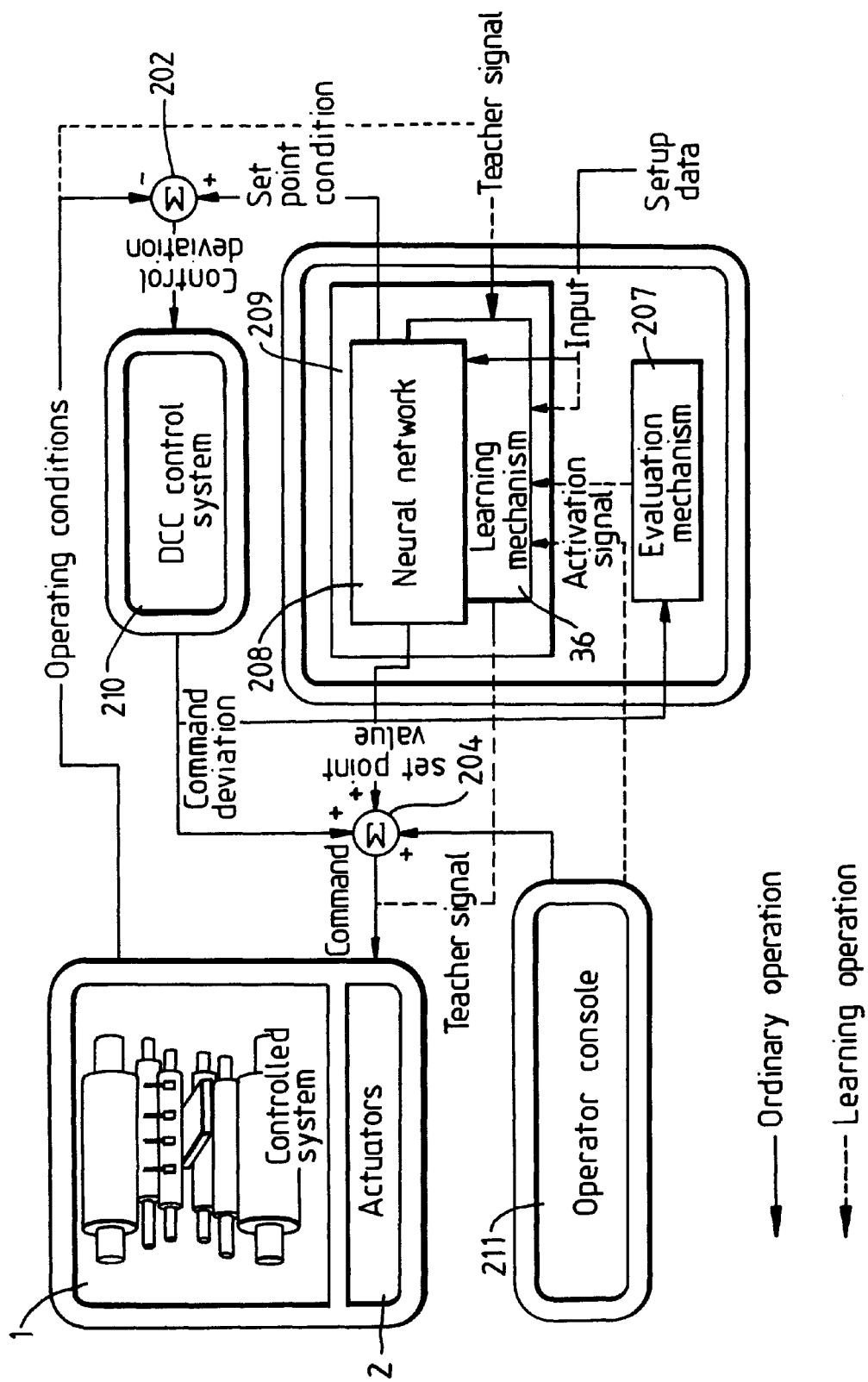
FIG. 33 illustrates schematically the operation of the embodiment of FIG. 30.

Now, FIG. 33 schematically illustrates the operation of the above control system which is applied to the control of the thickness of a workpiece on a rolling mill.

First, ordinary operation will be described with reference to the solid lines denoting the way the signals for the operation are sent, and then the learning operation will be described with reference to the dashed lines which denote the courses the signals for the operation are sent in. Since rolling mills tend to show nonlinearity, it is almost impossible to apply a linear control theory directly. To cope with this, the host system 201 sends operation conditions such as the thickness of base material, product thickness, steel type and steel material as setup data to the neural network 208. If it is assumed that the neural network 208 has completed the learning operation, in response to the above-mentioned input, the neural network outputs set point values for specifying the operating points of the rolling mill and set point condition which is the condition of the rolling mill at the operating points to the adders 204 and 202 respectively.

The adder 202 subtracts from the above-mentioned set point condition the operating conditions of the rolling mill to generate control deviations. These control deviations are then sent to a DDC control system 210 which is equivalent to the controller b 203 shown in FIG. 31.

The DDC control system 210 is designed in conformity to such a principle as algorithms for designing regulators and is for using control deviations as feedback to determine command deviations.

The adder 204 is for adding the above-mentioned set point values and command deviations and outputting the result to the actuators 2 of the rolling mill. Here, in FIG. 31 commands are sent through the controller a to actuators, but in FIG. 33, if the gain for the controller a is 1, then it follows that the scheme of FIG. 33 is equivalent to that of FIG. 31.

Then, if the coefficients of the neural network 208 are optimal, the DDC control system 210 will respond to disturbance.

On the other hand, when the output from the neural network 208 is not optimal, the gap reveals itself as control deviations, and the values of control and command deviations become larger. At this instant, the command deviation due to disturbance is zero in terms of average value or average power. Therefore, the evaluation mechanism 207 checks command deviations. For instance, when the square of a command deviation becomes larger than a reference value, the evaluation mechanism 207 activates the learning mechanism 36. At the time when the learning mechanism 36 is activated, the memory 35 shown in FIG. 2 stores commands output from the adder 204 and operating conditions of the rolling mill which is the controlled system 1. These commands and operating conditions being used as teacher signals, the neurocomputer 209 learns on the basis of the input of the above-mentioned setup data.

The difficulty in using a neurocomputer for control lies in the absence of a reliable method for providing teacher signals. In a neurocomputer, the relation between input and output is given by a non-linear function, so there are infinitely many instances of their corresponding to each other. Conventional neurocomputers have relied on their user for providing teacher signals for them, but because it has been impossible for the user, a human-being, to have a perfect understanding of the whole operation of the controlled system, optimal teacher signals have not been acquirable.

This method according to the present invention, an application of feedback control which is the method of compensating for errors due to disturbance and model gaps and of bringing operating points to optimal locations, is for operating neurocomputers so that they can learn the commands for obtaining optimal operating points and the operating conditions of the controlled system at optimal operating points. To be more specific, since feedback control approximates operating points to optimal points within the range where control is possible, the result of such feedback operation can be used as teacher signals to automatically obtain optimal operating points.

On the other hand, the operator supervises the operating conditions of the controlled system and, when a faulty point is found, takes action manually. Sooner or later the working of the controlled system is corrected and improved. The result of the operation by the operator can also be used as teacher signals so that his know-how and expertise can be embodied by a neurocomputer.

To be more concrete, the operator works by hand at an operator console 211 making up the man-machine interface 7 shown in FIG. 1. The output from the operator console 211 is then applied to the adder 204, and commands are changed. When this operation is not necessary any more with no faulty point coming up, the operating points of the controlled system are around or at optimum points.

This instant can be figured out by the operator's judgment, by checking a certain length of time passing without any faulty point coming up after the operator's last manual operation or by checking that command deviations have become steady. Then, the learning mechanism 36 is activated. The operation of the control system after the activation of the learning mechanism is the same as when the learning mechanism 36 is activated by the above-mentioned evaluation mechanism 207.

Figure 34:
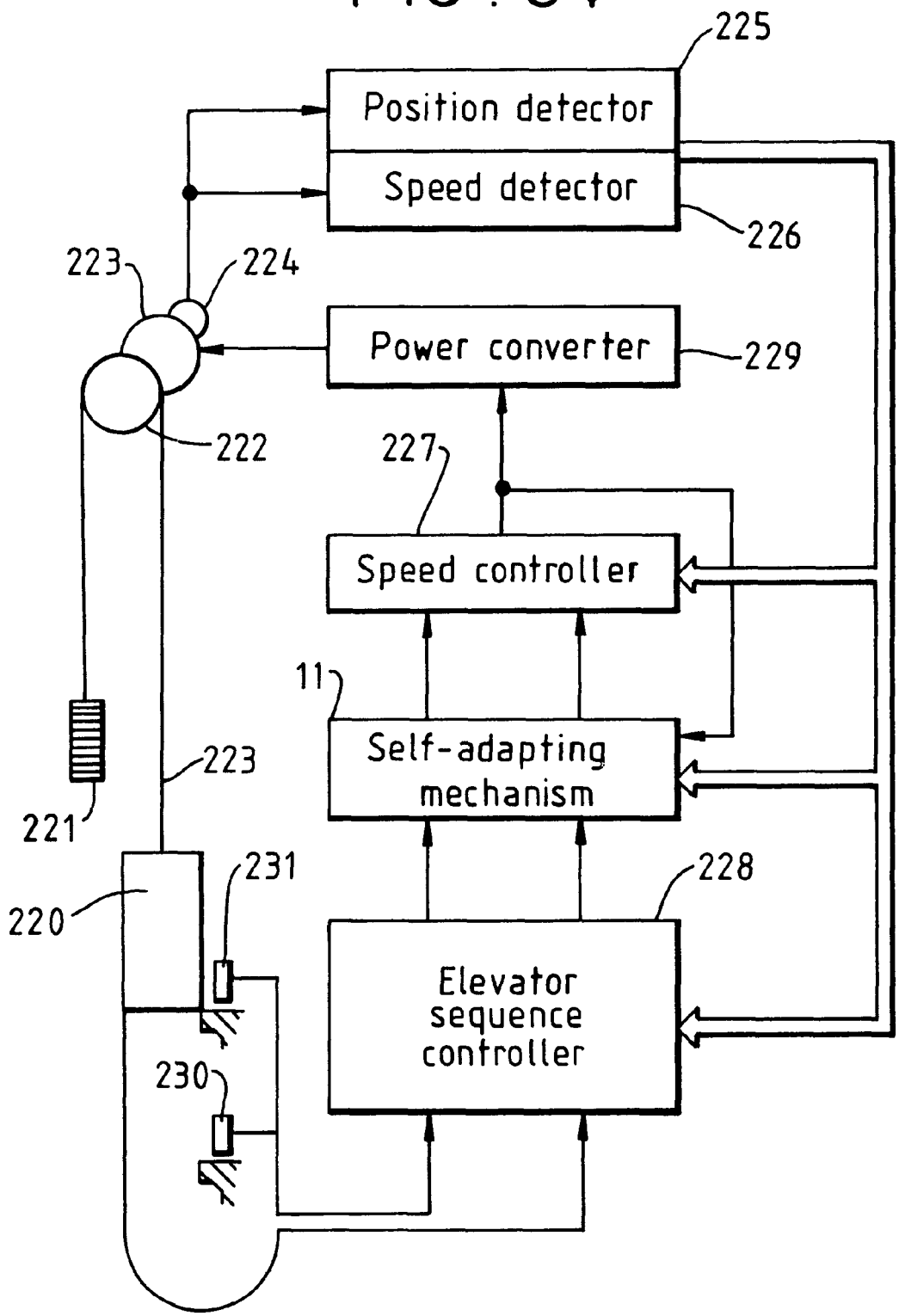
FIG. 34 illustrates the application of the present invention to an elevator.

Referring now to FIG. 34, there is illustrated a control system embodying the present invention which is applied to an elevator controller. An elevator car 220 is attached by cables 223 and sheaves 222 to a counter weight 221 so that the car and the weight can be balanced with each other. The sheaves 222 are attached to an electric motor 223 so that the revolution of the motor can hoist and lower the car 220. The electric motor 223 is attached to a pulse generator 224, whose output is sent to a position detector 225 and a speed detector 226 both making up the sensor 3. The output from the position detector 225 and the speed detector 226 is sent to a speed controller 227, to the self-adapting mechanism 11 and an elevator sequence controller 228 which is equivalent to the host system 201. The speed controller 227 uses the information about the position and speed of the car 220 and the information provided by the elevator sequence controller 228 and depends on feedback control rules in order to output control commands to a power converter 229.

The power converter 229 is for interpreting commands sent from the speed controller 227 and for controlling the power supply to the electric motor 223 according to the interpretation. The above-mentioned power converter 229 may be selected from inverters, converters, phase controllers and cyclo-converters according to the type of the electric motor.

Now, riders of the elevator press a button 230 on a floor, a button 231 on another floor or buttons in the elevator car. According to these operations, the elevator sequence controller 228 determines the destination of the car and such a position as one in which the car should start slowing down.

Elevators tend to show nonlinearity. For example, their cars vibrate when they pass certain floors. When vibration occurs, the control command from the speed controller 227 shows a larger value because of the enlargement of the control deviation. As a result, the self-regulating mechanism 11 shown in FIG. 32 decides that the mean square of the control command from the speed controller 227 has exceeded a certain reference value. Then, the information about the elevator operating around this instant, which is stored in the memory 35 after detected by the position detector 225 and by the speed detector 226, is used as teacher signals by the learning mechanism 36.

After the learning by the learning mechanism 36 is completed, when the conditions for the occurrence of vibration to the elevator are satisfied, the self-adapting mechanism 11 corrects the speed commands to be sent to the speed controller 227.

Figure 35:
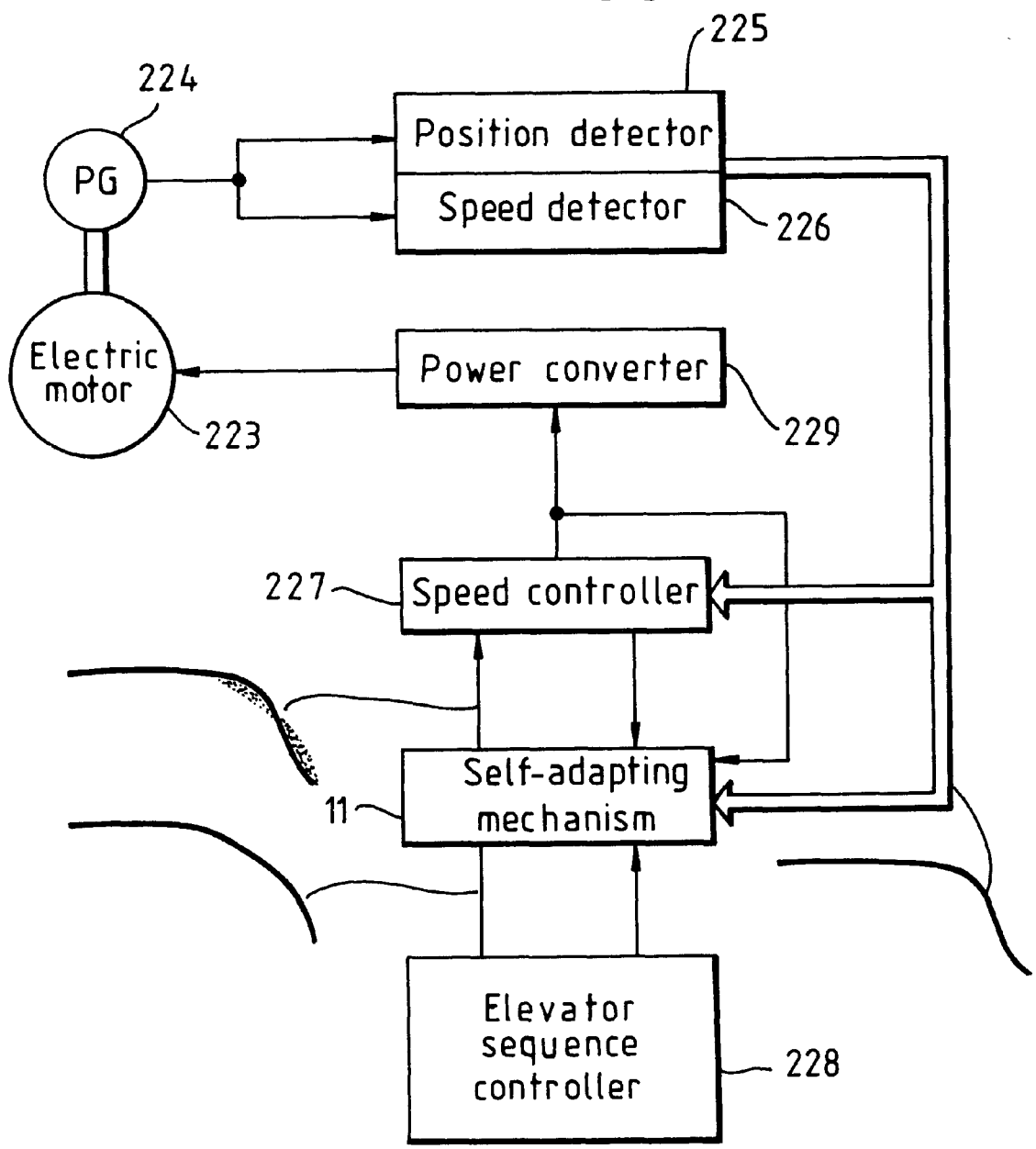
FIG. 35 illustrates in more detail the control of the elevator of FIG. 34 according to the present invention.

The above operation is schematically illustrated in FIG. 35. In response to riders' operation of pressing buttons in the car 220 or of pressing the buttons 230 or 231 on a floor, the elevator sequence controller 228 sends speed commands for running the elevator through the self-adapting mechanism 11 to the speed controller 227. When vibration occurs to the elevator car passing a particular floor, the speed controller generates a control command according to the deviation to control the power converter 229. The power converter 229 then controls the number of the revolutions of the electric motor 223. As a result, a speed curve is obtained, which is closer to an ideal speed command than the speed command output from the elevator sequence controller 228 since the speed curve is processed by the speed controller 227. To generate a speed command as close to an ideal one as possible, the value of the control command from the speed controller 227 is large, and this larger value activates the self-adapting mechanism 11 to learn. The teacher signals used here include signals representing the speed curve obtained from the speed detector 225, the conditions for the occurrence of vibration such as the conditions for the elevator going up or down past a particular floor. The self-adapting mechanism 11 outputs the above-mentioned speed curve to the speed controller 227 in such a way as to minimize the control commands output from the speed controller 227 when the above-mentioned conditions for the occurrence of vibration are input.

Figure 36:
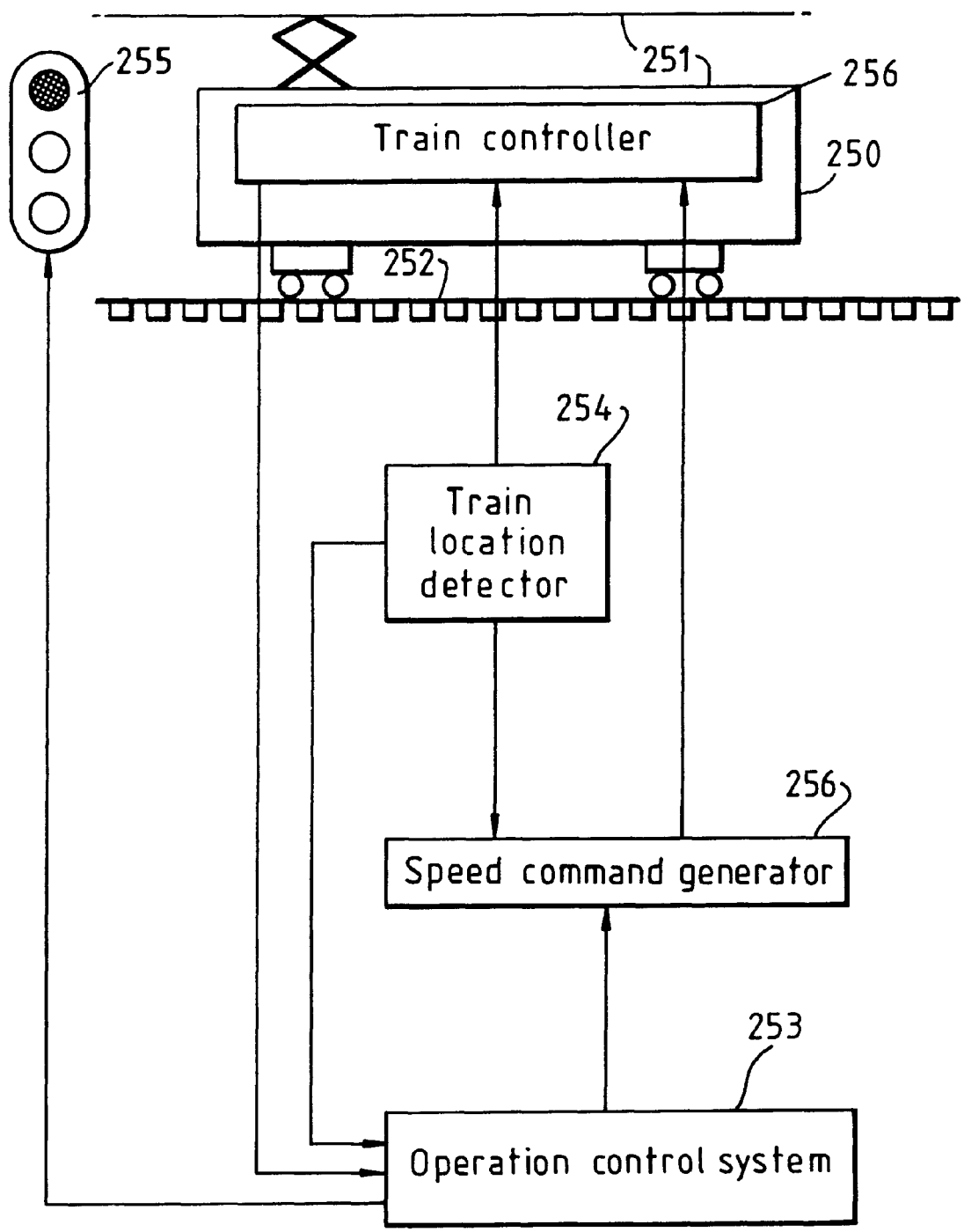
FIG. 36 illustrates an application of the present invention to the control of an electric railroad car.

Referring to FIG. 36 now, there is illustrated a control system embodying the present invention which is applied to the control of an electric railroad car. An electric railroad car 250 operates, supplied with electric power by means of an overhead wire 251 and a track 252. An operation control system 253 detects the location of the electric car 250 by using a train location detector 254 and outputs commands in accordance with this location to signals 255 and to a speed command generator 256. In response to the command from the operation control system 253, the speed command generator 256 outputs a speed command to a train controller 256. The train controller 256 uses the above-mentioned speed command and also uses train speed output from the train location detector 254 in order to control the speed of the train 250. Here, part of the train location detector 254 and of the speed command generator 256 may be separated and mounted on the electric train 250.

Figure 37:
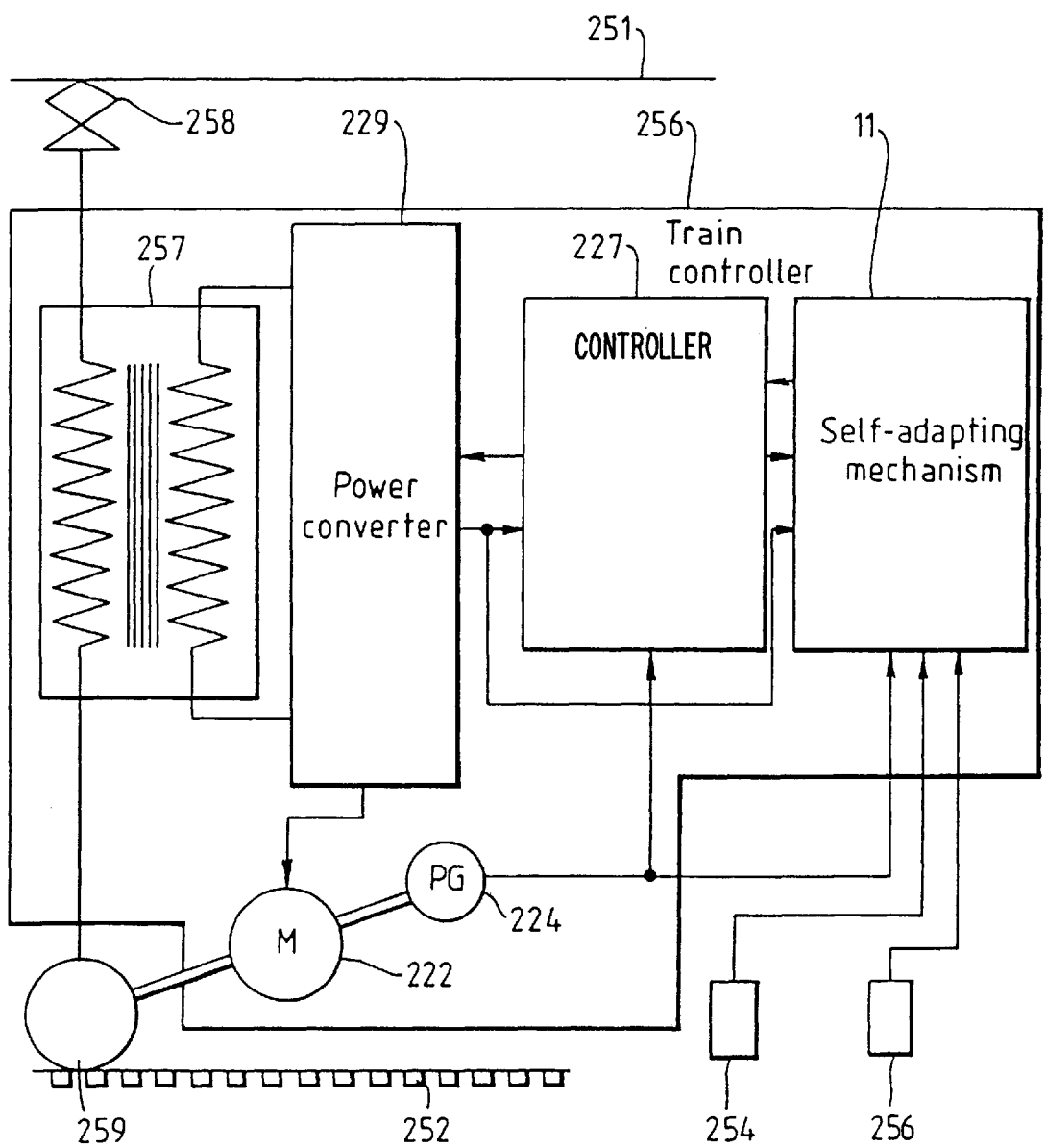
FIG. 37 illustrates an application of the present invention to a train controller.

FIG. 37 schematically illustrates the train controller 256. The output from the train location detector 254 and from the speed command generator 256 is sent to the self-adapting mechanism 11. To the self-adapting mechanism 11, the output from the controller 227, from the power converter 229 and from the pulse generator 224 is also input as a location or speed. In response to a speed command sent from the self-adapting mechanism 11 and to a location or speed sent from the pulse generator 224, the controller 227 outputs control commands to the power converter 229 and to the self-regulating mechanism 11. The power converter, supplied with electric power by the secondary winding of a transformer 257, in turn supplies power to electric motors 222 in response to the above-mentioned control command. The primary winding of the transformer 257 is connected to a pantograph and to wheels 259 in such a way that electric power is supplied by the overhead wire 251 and the track 252 to the power converter 229. This construction of the control system shown in FIGS. 36 and 37 is the same as that of the elevator controller shown in FIGS. 34 and 35. In terms of operation, the electric car control system is also the same as the elevator controller, so the description of the operation of the former is omitted.

In this embodiment, the control of an alternating current system car has been described so far. But since direct current system cars are different only in the construction of their transformers and not in their control system, the present invention has another use in direct current system cars.

Also in this embodiment, an electric car with distributed motive power has been described, but as far as the controller is concerned, an electric locomotive has the same construction as an electric car despite the motive power being centralized in the former. It will be obvious, therefore, that the present invention has still another use in electric locomotives.

Figure 38:
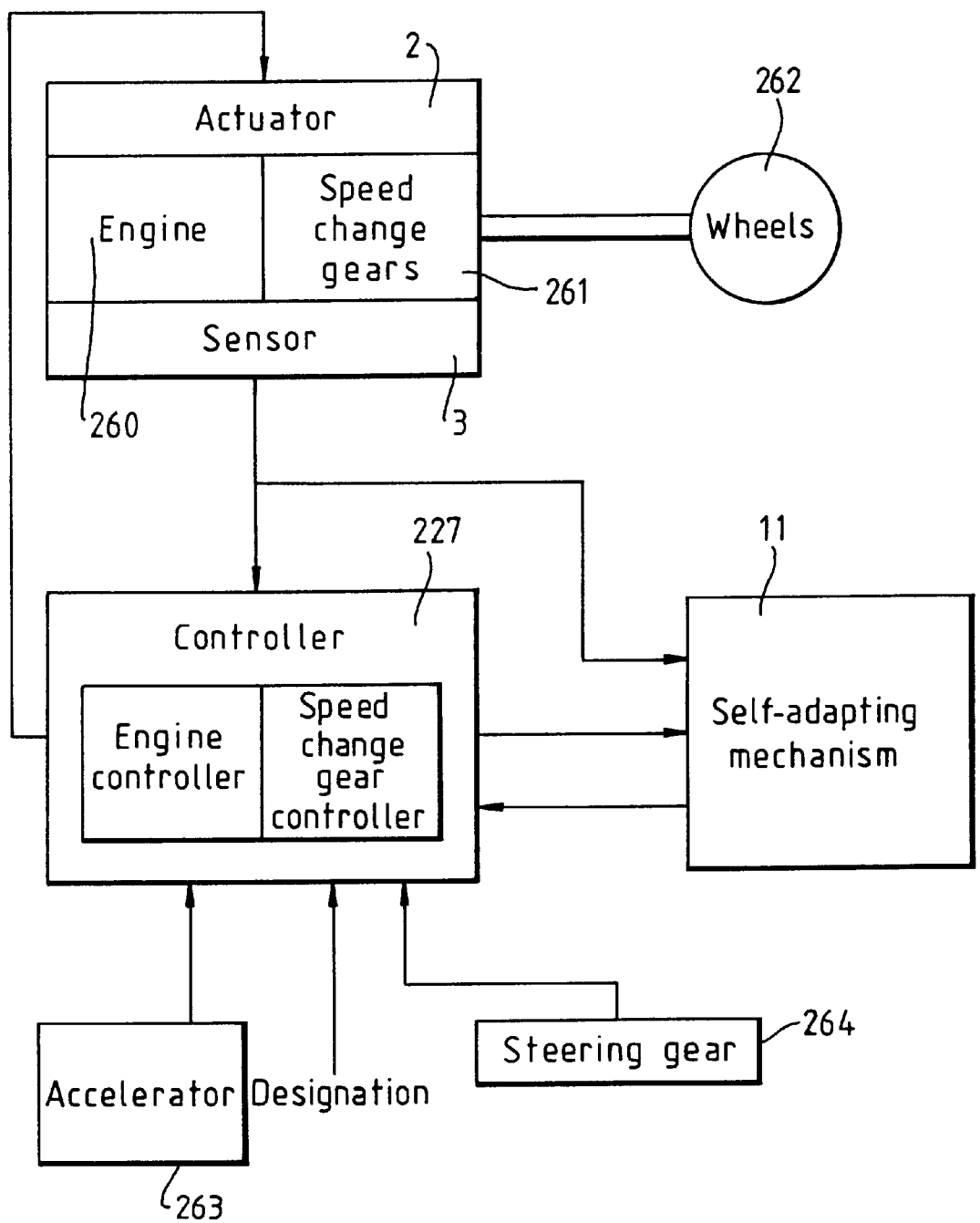
FIG. 38 illustrates an application of the present invention to an automobile controller.

Referring now to FIG. 38, there is illustrated a control system embodying the present invention which is applied to the control of an automobile. The power generated by the engine 260 in an automobile is transmitted through speed change gears 261 to wheels 262. The engine 260 is controlled by the controller 227 using actuators such as a carburetor. The condition of the engine 260 and speed change gears 261 is input to the self-adapting mechanism 11. The above-mentioned controller 227 is composed of an engine controller and a speed change gear controller, and is itself controlled by the driver manipulating an accelerator 263 and a steering gear 264.

Today, some automobiles are furnished with an automatic operative mechanism for going at constant speed. This mechanism designates the speed of the automobile and gives the designation to the controller 227 from outside the control system. The controller 227 uses feedback from the sensor to operate the automobile at constant speed.

The self-adapting mechanism 11 uses the output from the sensor 3 and the information from the controller 227 to change commands for the actuators 2 when the control deviation becomes larger. This control deviation enlargement is thought to be caused by a jam of such factors as secular change, the replacement of lubricant and weather change, which can only be handled by a non-linear control system. The description below will be of the operation of the control system for such an automobile, given in connection with the above-mentioned rolling mill operation.

It is assumed that the automobile runs at constant speed designated by the driver. The driver, seeing an indicator such as a speedometer show a slowdown, steps on the pedal for the accelerator 263. Then, the same operation follows as the operation in FIG. 33 performed after the operator of the rolling mill has worked at the operator console 211 to give an activation signal to the self-adapting mechanism 11. Automobiles have no peculiarities in respect of this operation.

Figure 39:
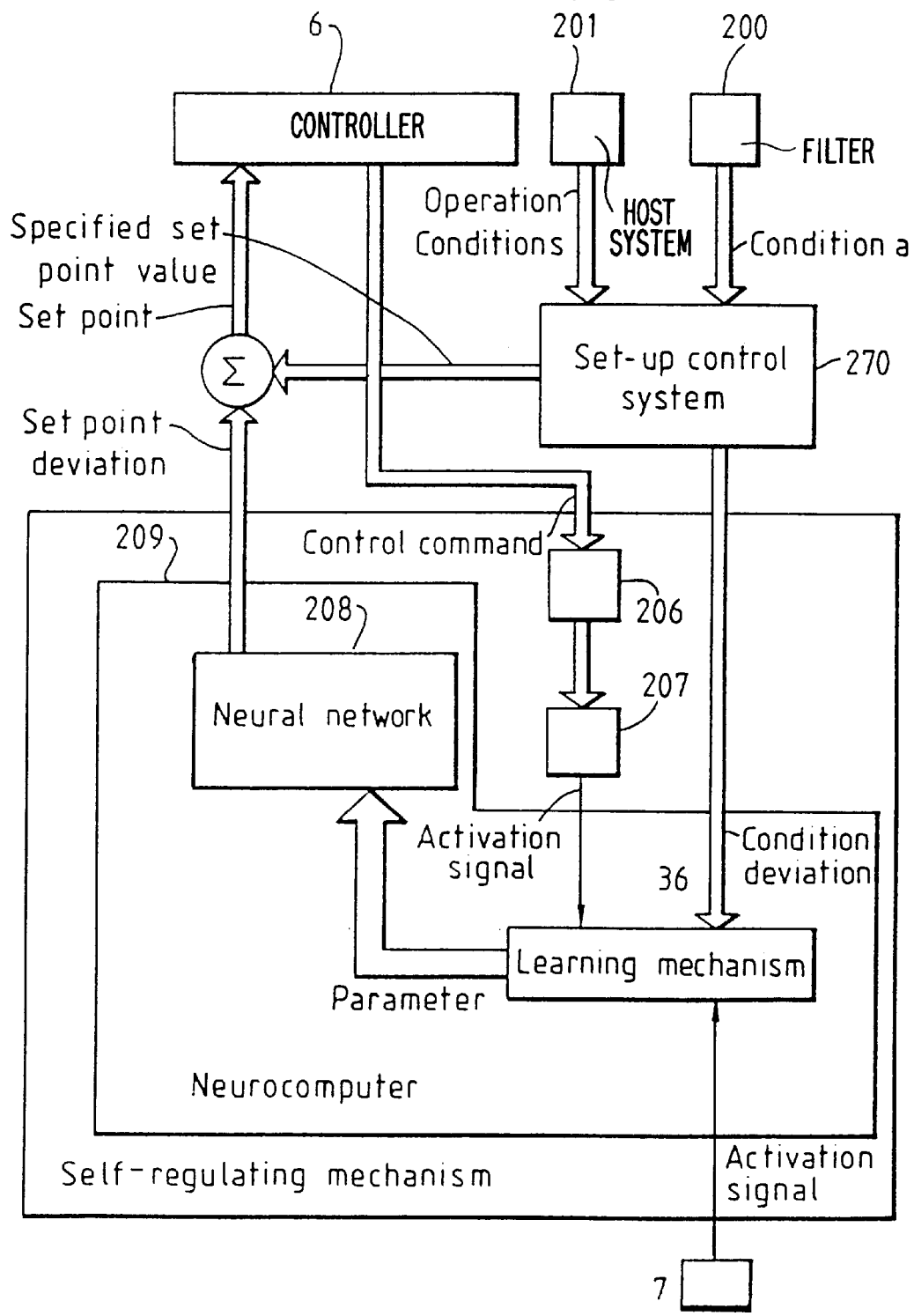
FIG. 39 illustrates a further embodiment of the present invention, incorporating set point control.

Now, FIG. 39 illustrates a modification of the embodiment of the present invention shown in FIG. 32. This modification is for compensating for errors by using a model of a controlled system especially when the model tends to show nonlinearity but is comparatively acceptable. Operation conditions from the host system 201 and the condition a from the filter 200 are sent to a setup control system 270. This setup control system 270 specifies set point conditions and set points and then outputs as a condition deviation the deviation of the condition a from set point condition to the learning mechanism 36. The difference of this embodiment from the embodiment shown in FIG. 32 is that the neuro-computer 209 operates depending not on absolute values but on the system of deviation values which are a shift from a certain criterion (a set point value, set point condition specified by the setup control system 270)

Figure 40:
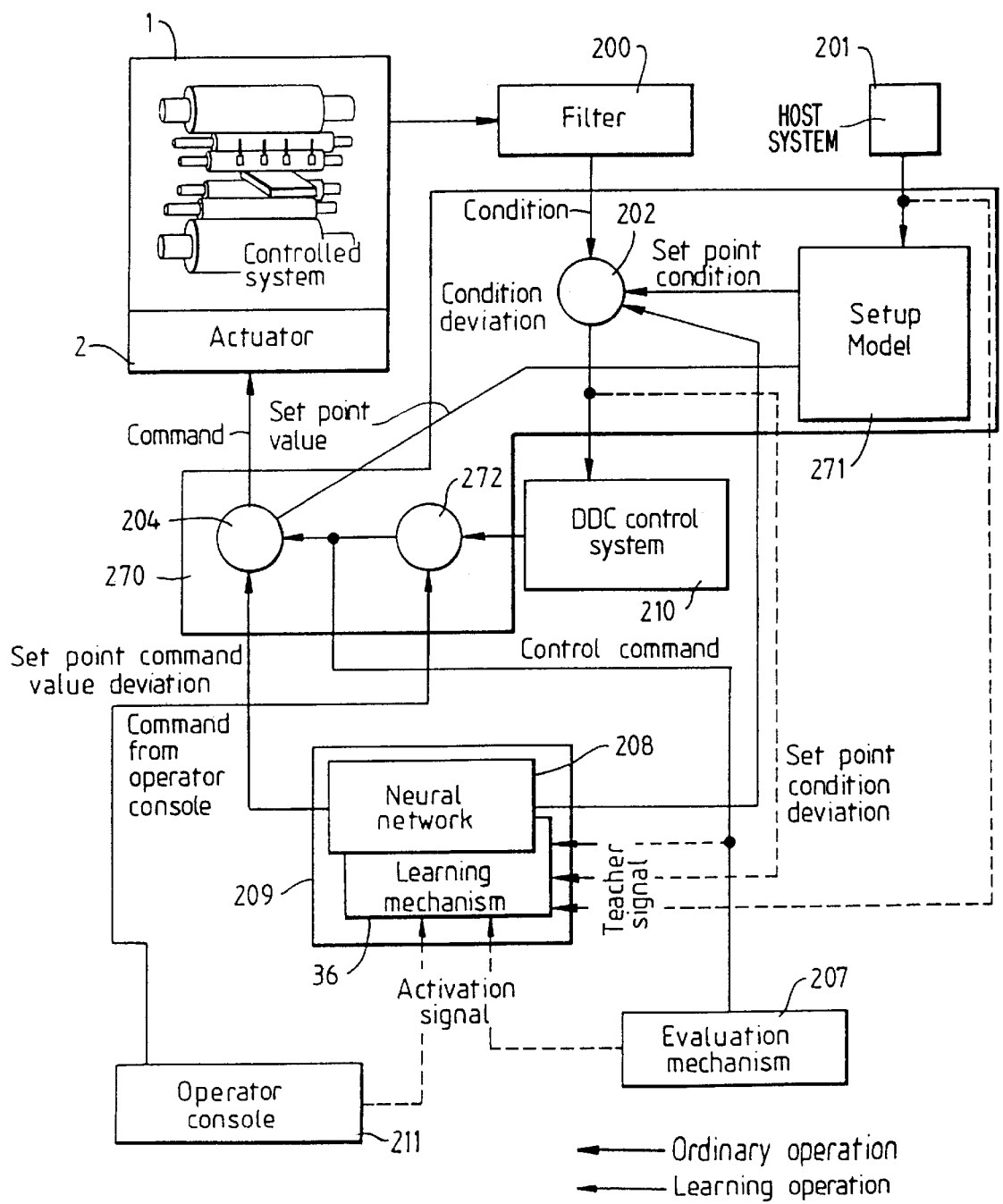
FIG. 40 is a detailed block diagram of a further embodiment in which set point control is applied to a controlled system.

FIG. 40 illustrates a modification of the embodiment shown in FIG. 33 with regard to its control of the thickness of a workpiece on a rolling mill. A setup model 271, receiving operation conditions sent from the host system 201, outputs set point values and set point conditions for the controlled system. The condition of the controlled system is sent through the filter 200 to the adder 202. The adder 202 applies addition and subtraction to the above-mentioned conditions, the set point conditions sent from the setup model and the set point condition deviation from the neural network to obtain condition deviations. The condition deviations are sent to the DDC control system and to the memory 35, and then are input as teacher signals to the learning mechanism 36 in the neurocomputer 209. The DDC control system operates so that control deviations can become zero in the regulator problem process, and sends control commands to the adder 272. The adder 272 adds the above-mentioned control command and the command sent from the operator console operated by hand, and the result is input as a new command to the adder 204 and to the evaluation mechanism 207. The adder 204 adds control commands, the set point values from the above-mentioned setup model 271 and the set point deviations from the neural network 208 so as to generate commands for the actuators 2. These setup model 271 and adders 202, 272 and 204 are as a whole referred to as the setup control system 270.

In a rolling mill equipped with a workpiece thickness control system constructed in the above manner, when the rolling mill operates, its temperature rises, leading to decrease of the frictional resistance of lubricant and so to the change of workpiece thickness. As a result of this, a deviation from set point conditions occurs, namely, the condition deviations output from the adder 202 become larger. Then, the DDC control system 210 generates commands so as to diminish the condition deviations. Since control commands usually amplify deviations for the purpose of diminishing them, the evaluation mechanism 207 starts to operate to initiate the learning operation. The adder 204 add the above-mentioned control commands and the set point values from the setup model 271 to generate commands for the actuator 2.

Now, the process of learning by the neurocomputer 209 will be described. The input for teacher signals to the learning mechanism 36 is operation conditions sent from the host system 201, and the output from the learning mechanism is condition deviations and control commands. When the learning operation ends, the output from the neural network 208 is sent as set point condition deviations to the adder 204 and as set point command value deviations to the adder 204. As a result of this, the output from the adder 202, which is equal to the deviations of the set point conditions before the learning operation, after the learning operation this output turns into zero, the set point condition deviations being subtracted from the output. As for commands, the output from the DDC control system is zero, but set point deviations are output from the neural network, so the same commands as the control conditions before the learning operation are obtained from the adder 204.

B-3—Further Developments of Machine Learning

In the above discussion of the general principles, it was assumed that the pattern recognition mechanism operates on the basis of patterns pre-determined by the operator. The system then used fuzzy logic to select one or more appropriate ones of those patterns on which to base the control logic.

However, as mentioned briefly above it is also possible to apply e.g. neurocomputer techniques to the development of such patterns, so as to derive the patterns automatically on the basis of the behavior of the system under given control conditions. This was the second development of the first aspect of the present invention and will now be discussed in more detail.

Figure 41:
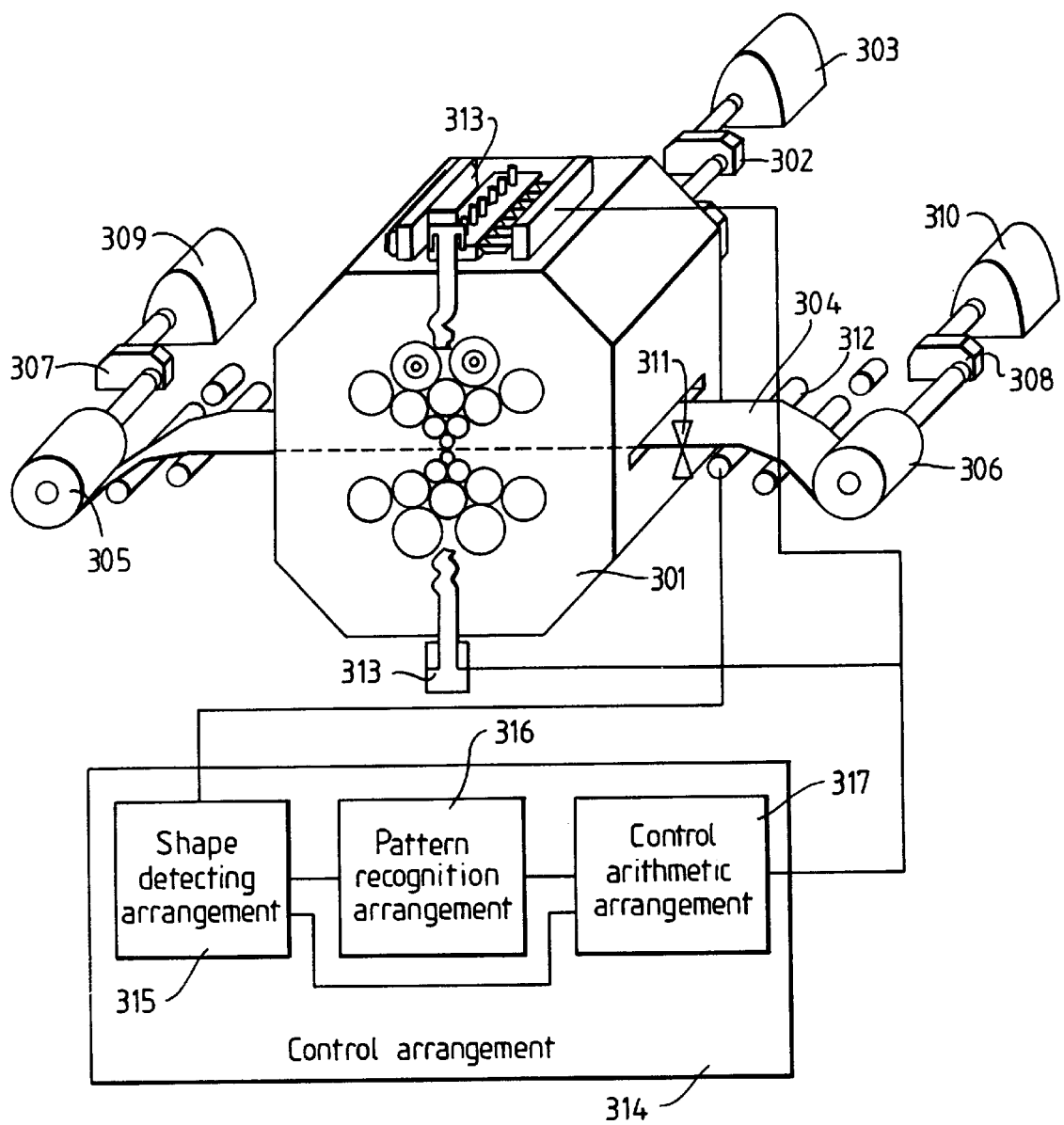
FIG. 41 illustrates the structure of a sendzimir mill to which the present invention may be applied.

Referring to FIG. 41 a sendzimir mill ZR mill 301 (hereinafter referred to as the ZR mill) comprising a plurality of rolls is driven by a motor 303 via a gear 302 to roll a material 4. The material 304 is supplied from either of a left tension reel 305 or right tension reel 306 and is wound up by the other reel. The left tension reel 305 and the right tension reel 306 are connected with a motor 309 and a motor 310 via a gear 307 and a gear 308, respectively. Speeds of the motor 303, the motor 309, and the motor 310 can be controlled to control tensions exerted to the material 304 at an inlet and an outlet of the ZR mill 301. The material 304 has its thickness and shape measured with a thickness gauge 311 and a shape detector 312. The measured values are fed to a control arrangement 314. The control arrangement 314 comprises a shape detecting arrangement 315 which can process a signal output of the shape detector 312 and can feed it out as shape data, a pattern recognition arrangement 316 which can process the shape data and can feed out degree of coincidence of the result with a pattern stored therein, and control arithmetic arrangement 317 which can reflect to control fuzzy manipulation of an operator. The control arrangement 314 can generate a manipulation command to an actuator 313 of the ZR mill 311.

Figure 42:
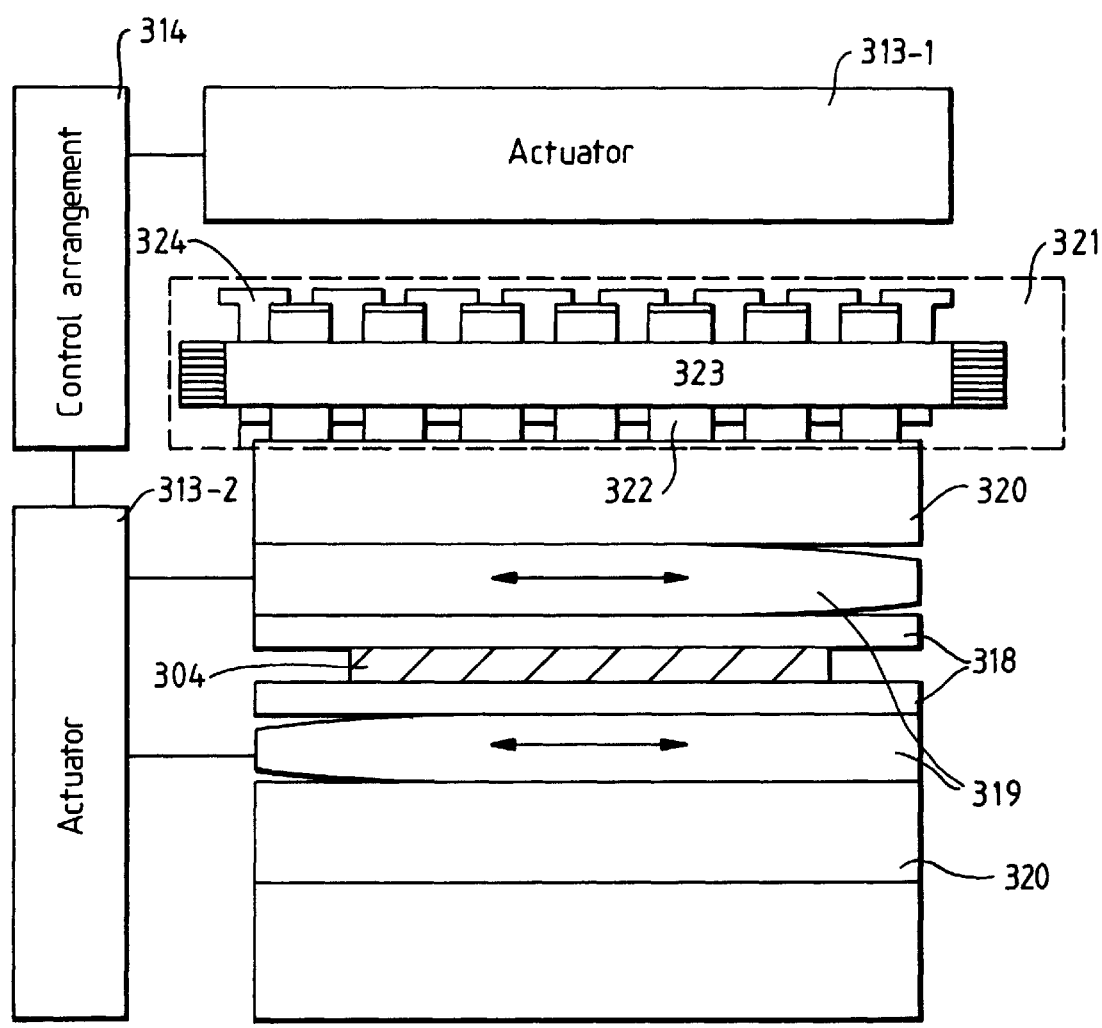
FIG. 42 shows in more detail a part of the sendzimir mill of FIG. 41.

FIG. 42 shows construction of the ZR mill 311.

The ZR mill 311 comprises a pair of upper and lower work rolls 318 which are in direct contact with the material 304 to press the material 304 to thin sheet, a pair of first intermediate rolls 319 which put the work rolls 318 in to apply weight onto them, a pair of second intermediate rolls 320 which put the first intermediate rolls 319 to apply weight onto them, and an AS-U roll 321 which presses down one of the second intermediate rolls 320 to apply weight onto it.

The AS-U roll 321 comprises divided rolls 322, a shaft 323, and a plurality of saddles 324. The saddles 324 can be moved up and down by an actuator 313-1 following a command from the control arrangement 314 to make the shaft 323 bend accordingly. With the plurality of saddles 324 moved, the shaft 323 can be deformed to a desired shape. The deformation of shaft 323 can be transferred via the plurality of divided rolls 322 to the second intermediate rolls 320, the first intermediate rolls 319, the work rolls 318, and material 304 in sequence to control shape of the material 304. One end of each of the first intermediate rolls 319 is tapered to reduce the weight exerted to the material 4 under the taper so that the end can be made thicker. The first intermediate rolls 319 can be moved in their axial direction by an actuator 313-2 following a manipulation command from the control arrangement 314. With the first intermediate rolls 319 moved in the axial direction, the material 304 can be controlled on the shape of its ends.

Figure 43:
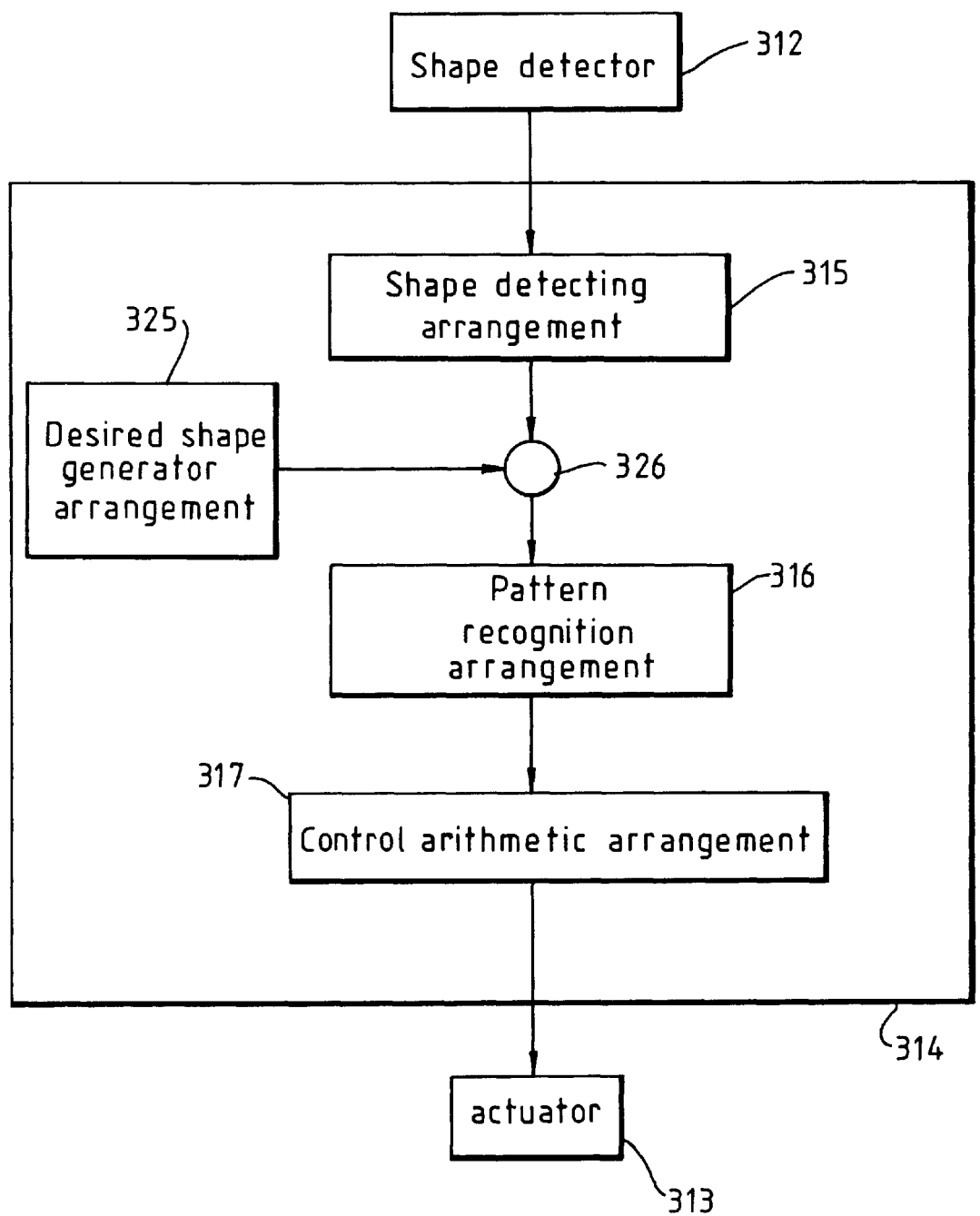
FIG. 43 is a block diagram of the control arrangement in the sendzimir mill of FIG. 41.

FIG. 43 shows a block diagram for an example of the control arrangement 314.

In the figure, a signal output of the shape detector 312 is fed into a waveform arithmetic arrangement 326 through the shape detecting arrangement 315 which can eliminate noises. A signal of desired shape generator arrangement 325 which can generate a desired shape for the material 304 is also fed into the waveform arithmetic arrangement 326. The waveform arithmetic arrangement 326 subtracts the desired shape from the shape detection result to obtain a shape deviation $\Delta\epsilon$ for correction by control to feed it to the pattern recognition arrangement 316. The pattern recognition arrangement 316 feeds to the control arithmetic arrangement 317 a ratio of waveform components contained in the shape deviation, which has been stored in the pattern recognition arrangement 316 in advance. The control arithmetic arrangement 317 can make the fuzzy manipulation of the operator knowledge and feeds it to the actuator 313 with use of control algorithms such as a fuzzy control utilized in control and a multi-variable control for which a control model is made clear.

Figure 44:
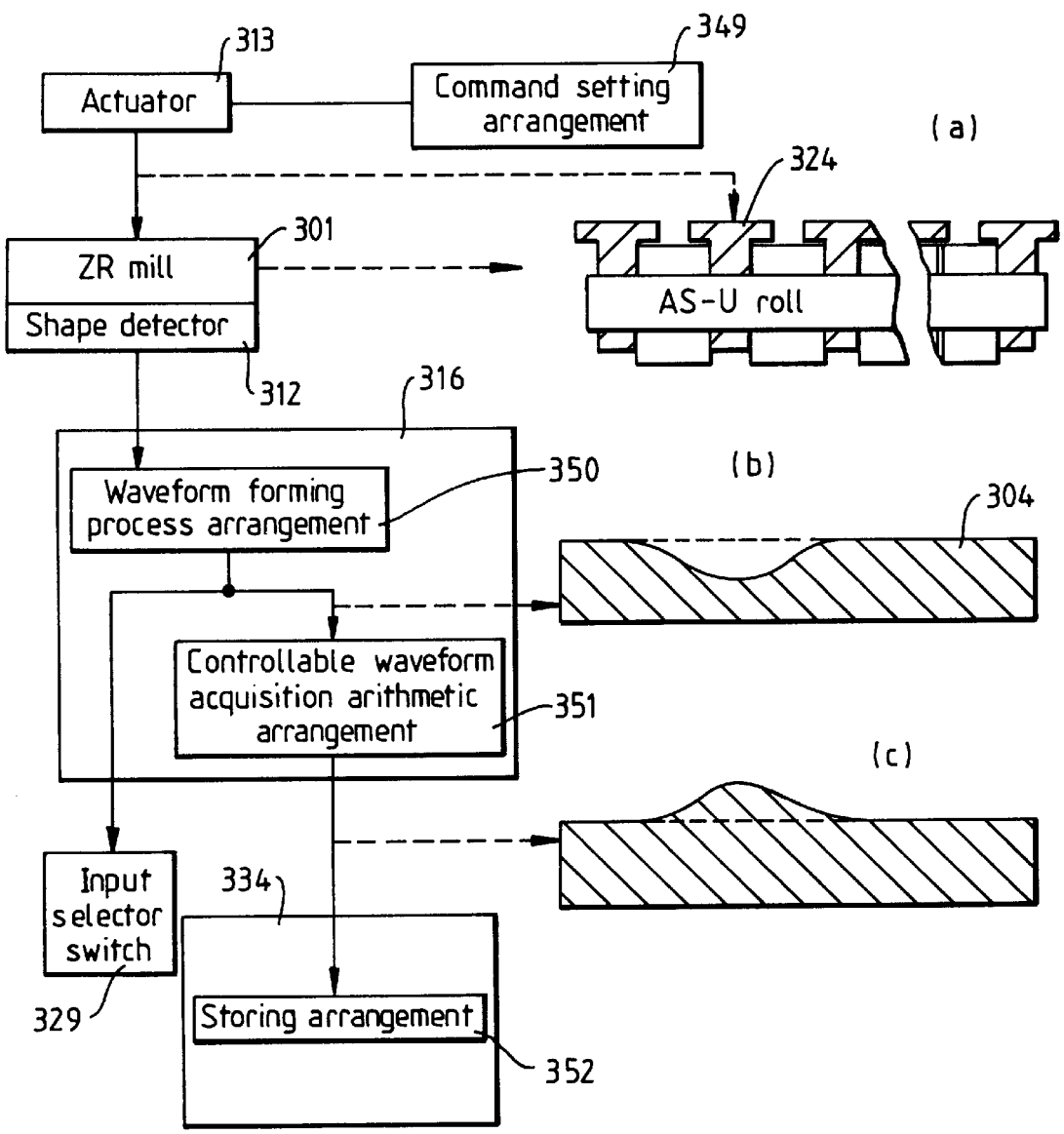
FIG. 44 illustrates shape patterns which occur in the sendzimir mill of FIG. 41, and the processing thereof.

FIG. 44 shows a block diagram for storing an actual shape pattern into the input signal generator arrangement 334.

A command setting arrangement 349 generates a manipulation command is given to the actuator 313 for operator or programmed operation. In accordance with the command, the actuator 313 drives the saddles 324 as shown in FIG. 44(a). As a result, the ZR mill 301 can change the shape of the material 304. The shape data of the shape detector 312 which can detect the shape of the material 304 is fed to a waveform forming process arrangement 350 of the shape detecting arrangement 315. The waveform forming process arrangement 350 can eliminate noises and feed the shape of the material 304 shown in FIG. 44(b) to a controllable waveform acquisition arithmetic arrangement 351. The controllable waveform acquisition arithmetic arrangement 351 which has received the shape pattern shown in FIG. 44(b) can obtain a controllable waveform shown in FIG. 44(c) which can make the shape pattern (b) flat when the actuator 313 is run. It then the waveform (b) into a storing arrangement 352 of the input signal generator arrangement 334. The waveform (c) is a part of the shape pattern used for the neural network 328 to learn.

As described above, the AS-U roll 321 can store the shape waveforms when the saddles 324 of the AS-U roll 321 are actuated by the actuator 313-1. In storing, the shape waveforms which are changed in proportion to the manipulating variable of the saddles 324 are normalized with the maximum value of the manipulating variable so that the waveform pattern corresponding to unit manipulating variable can be made '1', and the other patterns are '0'.

On the other hand, storing a lateral waveform which can move the work rolls 318 in the axial direction is described below with reference to FIG. 45.

FIG. 45(a) shows a shape waveform Ⓐ of the material 4, a controllable waveform ⓐ, and position of one of the first intermediate rolls 319 when they are normalized to '1' with the maximum value of the lateral manipulating variable. The pattern controllable waveform ⓐ is fed to the neural network 328, a signal output 354 output the teacher signal generator arrangement is set to '1' and the other output signals to '0' so that an output 353 becomes '1' and the other output '0', and learning is executed.

In turn, a normalized lateral manipulating variable of 0.5 is fed to the ZR mill 301. FIG. 45(b) shows a shape waveform Ⓑ of the material 304, a controllable waveform ⓑ, and position of one of the first intermediate rolls 319. The controllable waveform ⓑ, as with in FIG. 45(a), is made to learn by the neural network 328. It however is different in that the learning is made so that the output 354 of the teacher signal generator arrangement becomes the lateral manipulating variable of 0.5.

Similarly, FIG. 45(c) shows the relationship when the lateral manipulating variable is made 0.0.

Figure 45:
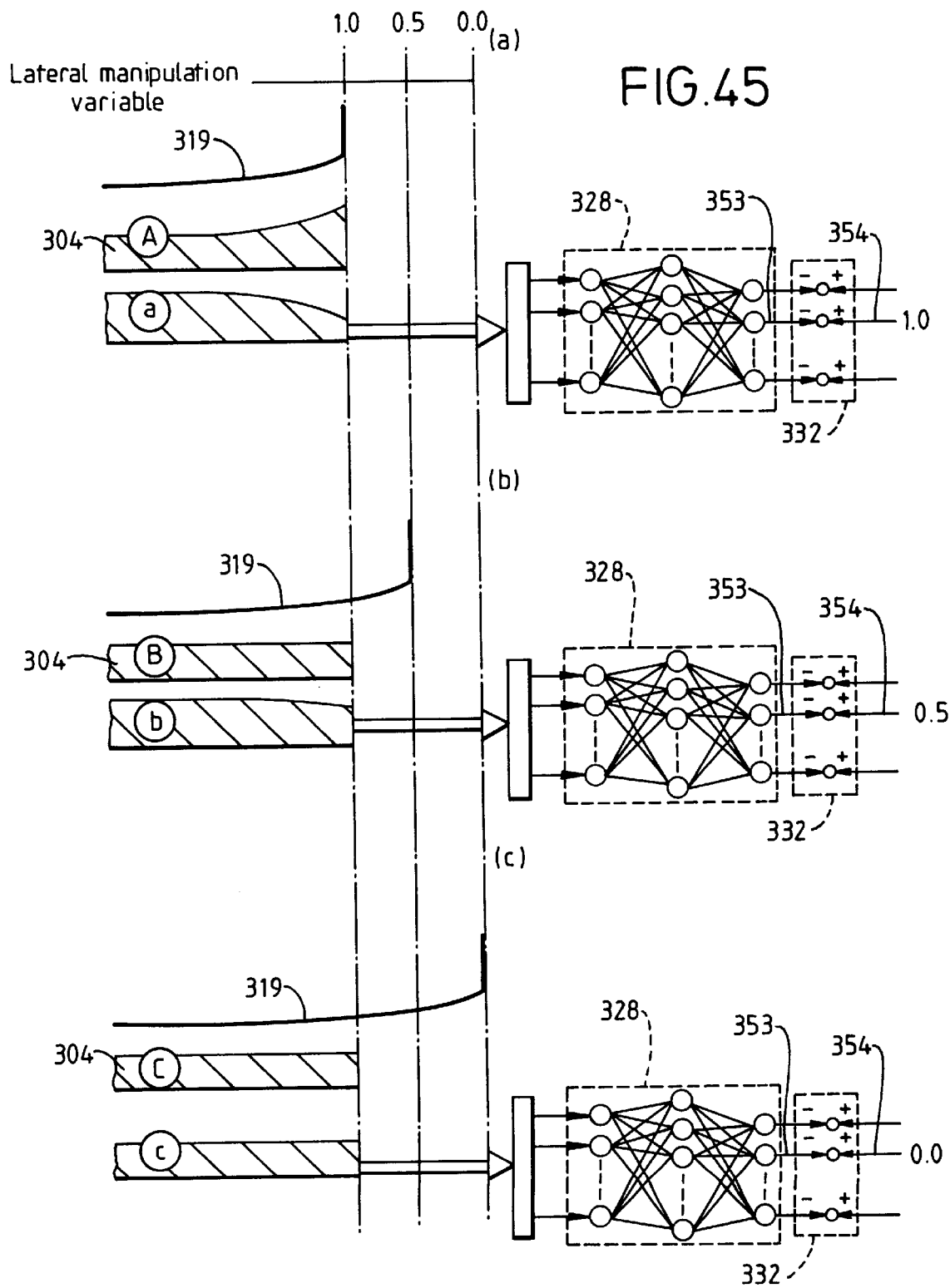
FIG. 45 illustrates lateral movement of rollers of the sendzimir mill of FIG. 41.

In FIG. 45, learning is made for the three typical lateral manipulating variables of 1.0, 0.5, and 0.0. For more precise control, the number may be preferably increased; and, for more coarse control, it may be decreased.

The learning can be made because the neurocomputer 327 can serve for interpolation.

The following describes the shape pattern and control method. First, assuming the material 304 be perfectly flat, the shape pattern is referred to as difference between the output of the shape detector 312 and the flat rolled material. With the output of the shape detector 312 for the ZR mill 301 controlled so as to be flat, the actual rolled material has thinner end portions and thicker central portion when the tension is removed. For the reason, the shape pattern of the shape detector 312 for the flat material 304 has thicker end portions and thinner central portion as shown by a desired shape ref in FIG. 46. It therefore is necessary to control so that the shape of the material 304 can be made to be the desired shape ref. A control pattern $\Delta \epsilon$ is obtained by subtracting the desired shape ref from the shape pattern $\epsilon$, and control is made so that the control pattern $\Delta \epsilon$ becomes zero. The shape pattern output of the shape detector 312 then becomes the desired shape ref. This makes the rolled material flat.

FIG. 46 shows examples of the shape patterns given on the basis of the concept described above.

In the figure, for example, item 3 has a shape pattern A to which a control pattern a corresponds. In control, the No. 3 saddle of the AS-U roll is moved upward as shown.

Similarly, as another example, item 5 has the upper and lower work rolls 318 moved to increase their normalized manipulating variables.

Figure 47:
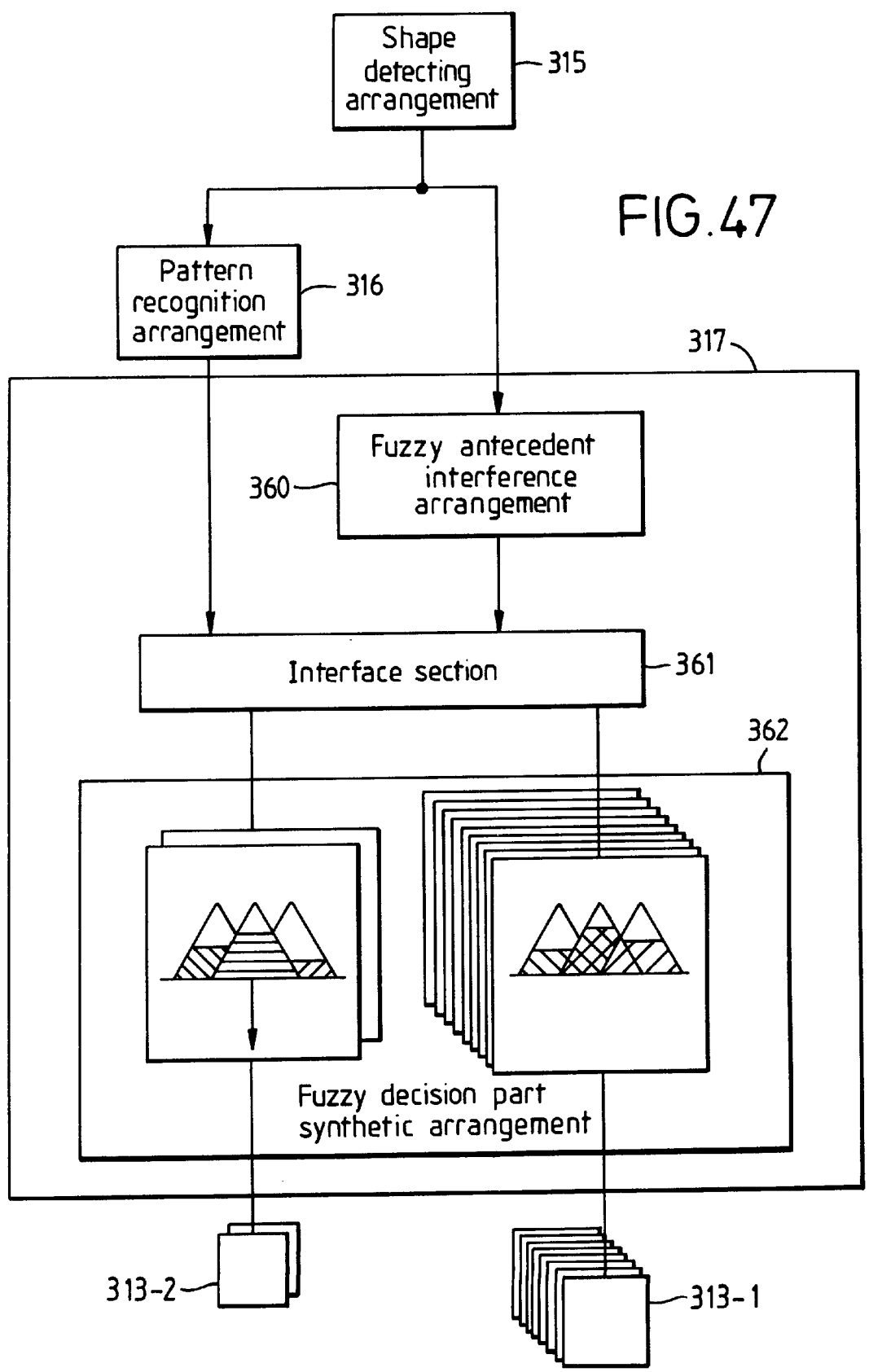
FIG. 47 shows the combination of control patterns according to fuzz logic.

FIG. 47 shows an example of the control arithmetic arrangement 317 which makes control with used of the information obtained by the pattern recognition arrangement 316 and the shape detecting arrangement 15.

The pattern recognition arrangement 316 can feed out components of the shape pattern contained in the operation waveform. If the control arithmetic arrangement 317 makes use of a fuzzy inference as control rule, a plurality of output lines of the pattern recognition arrangement 316 have the fuzzy inference rules assigned thereto. The fuzzy inference is described in detail in "Fuzzy Neurocomputing" by Trikepps Co. If the control arithmetic arrangement 317 makes the fuzzy inference calculation, the output of the pattern recognition arrangement 316 is made degree of assurance.

On the other hand, the signal output of the shape detecting arrangement 315 is directly fed to a fuzzy antecedent interference arrangement 360, and its adaptability with the antecedent of the fuzzy rule is fed out to an interface section 361 as the degree of assurance. The fuzzy antecedent interference arrangement 360 is an arrangement of rules which are made from operator's qualitative inferences.

The degree of assurance which is the output of the pattern recognition arrangement 316 and the fuzzy antecedent interference arrangement 360 is fed to the rules corresponding to the actuator 313 of a fuzzy decision part synthetic arrangement 362 through the interface section 361. The actuator 313 has a manipulation command given by a fuzzy control in which for example, a center of gravity of a triangle is used as the manipulating variable.

Figure 48A:
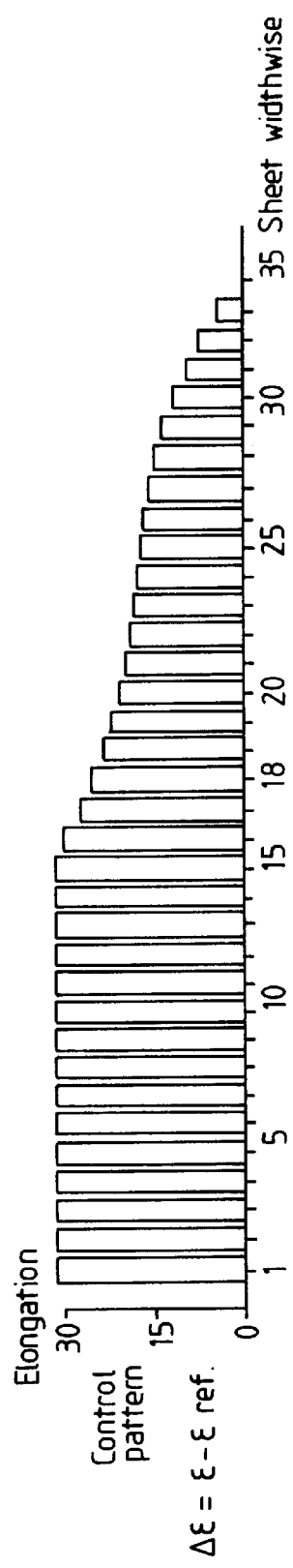
FIG. 48(a), 48(b), 48(c), 48(d), 48(e), 48(f), 48(g) show the development of control patterns by a neuro computer.
Figure 48B:
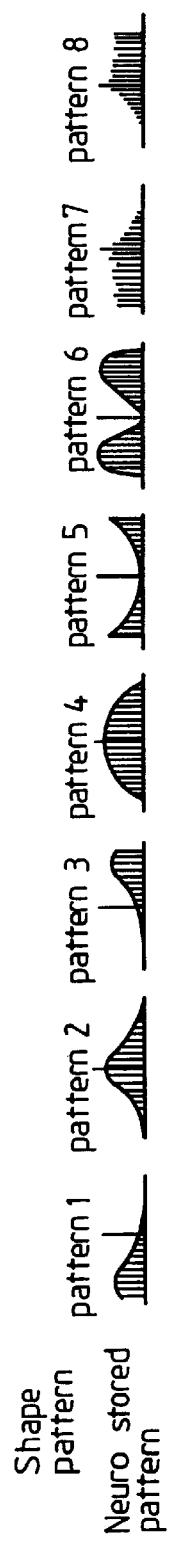
Figure 48C:
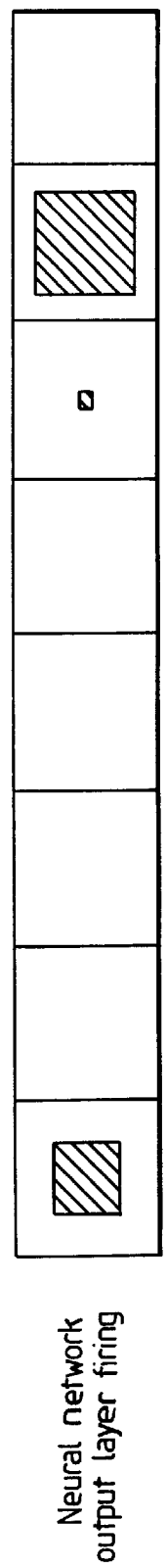
Figure 48D:
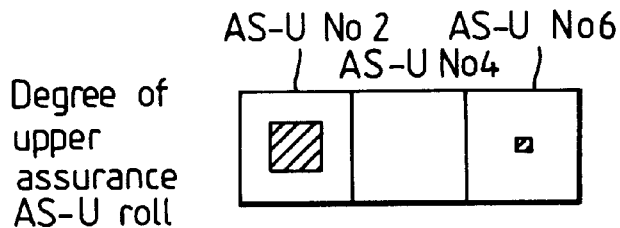
Figure 48E:
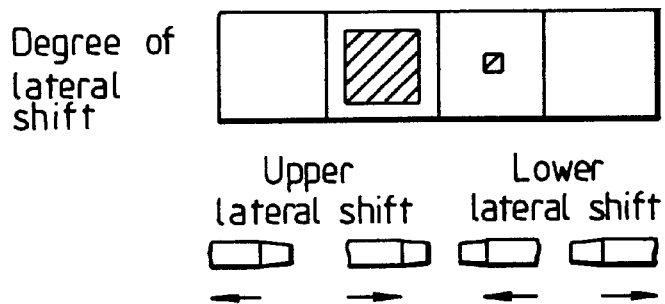

FIGS. 48(a) to 48(g) show relationships between the input of the neurocomputer 327 and its output. The control pattern $\Delta \epsilon$ is given by $$\Delta \epsilon = \epsilon - \epsilon \text{ref}$$

which is indicated by the bar graph of FIG. 48(a) in the figure. Heights of the bars are outputs of 335 shape detector 312 placed vertically. FIG. 48(b) shows eight shape patterns stored in the neurocomputer 327 as neuro stored patterns 1 through 8 as an example. If the control pattern $\Delta \epsilon$ is fed to the neurocomputer 327, each value of the outputs of the neural network 328 is obtained. The values are represented by areas of squares in FIG. 48(c). The larger the area is, the higher is the degree of coincidence. The patterns are made to correspond to the actuator 313. The pattern 1, for example, is made to correspond to the No. 2 roll of the AS-U roll 321, and the pattern 7 is to the lateral shift of the upper rolls of the work rolls 318 (FIGS. 48(d) and 48(e)).

Figure 48F:
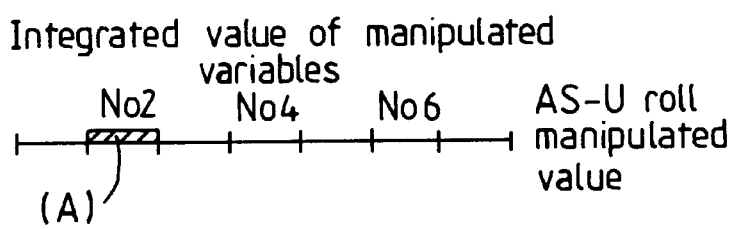
Figure 48G:
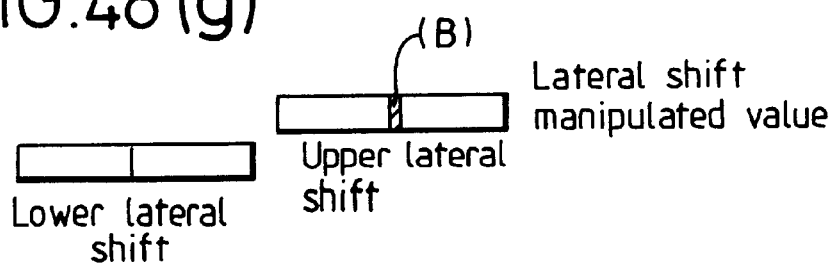

As a result, as for the manipulating variable (a) (FIG. 48(f)) of the AS-U roll and the upper lateral shift (b) of the first intermediate roll 318 (FIG. 48(g)), these correspond to the areas mentioned above. FIGS. 48(f) and 48(g) shows states that the upward manipulating command is give for No.2 roll of the AS-U roll 321 and the rightward shift manipulating command is give for the upper roll of the work rolls 318.

FIG. 49 shows results of three-dimensional simulations of the changes obtained at intervals of sampling time when the control mentioned above is made for a certain period.

Figure 49B:
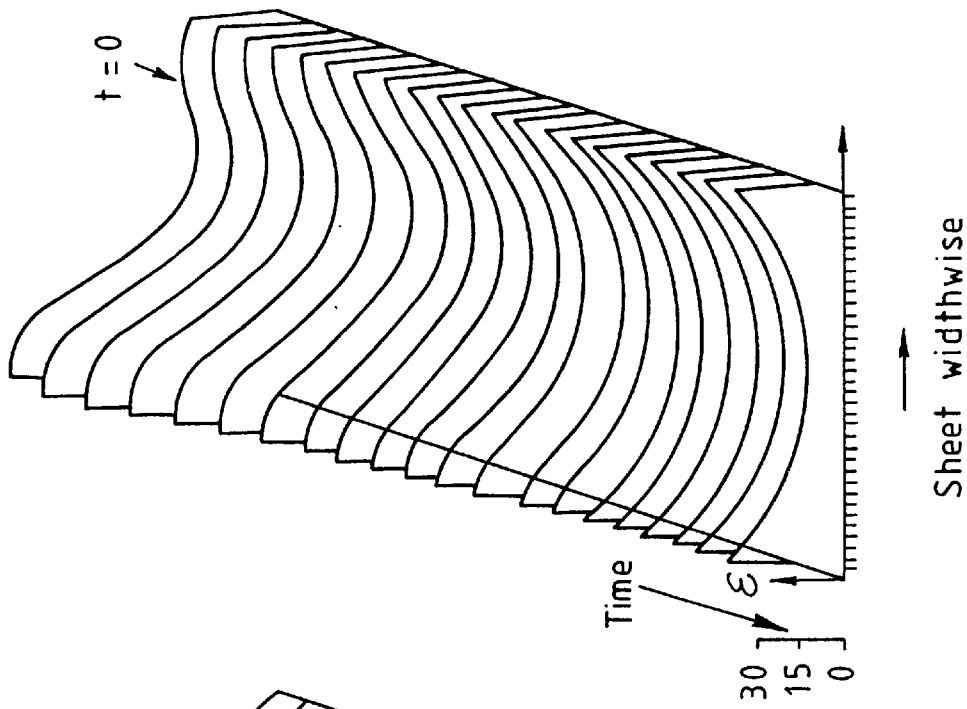
FIGS. 49(a), 49(b) show the results of pattern generation according to the present invention.
Figure 49A:
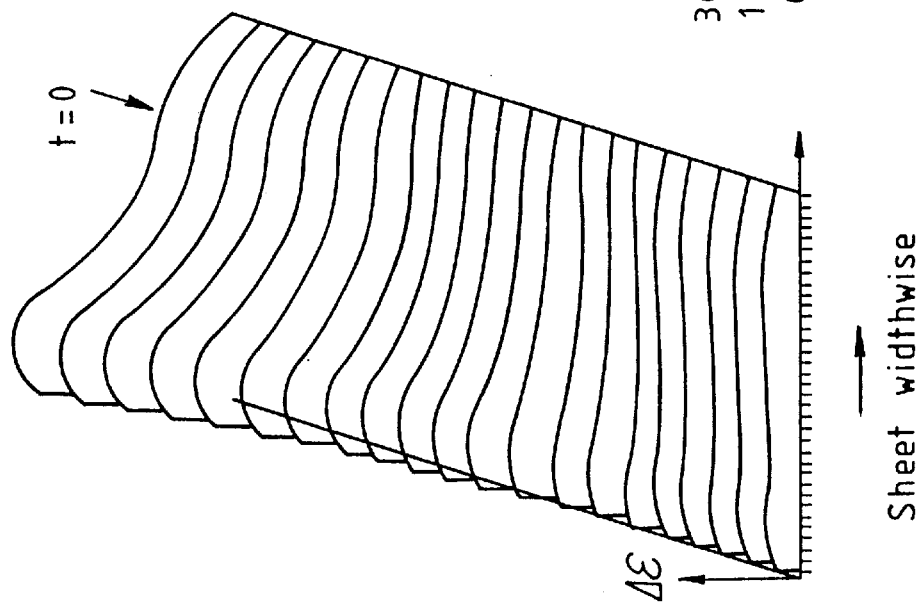

FIG. 49(a) shows the control shape Δε, and FIG. 49(b) is the shape pattern ε. It is found that the shape pattern which is worse at t=0 is changed to the desired pattern ε with time, and the control pattern becomes rather flat.

C—Serial Control

The second aspect of the present invention discussed above is concerned with arrangements in which control is on the basis of a series of modules. Embodiments discussing the aspect of the present invention in more detail will now be described.

Figure 50:
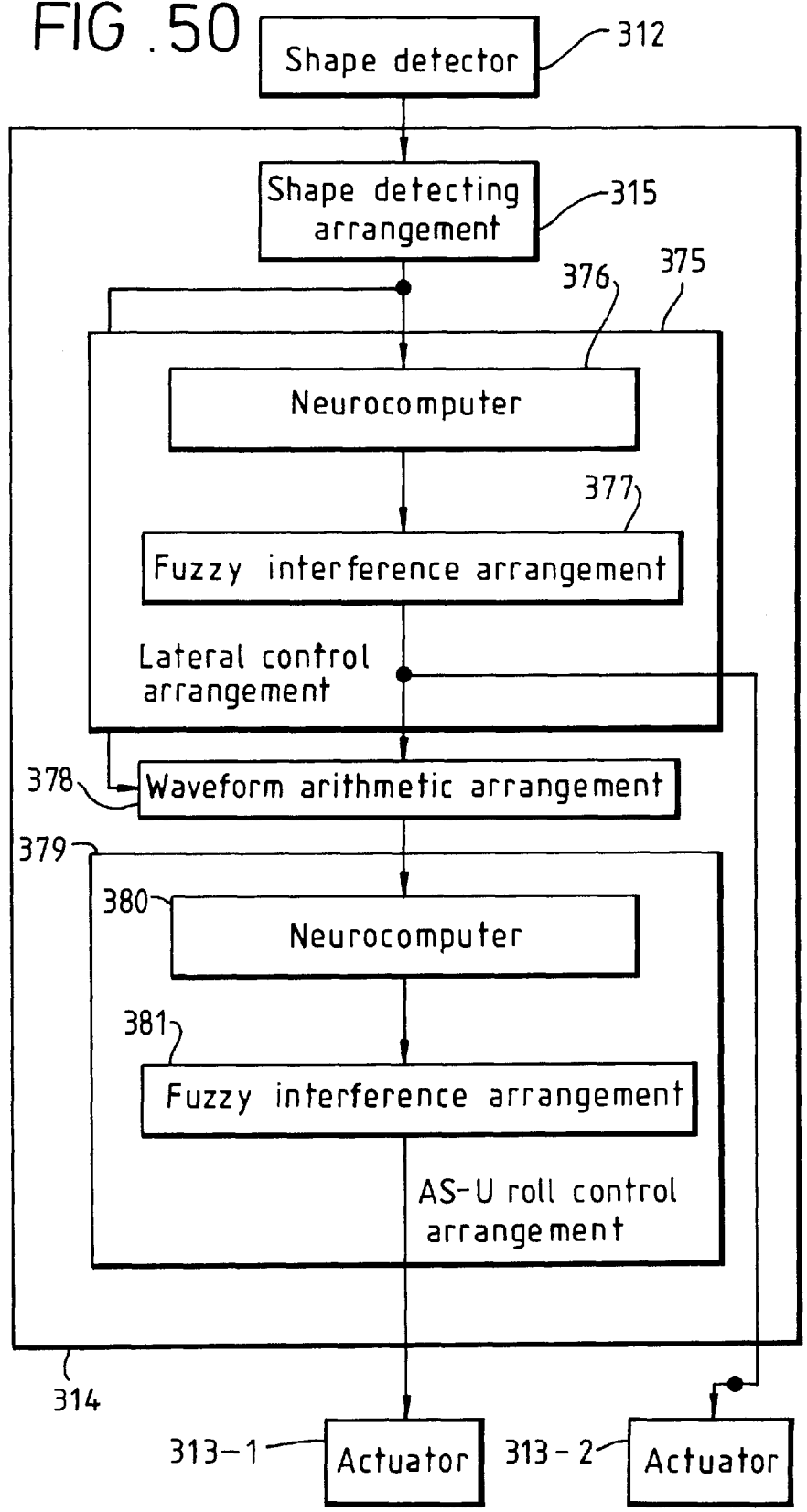
FIG. 50 shows a further embodiment of the present invention, incorporating serial control.

FIG. 50 is a block diagram for another embodiment of a shape control method and control system for rolled material according to the present invention.

The construction shown in FIG. 50 is different from that of FIG. 43 in the pattern recognition arrangement 316 and the control arithmetic arrangement 317. In FIG. 50, the control pattern output of the shape detecting arrangement 315 is fed to a neurocomputer 576 and a fuzzy interference arrangement 377 forming a lateral control arrangement 375 in sequence. The lateral control arrangement 375 determines the lateral manipulating variable, which makes a predictable operation waveform to be fed out of a waveform arithmetic arrangement 378. The waveform arithmetic arrangement 378 subtracts the waveform predicted in the lateral control from the control pattern output of the shape detecting arrangement 315, and feeds the remainder to a AS-U roll control arrangement 379. The AS-U roll control arrangement 379 comprises a neurocomputer 380 which is a pattern recognition arrangement and a fuzzy interference arrangement 381 which serve same as the pattern recognition arrangement 316 and control arithmetic arrangement 317.

Figure 51:
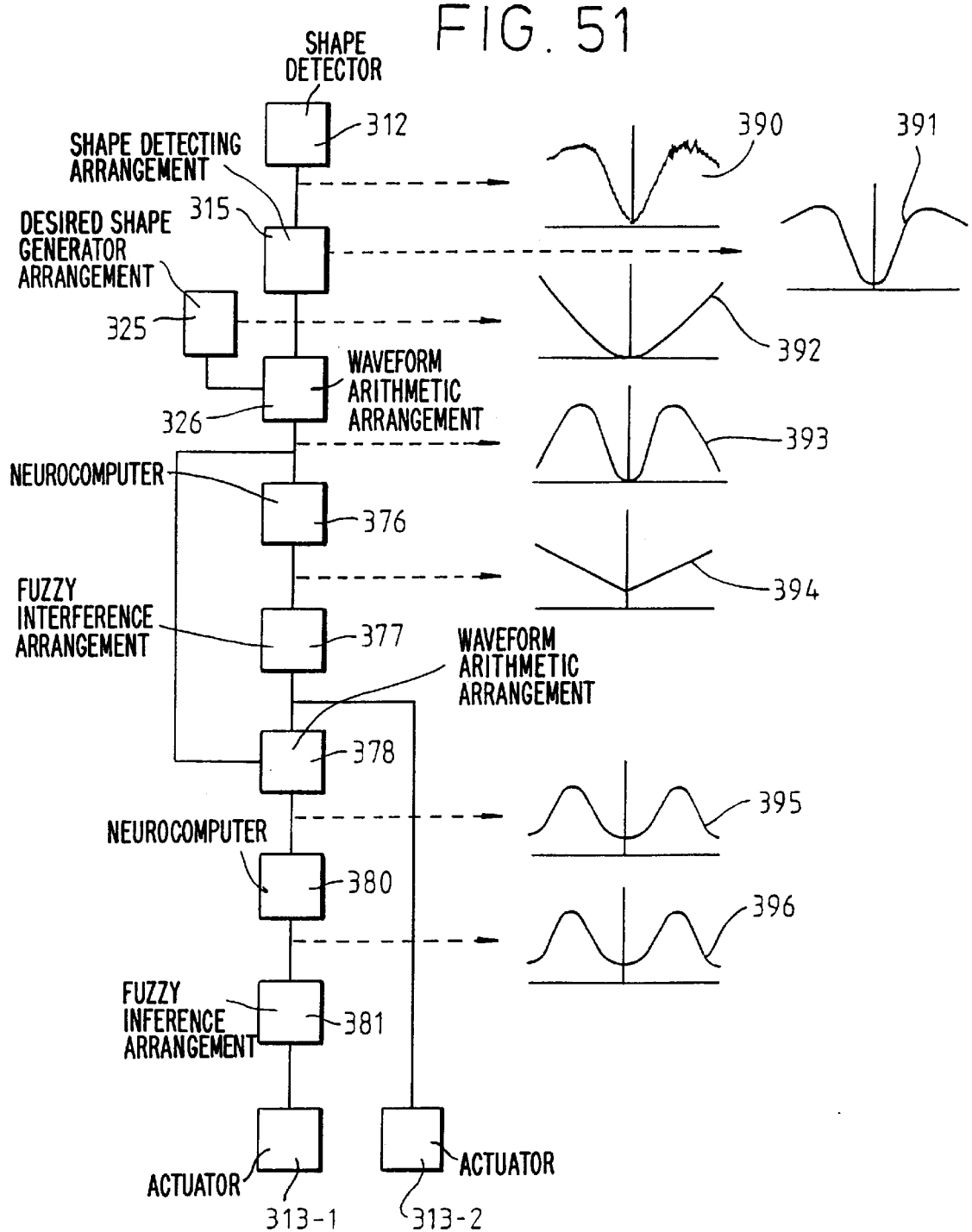
FIG. 51 illustrates the operation of the embodiment of FIG. 50.

The following describes the embodiment shown in FIG. 50 with reference to FIG. 51.

A waveform output waveform 390 output of the shape detector 312 which has noises superimposed as shown is wave formed to a waveform 391 through the shape detecting arrangement 315. The waveform 391 and the waveform output of the desired shape generator arrangement 325 are processed to an output waveform 393 through the waveform arithmetic arrangement 326. The neurocomputer 376 obtains a waveform corresponding to the lateral manipulating variable, and the fuzzy interference arrangement 377 determines the lateral manipulating variable. The actuator 313-2 has the manipulation command given thereto. The waveform arithmetic arrangement 378 subtracts the output waveform 393 by the waveform output 394 which can be predicted to correct in the actuator 313-2 to obtain an output waveform 395 which is the control pattern Δε for the actuator 313-1. The neurocomputer 380 obtains degree of assurance which contains a pattern 396. The fuzzy inference arrangement 381 can have a manipulating command for the actuator 313-1.

The embodiment constructed as described above divides the function. The lateral control serves for controlling coarse waveform deviation, and the AS-U roll is for controlling fine waveform deviation. Such a functional allotment facilitates the adjustment. It also is advantageous in that the lateral shape correction of slow response can be made by the actuators which are slow to respond, and the fine shape correction can be made by the quickly responding AS-U roll.

Figure 52:
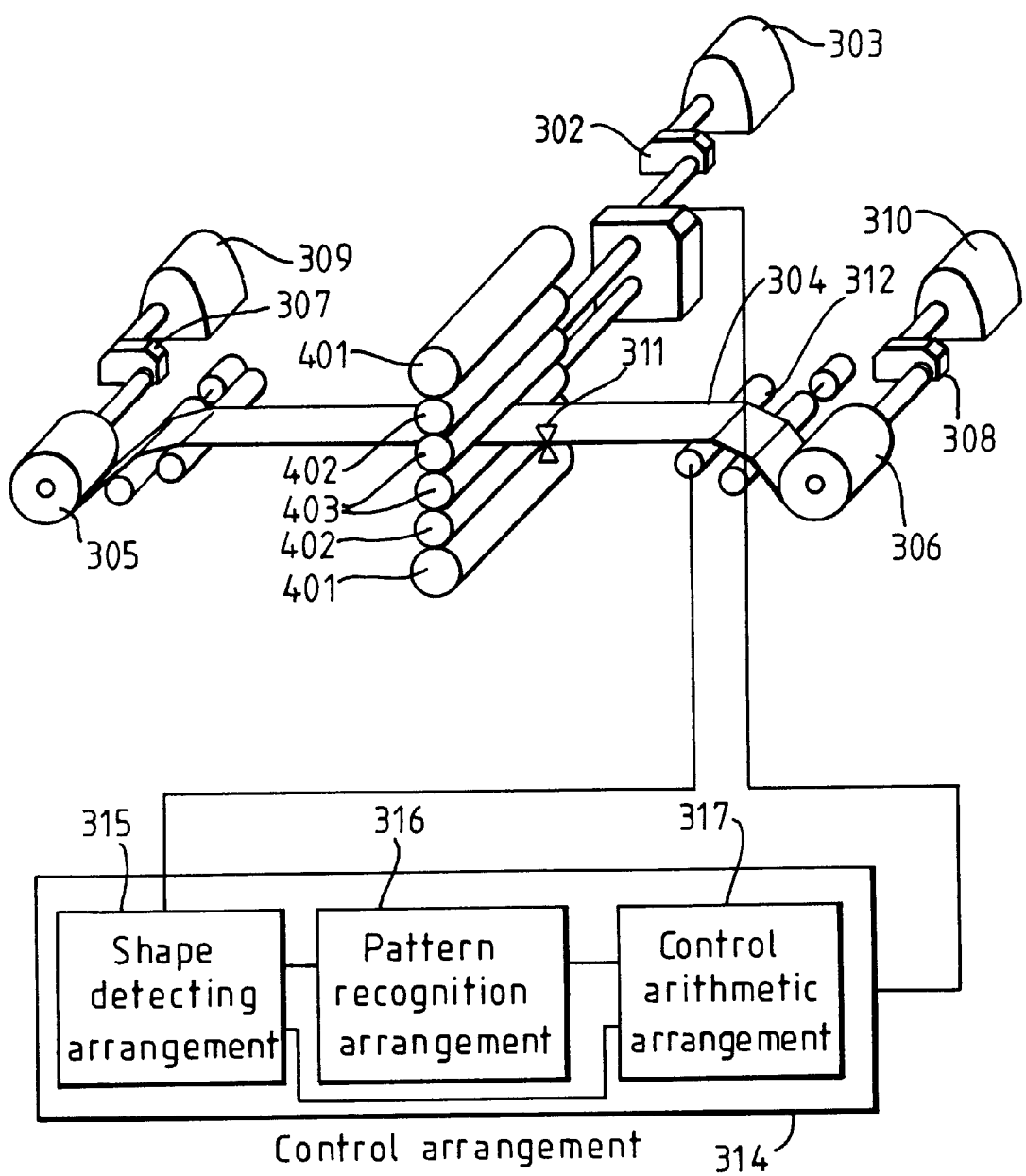
FIG. 52 shows a further sendzimir mill, similar to the arrangement of FIG. 41.

The embodiments described above makes use of the ZR mill as an example. The present invention is available for the rolling mills other than the ZR mill. An example is shown in FIG. 52. In the figure, the present invention is used for a six-fold rolling mill. The identical arrangements and parts in the figure with those in FIG. 41 are indicated by the same numbers as in FIG. 41. The roll of the six-fold rolling mill comprises a pair of work rolls 403, a pair of intermediate rolls 402, and a pair of backup rolls 401.

In the six-fold rolling mill, the material to roll is shape controlled by manipulating at least one of the work rolls 403 and the intermediate rolls 402.

Figure 53A:
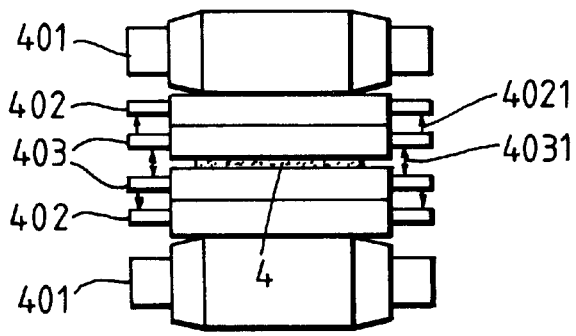
FIGS. 53(a), 53(b), 53(c) and 54 illustrate roller movement in the sendzimir mill of FIG. 52.
Figure 53B:
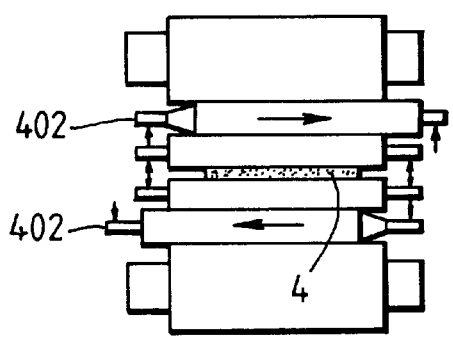
Figure 53C:
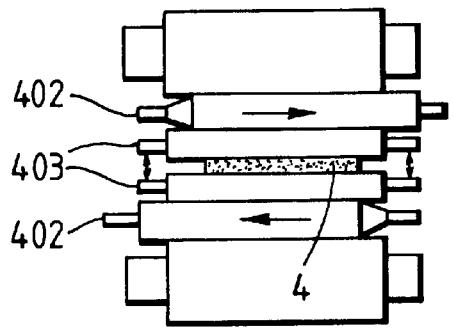

FIGS. 53(a) to 53(c) show examples of manipulation of the rolls for shape control.

FIG. 53(a) shows a shape control in which bender pressures are exerted to the work rolls 403 and the intermediate rolls 402 in the arrow directions shown to make them curve. The shape control by the bender pressures corresponds to the bending by the AS-U roll of the ZR mill. FIG. 53(b) shows another shape control in which the intermediate rolls 402 are shifted in the widthwise directions of the sheet indicated by the arrows shown, in addition to the bender pressures exerted to the work rolls and intermediate rolls. The shift of the intermediate rolls 402 corresponds to the lateral shift of the first intermediate rolls in the ZR mill. FIG. 53(c) shows another shape control in which the bender pressures are exerted to the work rolls 403 to shift the intermediate rolls.

Figure 54:
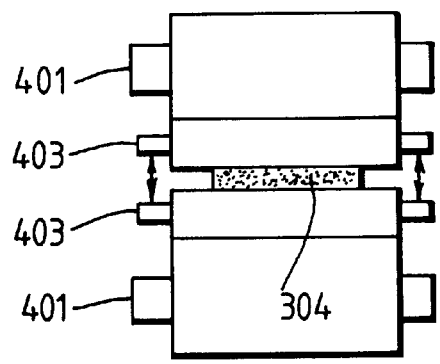

FIG. 54 shows a four-fold rolling mill as another example of the rolling mill. The four-fold rolling mill has the pair of intermediate rolls 402 omitted from the six-fold rolling mill shown in FIGS. 52 and 53. The shape control is made by exerting the bender pressures to the work rolls 403 in directions indicated by the arrows shown.

It is matter of course that the directions of the bender pressures and roll shifts indicated in FIGS. 53 and 54 are mere examples and can be determined appropriately for the shape control according to the present invention.

It is advantageous that the shape control by the roll bending and roll shifts according to the present invention is effective, particularly in precise approximation of shape of the ends of the rolled materials. This has been difficult by the conventional approximation method for the shape control.

Also, the shape control according to the present invention is available for a 12-stage rolling mill, a special shape rolling mill, and other similar rolling mills through it is not shown.

The shape control method and system of the present invention described so far in detail can be directly applied to the rolling mills other than the ZR mill. The actual signals however may be changed depending on the rolls and other members that are actually manipulated for the shape control and on the details of manipulation.

So far, the shape control in the rolling mills has been made by exertion of the external forces and roll shift.

Alternatively, it can be made by a roll coolant method. In this method, the material can be rolled to a desired shape in a way that nozzles arranged in the widthwise direction of the rolled sheet can selectively radiate coolant to rolls to have thermal deformation caused on parts thereof. The present invention also can be used for such a roll coolant shape control.

Figure 55:
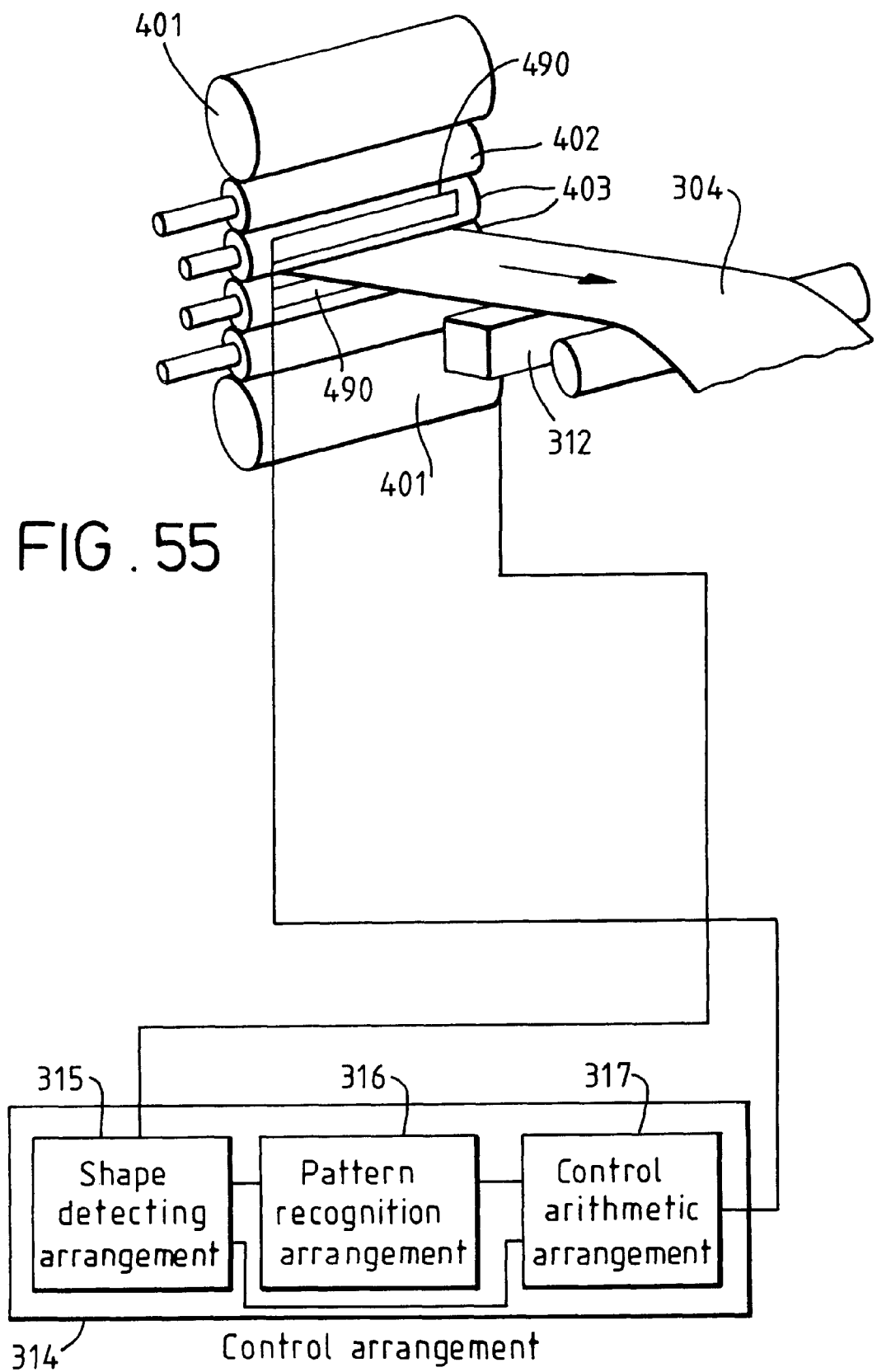
FIG. 55 illustrates the production of a sheet by the mill of FIG. 52.

FIG. 55 shows an outline of a control system in the roll coolant method. The identical arrangements and parts in the figure with those in FIG. 52 are indicated by the same numbers as in FIG. 52. In FIG. 55, a roll cooling unit 490 is provided so as to radiate the coolant to the pair of work rolls 403. It should be noted that in the actual shape control, the roll bending and shift method described in FIG. 52 can be used together with the roll coolant method in FIG. 55.

D—Further Applications of General Principles

In the above discussion, and in particular the discussions of the general principles, the discussion considered the application of the present invention to a rolling mill, and particularly to a Sendzimir mill. However, the present invention is not limited to rolling mills.

Figure 56:
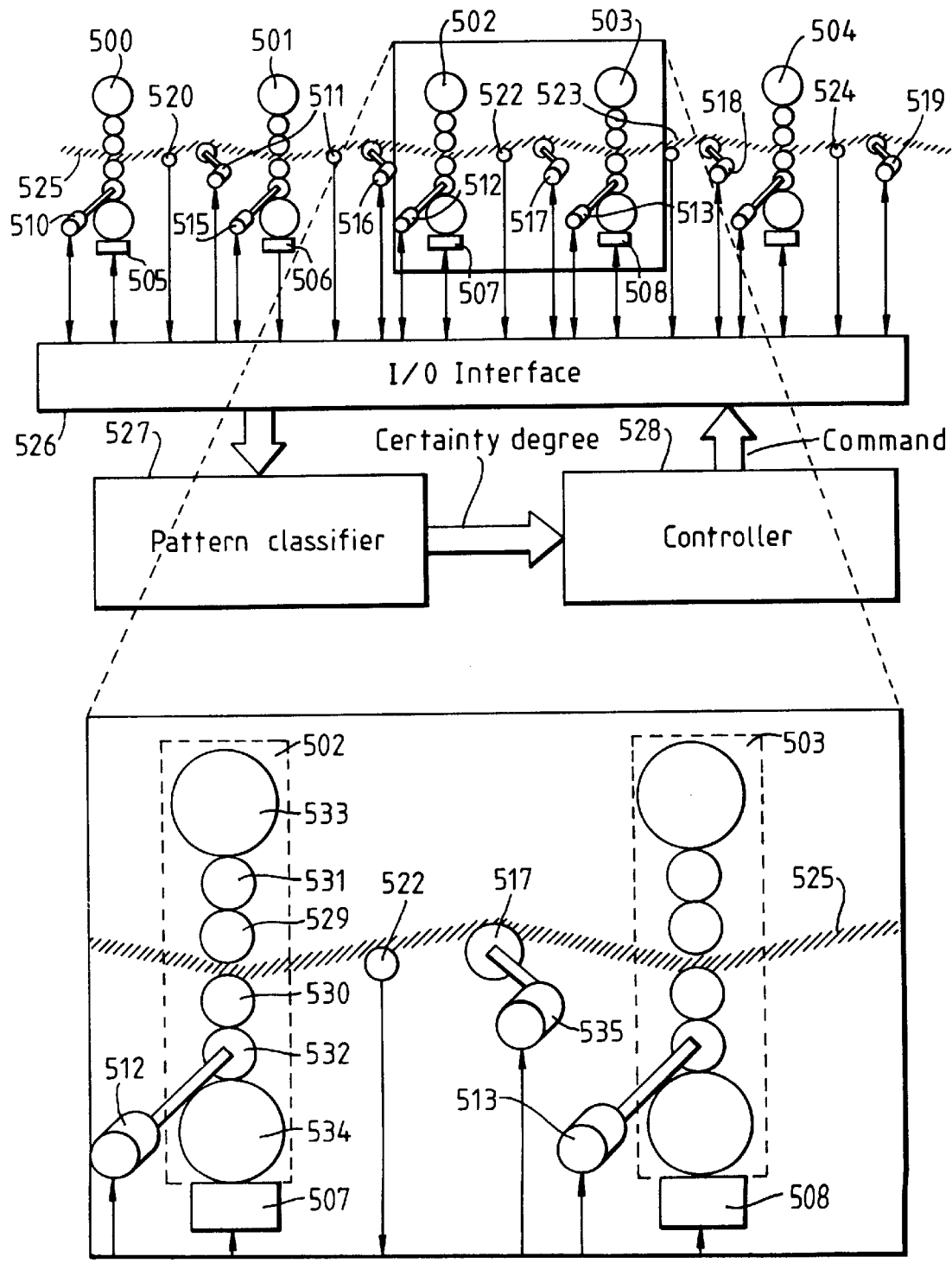
FIG. 56 is a schematic block diagram of a hot rolling mill system embodiing the present invention.

Referring now to FIG. 56, there is illustrated an embodiment of the present invention which is applied to a hot rolling mill. The hot rolling system is composed of rolling stand tables 501, 502, 503 and 504, electric or oil pressure compression devices 505, 506, 507, 508 and 509, electric motors 510, 511, 512, 513 and 514, loopers 515, 516, 517, 518 and 519, tension detectors 520, 521, 522, 523 and 524, a workpiece 525, an I/O interface 526, a pattern classifier 527 and a controller 528. The rolling stand tables 502 and 503 are illustrated at the bottom of FIG. 25, enlarged to show their construction in detail. The rolling stand table 502 is composed of work rolls 529 and 530, intermediate rolls 531 and 532 and backup rolls 534 and 535. The force applied by the oil pressure compression device 507 is transmitted through the backup rolls 534 and 535, intermediate rolls 531 and 532 and work rolls 529 and 530 to the workpiece 525 so as to control the thickness of the workpiece. The looper 517 controls the tension applied to the workpiece 525 by contact with the workpiece through a roll and by controlling the angle of the revolution of the electric motor 535 attached to the looper.

A tension meter 522 is also in contact with the workpiece 525 to measure the tension of the workpiece 525. To the I/O inter face, such values are input as the output from the tension meter, that from a load meter attached to the oil pressure compression device, the speed of the electric motors 510 to 514 connected to intermediate rolls to drive them, the locations of loopers and the current of each electric motor. The condition of the controlled system which has been input to the I/O interface 526 is then sent to the pattern classifier 527 made up of a neural net. A pattern (distribution) of various signals is input to the pattern classifier 527, and after a distribution, say, a tension distribution formed of a plurality of tension meter signals is classified into one of the patterns stored in advance, how many constituents of the resulting pattern the distribution contains is extracted as a degree of certainty and then output to the controller 528. In response to the output, the controller per forms the fuzzy operation, determines a command for each actuator and then sends the commands to the I/O interface.

Now, the operation of the above embodiment will be described with reference to FIG. 57. For instance, a tension pattern formed of the outputs from a plurality of tension meters is input via the I/O interface 526 to the neural net. In the same manner, such patterns are input as load patterns, speed patterns from the electric motors 510 to 514, temperature patterns from thermometers mounted at various locations to the rolling stand tables 500 to 504 to measure the temperature of a workpiece, revolution angle patterns obtained from the angles of the revolution of loopers and electric current patterns from the electric motors.

The neural net 527 outputs as a degree of certainty the proportion of a typical pattern already learned to each pattern to the controller 528 composed of inference mechanisms.

In reference to FIG. 58, the operation of the controller 528 will be described. Assume that a piece of operators' know-how in the knowledge base goes like "When the tension pattern slants to the right, the load pattern is concave, the speed pattern is convex and the temperature pattern slants sharply to the right, the speed pattern is changed into a flat pattern and the compression command pattern is changed into a right-slanting pattern." Then, from the neural net 527 these certainty degrees are obtained: a degree of the certainty that the tension pattern slants to the right, that the load pattern is concave, that the speed pattern is convex and that the temperature pattern sharply slants to the right.

An inference process 535 uses fuzzy logic on the bases of the knowledge base 537 and of the above-mentioned plurality of certainty degrees to draw the conclusion that the compression command pattern slants to the right. The inference process employs the minimax principle to check the agreement of the pattern with a rule with regard to the premise, and then uses a gravity center for the conclusion in order to generate commands for actuators. Here, the conclusion that the compression command pattern slants to the right is drawn, so the command generator 538 uses the right-slanting pattern to generate a compression command for each oil pressure compression device. These commands are then sent to the oil pressure compression devices for actuators.

Figure 57:
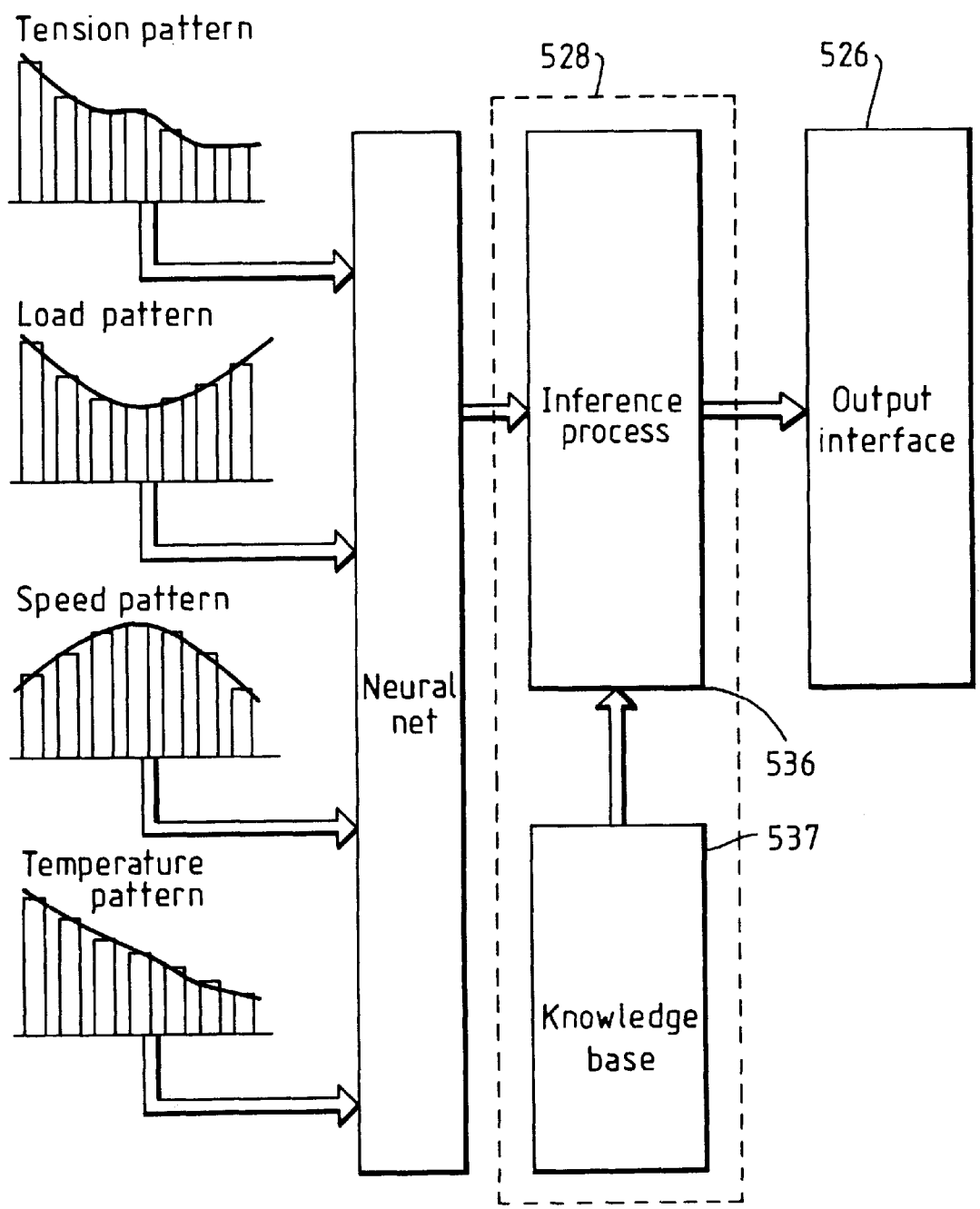
FIG. 57 illustrates the operation of the hot rolling mill system of FIG. 56.
Figure 58:
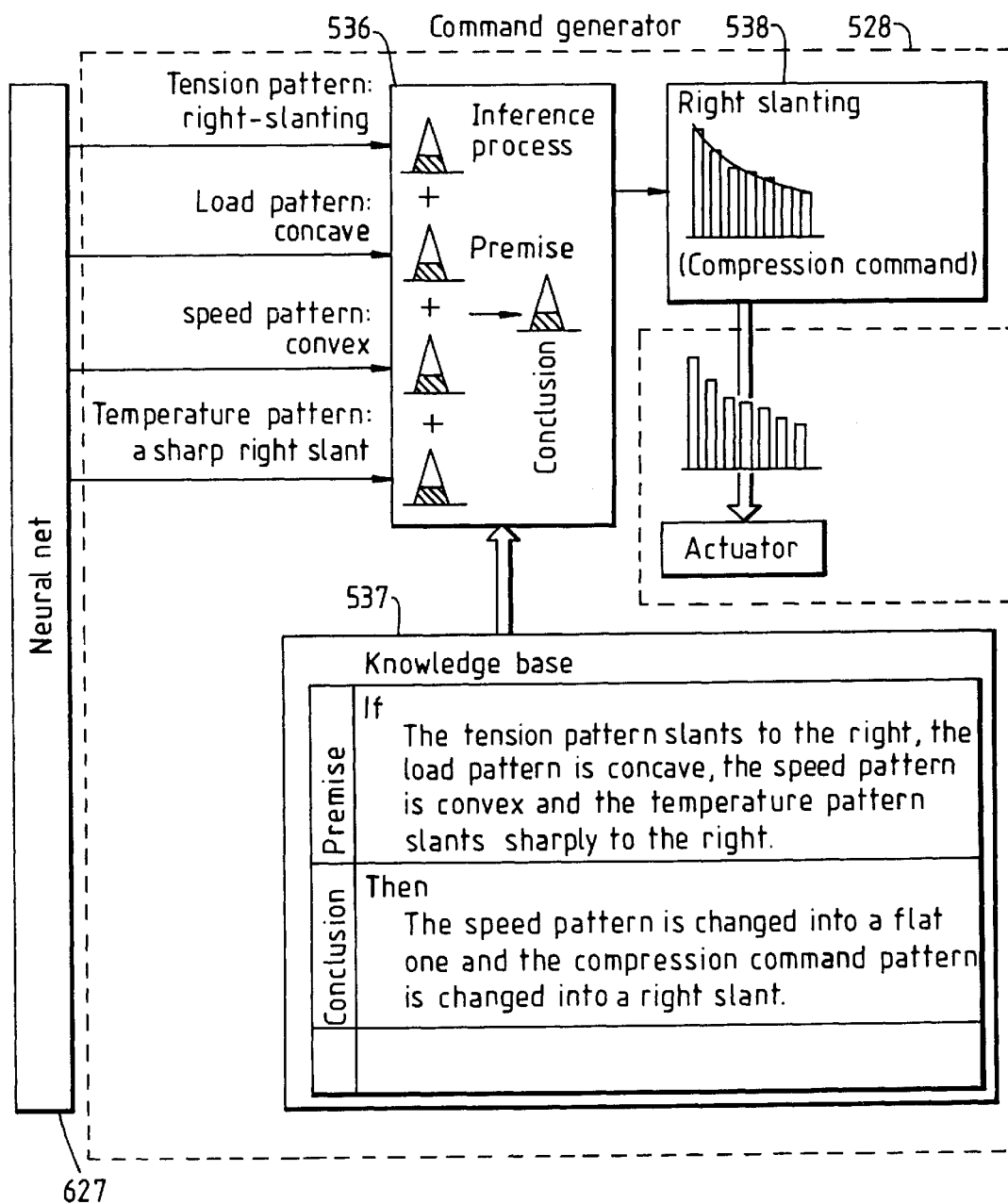
FIG. 58 illustrates the operation of the control device for the mill of FIG. 56.
Figure 59:
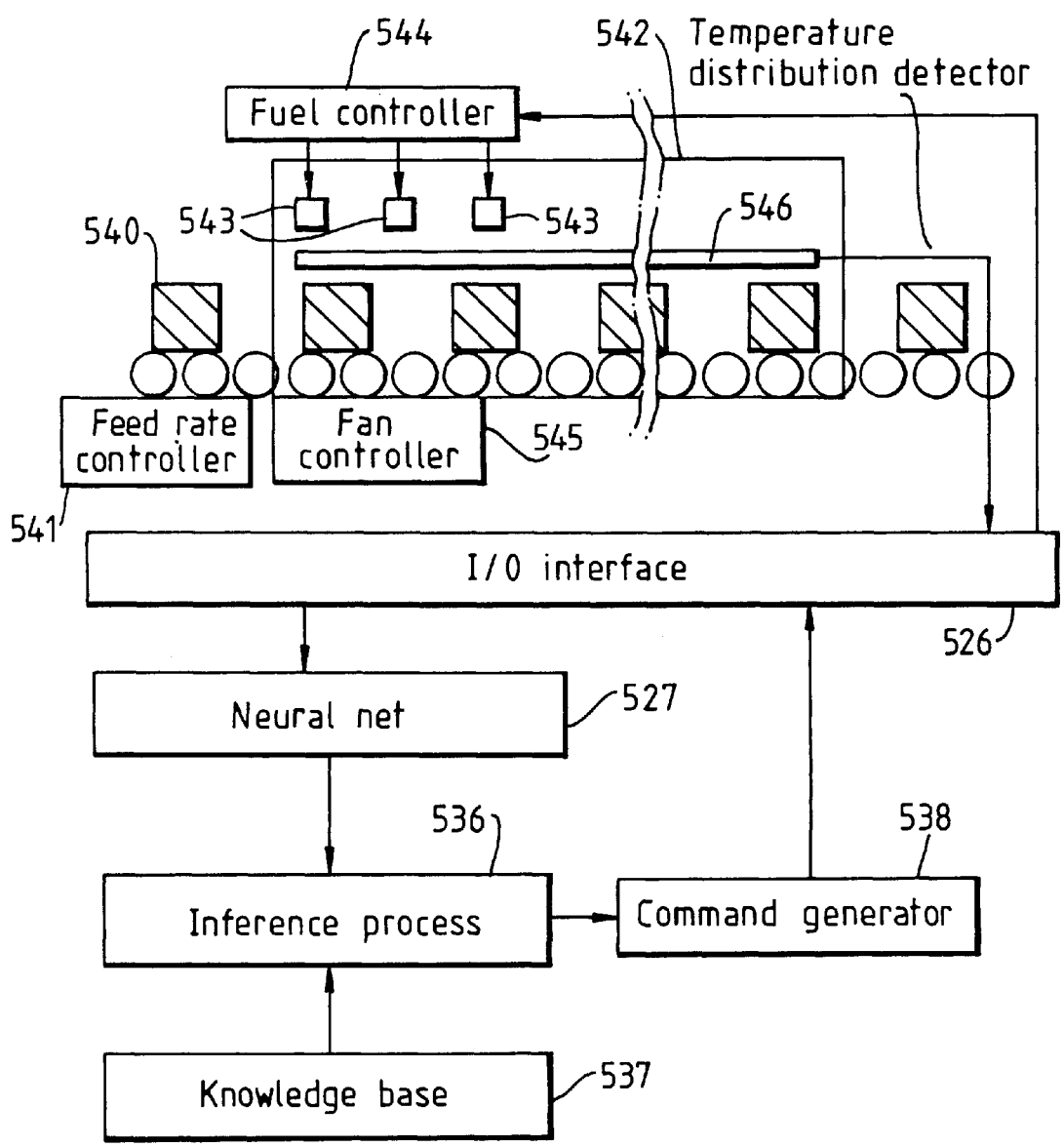
FIG. 59 illustrates the application of the present invention to a heating furnace.

FIG. 59 shows an illustration of the composition of the embodiment shown in FIGS. 56 to 58 which is in turn applied to a heating furnace. The below description will be only about the difference from the embodiment shown in FIGS. 56 to 58. A billet 540 is fed to a heating furnace 542 by a feed rate controller 541. The heating furnace 542 is composed of a fuel controller 544 for controlling the combustion of burners 543, a fan controller 545 for controlling the air supply for this combustion and a temperature distribution detector 546 for measuring the distribution of temperature inside the furnace. It will be obvious that the input of the distributions (patterns) of such factors as temperature and the feed rate of the billet feeder to the neural net allows control of the heating furnace in the same manner as the above-mentioned hot rolling system.

Figure 60:
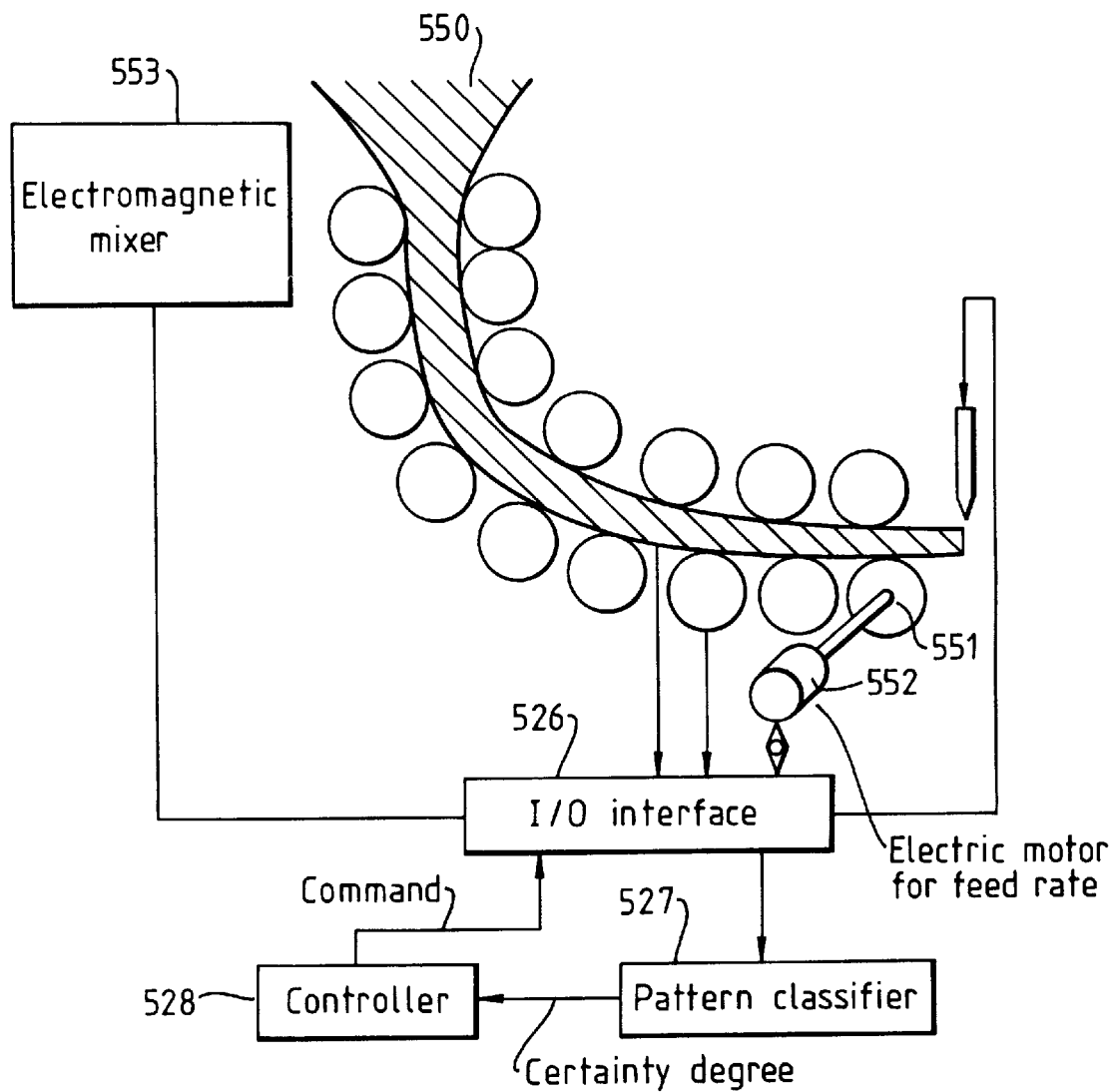
FIG. 60 illustrates the application of the the present invention to a direct casting rolling mill.

Now, an embodiment of the present invention which is applied to continual casting direct rolling will be described. FIG. 60 illustrates a continual casting direct rolling mill. Molten metal 550 fed from a converter is cooled through a plurality of rolls to be solidified into steel sheets. FIG. 60 shows only one electric motor connected to a roll, but in reality each roll has an electric motor 552 connected to it. The surface temperature of the metal 550, though not illustrated, is measured by a plurality of temperature detectors so that a resulting distribution (pattern) of the surface temperature of the metal 550 can be sent and input to the I/O interface. An electromagnetic mixer 553 is for mixing the molten metal by means of an electromagnetic force to give the same quality to whole products. In this embodiment, temperature patterns and the patterns of the speed of a plurality of rolls 551 are detected and controlled. For detecting patterns and performing control, the same method is used here as in hot rolling.

The present invention may also be embodied by a system used in a production line having such an installation as a blast furnace and a plating bath.

It may also be noted that the set point control, machine learning and serial control aspects of the present invention discussed above may be applied to the further applications of the present invention described above.

What is claimed is:

1. A control method using a neural network in a control system having at least one operational means for operating a controlled object, said control method comprising the steps of:

recognizing a combination of plural detecting signals concerning said controlled object as a detection pattern;

comparing said detection pattern with at least one previously set setting pattern;

obtaining at least one value representing at least one degree of similarity of said detection pattern with respect to said at least one setting pattern using said neural network; and obtaining at least one operational amount of said operational means based upon said at least one value and a reasoning logic utilizing at least one previously determined control rule for said at least one operational means.

2. A control method according to claim 1, wherein one operational means is provided, said step of comparing includes comparing said detection pattern with one previously set setting pattern, said step of obtaining at least one value includes obtaining one value representing a degree of similarity of said detection pattern with respect to said one setting pattern using said neural network, and said step of obtaining at least one operational amount includes obtaining one operational amount of said one operational means based on said one value and a reasoning logic using one previously determined control rule for said one operational means.

3. A control method according to claim 2, wherein said reasoning logic is a fuzzy logic.

4. A control method according to claim 1, wherein plural operational means are provided for operating said control controlled object, said step of comparing includes comparing said detection pattern with one previously set setting pattern, said step of obtaining at least one value includes obtaining one value representing a degree of similarity of said detection pattern with respect to said one setting pattern using said neural network; and said step of obtaining at least one operational amount includes obtaining respective operational amounts of said plural operation means based on said one value and a reasoning logic using one previously determined control rule for said plural operational means.

5. A control method according to claim 1, wherein said reasoning logic is a fuzzy logic.

6. A control method according to claim 1, wherein said at least one operational means includes one operational means, said step of comparing includes comparing said detection pattern with previously set plural setting patterns; said step of obtaining at least one value includes obtaining respective values representing degrees of similarity of said detection pattern with respect to said plural setting patterns using said neural network; and said step of obtaining at least one operational amount includes obtaining one operational amount of said operational means based on said respective values and a reasoning logic using previously determined respective control rules for said operational means.

7. A control method according to claim 6, wherein said reasoning logic is a fuzzy logic.

8. A control method according to claim 1, wherein said at least one operational means includes plural operational means for operating said controlled object, said step of comparing includes comparing said detection pattern with previously set plural setting patterns; said step of obtaining at least one value includes obtaining values representing degrees of similarity of said detection pattern with respect to said plural setting patterns using said neural network; and said step of obtaining at least one operational amount includes obtaining respective operational amounts of said plural operational means based on said values and a reasoning logic using previously determined respective control rules for said plural operational means.

9. A control method according to claim 8, wherein said reasoning logic is a fuzzy logic.

10. A control method according to claim 1, wherein said at least one operational means includes plural operational means for executing different operations to said controlled object, said step of comparing including comparing said detection pattern with previously set plural setting patterns; said step of obtaining at least one value includes obtaining values representing degrees of similarity of said detection pattern with respect to said plural setting patterns using said neural network; and said step of obtaining at least one operational amount includes obtaining respective operational amounts of said plural operational means based on said values and a reasoning logic using previously determined respective control rules for said plural operational means.

11. A control method according to claim 10, wherein said reasoning logic is a fuzzy logic.

12. A control method according to claim 1, wherein said reasoning logic is a fuzzy logic.

13. A control apparatus using a neural network, said control apparatus comprising:

at least one operational means for operating a controlled object;

a characteristic amount extracting means having a neural network for recognizing a combination of plural detecting signals concerning said controlled object as a detection pattern, for comparing said detection pattern with at least one previously set setting pattern, and for obtaining at least one value representing at least one degree of similarity of said detection pattern with respect to said at least one setting pattern using said neural network; and means for obtaining at least one operational amount for said operational means based on said at least one value and a reasoning logic utilizing at least one previously determined control rule for said operation means and for outputting said at least one operational amount as an operational reference to said operational means.

14. A control apparatus according to claim 13, wherein one operational means is provided; said characteristic amount extracting means compares said detection pattern with one previously set setting pattern and obtains one value representing a degree of similarity of said detection pattern with respect to said one setting pattern using said neural network, and said means for obtaining obtains one operational amount of said operational means based on said value and a reasoning logic using one previously determined control rule for said one operational means.

15. A control apparatus according to claim 14, wherein said reasoning logic of said means for obtaining is a fuzzy logic.

16. A control apparatus according to claim 13, wherein plural operational means are provided for operating said control controlled object; said characteristic amount extracting means compares said detection pattern with one previously set setting pattern and obtains one value representing a degree of similarity of said detection pattern with respect to said one setting pattern using said neural network; and said means for obtaining obtains respective operational amounts of said plural operational means based on said one value and a reasoning logic using one previously determined control rule for said plural operational means.

17. A control apparatus according to claim 16, wherein said reasoning logic of said means for obtaining is a fuzzy logic.

18. A control apparatus according to claim 13, wherein said at least one operational means includes one operational means, said characteristic amount extracting means compares said detection pattern with previously set plural setting patterns and obtains respective values representing degrees of similarity of said detection pattern with respect to said plural setting patterns using said neural network; and said means for obtaining obtains one operational amount of said operational means based on said respective values and a reasoning logic using previously determined respective control rules for said one operational means.

19. A control apparatus according to claim 18, wherein said reasoning logic of said means for obtaining is a fuzzy logic.

20. A control apparatus according to claim 13, wherein said at least one operational means includes plural operational means for operating said controlled object, said characteristic amount extracting means compares said detection pattern with previously set plural setting patterns and obtains values representing degrees of similarity of said detection pattern with respect to said plural setting patterns using said neural network; and said means for obtaining obtains respective operational amounts of said plural operational means based on said values and a reasoning logic using previously determined respective control rules for said plural operational means.

21. A control apparatus according to claim 20, wherein said reasoning logic of said means for obtaining is a fuzzy logic.

22. A control apparatus according to claim 13, wherein said at least one operational means includes plural operational means for executing different operations to said controlled object, said characteristic amount extracting means compares said detection pattern with previously set plural setting patterns and obtains values representing degrees of similarity of said detection pattern with respect to said plural setting patterns using said neural network; and said means for obtaining obtains respective operational amounts of said plural operational means based on said values and a reasoning logic using previously determined respective control rules for said plural operational means.

23. A control apparatus according to claim 22, wherein said reasoning logic of said means for obtaining is a fuzzy logic.

24. A control apparatus according to claim 13, wherein said reasoning logic of said means for obtaining is a fuzzy logic.

\* \* \* \* \*